United States Patent
Sugita

(10) Patent No.: US 12,010,421 B2
(45) Date of Patent: Jun. 11, 2024

(54) ACCESSORY APPARATUS, CONTROL METHOD, AND STORAGE MEDIUM

(71) Applicant: CANON KABUSHIKI KAISHA, Tokyo (JP)

(72) Inventor: Atsushi Sugita, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 85 days.

(21) Appl. No.: 17/963,261

(22) Filed: Oct. 11, 2022

(65) Prior Publication Data

US 2023/0113949 A1    Apr. 13, 2023

(30) Foreign Application Priority Data

Oct. 13, 2021 (JP) .................. 2021-168274

(51) Int. Cl.
*H04N 23/663* (2023.01)
*G03B 13/36* (2021.01)
*H04N 23/67* (2023.01)
*G03B 17/14* (2021.01)

(52) U.S. Cl.
CPC ........... *H04N 23/663* (2023.01); *G03B 13/36* (2013.01); *H04N 23/67* (2023.01); *G03B 17/14* (2013.01)

(58) Field of Classification Search
CPC ...... H04N 23/663; H04N 23/67; G03B 13/36; G03B 17/14; G03B 2206/00; G03B 17/565
See application file for complete search history.

(56) References Cited

U.S. PATENT DOCUMENTS

| | | | | |
|---|---|---|---|---|
| 2013/0022348 A1* | 1/2013 | Hasuda | ................ | H04N 23/55 396/530 |
| 2013/0077952 A1* | 3/2013 | Sugiyama | .............. | G03B 17/14 396/530 |
| 2015/0234198 A1* | 8/2015 | Hayakawa | ............. | G03B 17/14 348/375 |
| 2020/0363605 A1* | 11/2020 | Saito | ...................... | G03B 13/36 |

(Continued)

FOREIGN PATENT DOCUMENTS

JP           5909860 B2      4/2016
JP           2020-173337 A  10/2020

*Primary Examiner* — Shahbaz Nazrul
(74) *Attorney, Agent, or Firm* — Cowan, Liebowitz & Latman, P.C.

(57) ABSTRACT

An accessory apparatus, removably attached between an image capturing apparatus and an interchangeable lens, performs first communication with the image capturing apparatus and second communication with the interchangeable lens, and accepts a predetermined operation for operating a predetermined function that assists an autofocus (AF) operation. The accessory apparatus implements the predetermined function by controlling transmission of a control command to the interchangeable lens based on the predetermined operation and the control command for the AF operation accepted from the image capturing apparatus. To control the transmission of the control command, the accessory apparatus does not transmit a control amount included in the control command and pertaining to focus for the AF operation to the interchangeable lens, or changes the control amount and transmits the control amount changed to the interchangeable lens.

24 Claims, 37 Drawing Sheets

(56) References Cited

U.S. PATENT DOCUMENTS

| | | | |
|---|---|---|---|
| 2023/0101440 A1* | 3/2023 | Takanashi | H04N 23/663 348/207.11 |
| 2023/0114090 A1* | 4/2023 | Tanaka | H04N 23/663 348/360 |
| 2023/0379576 A1* | 11/2023 | Okada | G03B 17/14 |
| 2023/0379577 A1* | 11/2023 | Ueda | H04N 23/663 |

* cited by examiner

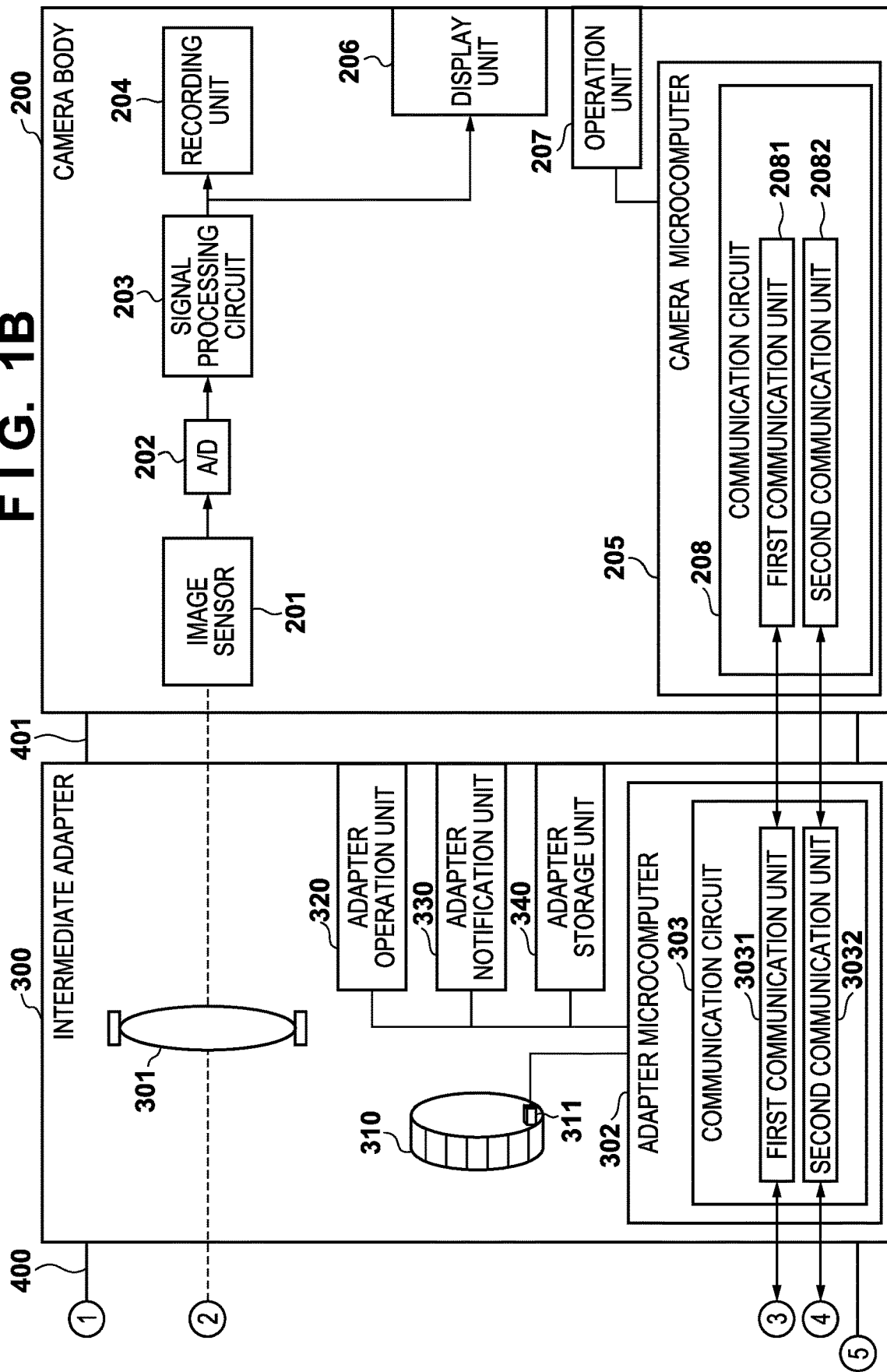

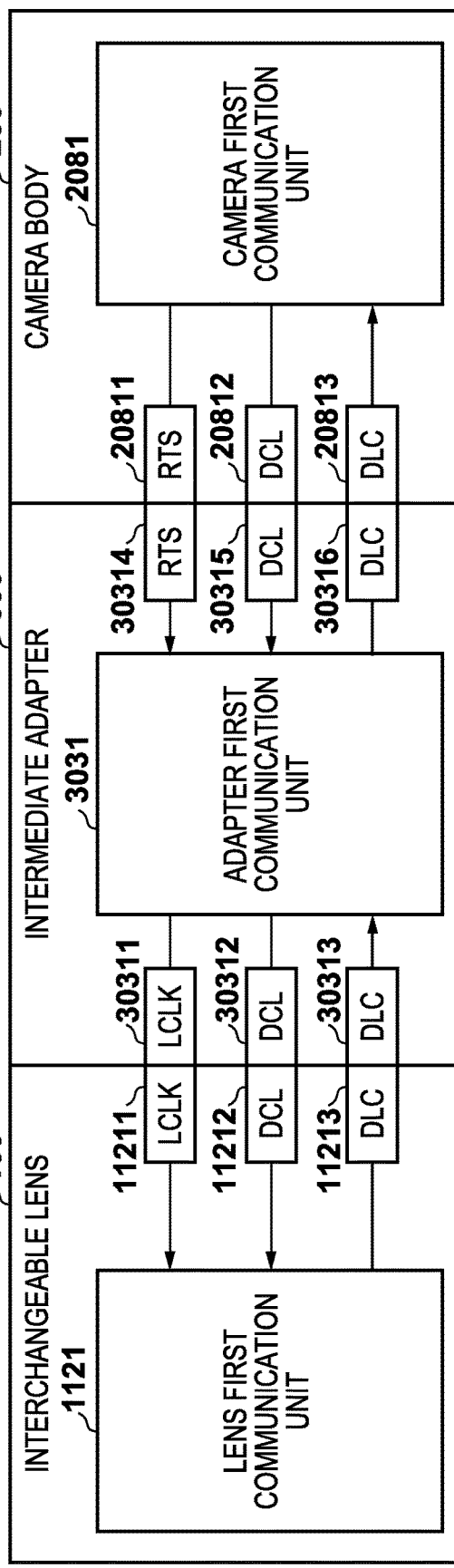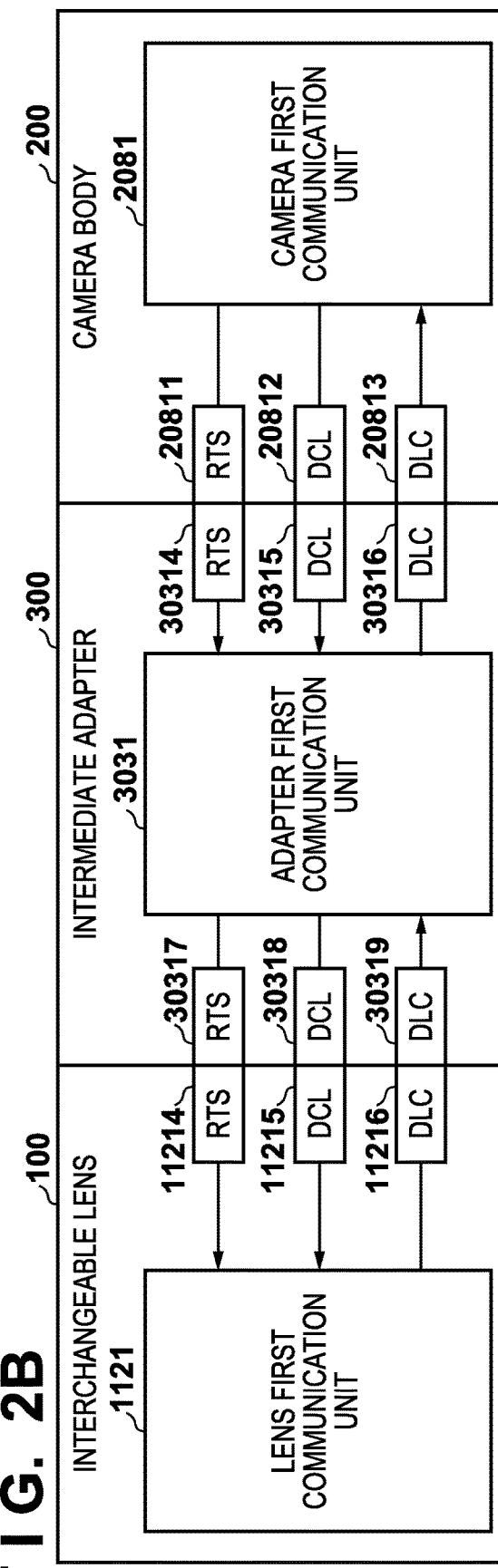

COMMUNICATION CMD1

COMMUNICATION CMD2

COMMUNICATION CMD1

COMMUNICATION CMD2

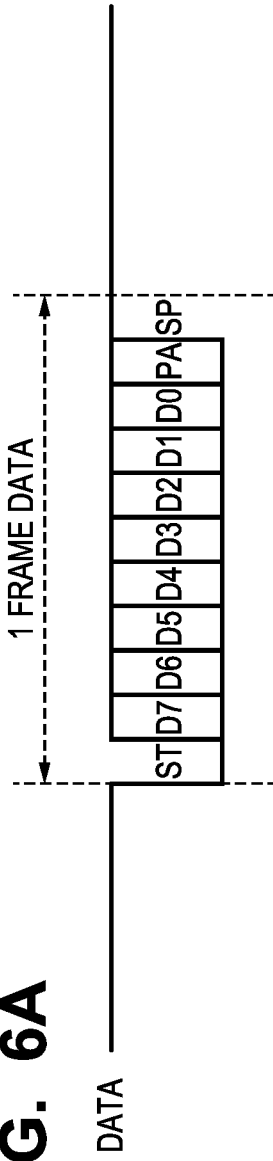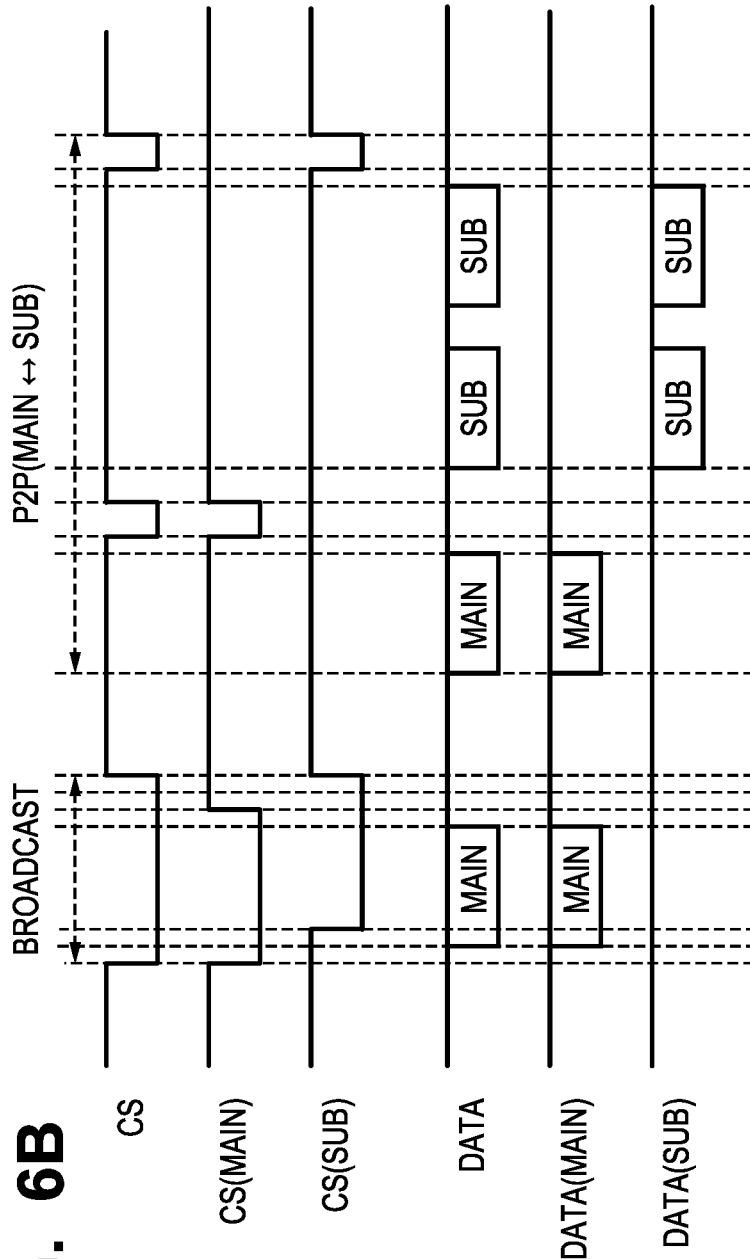

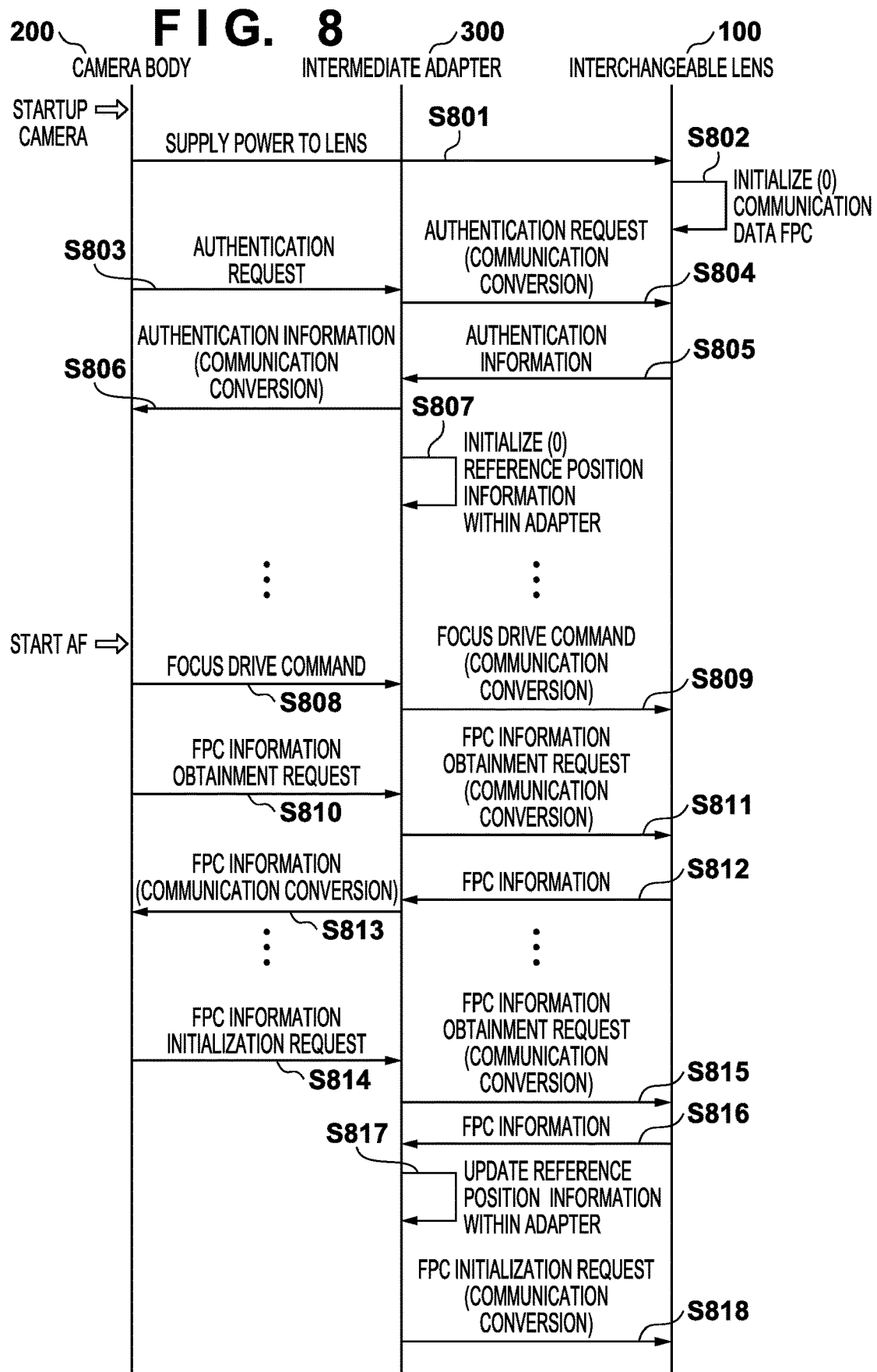

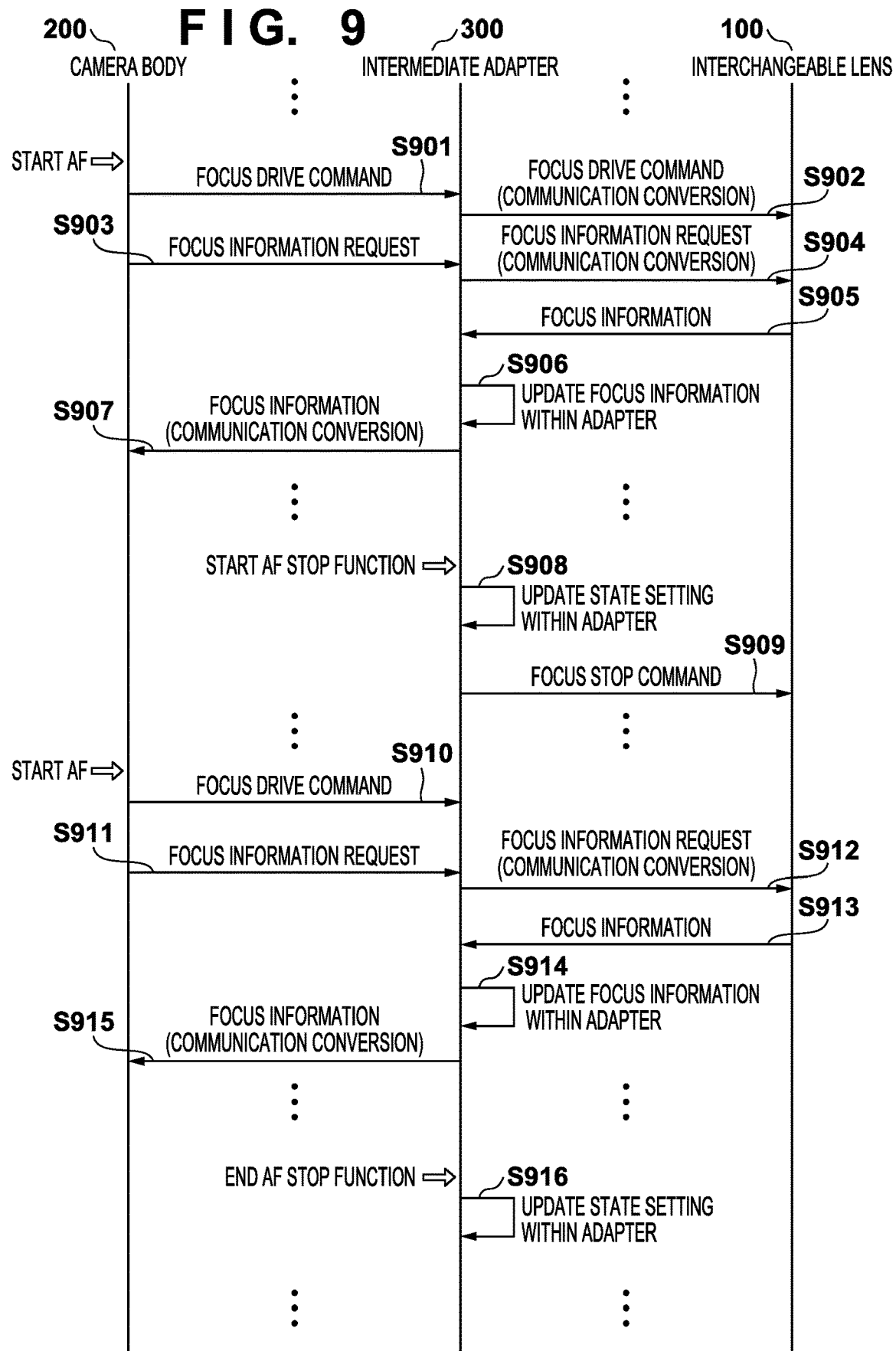

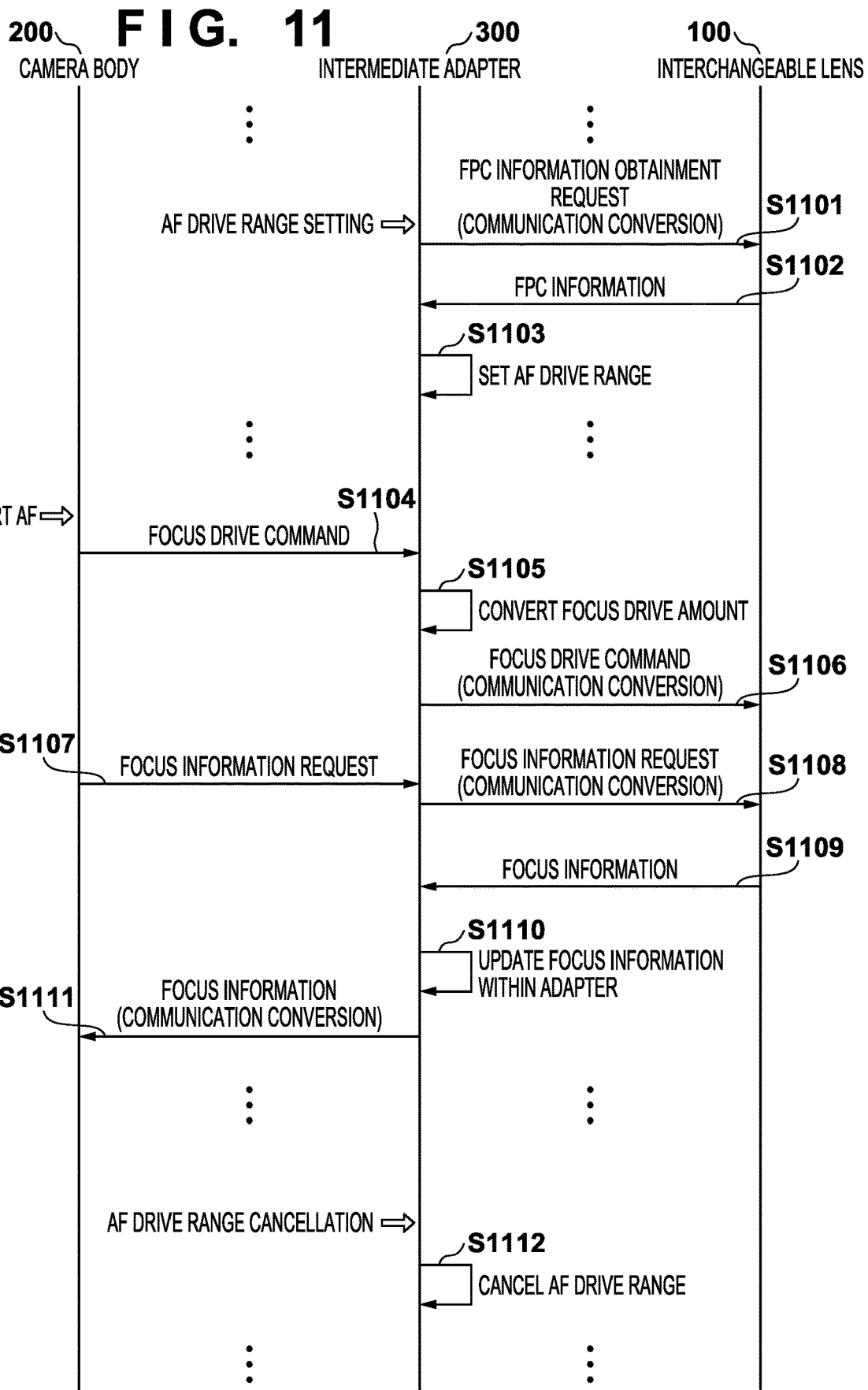

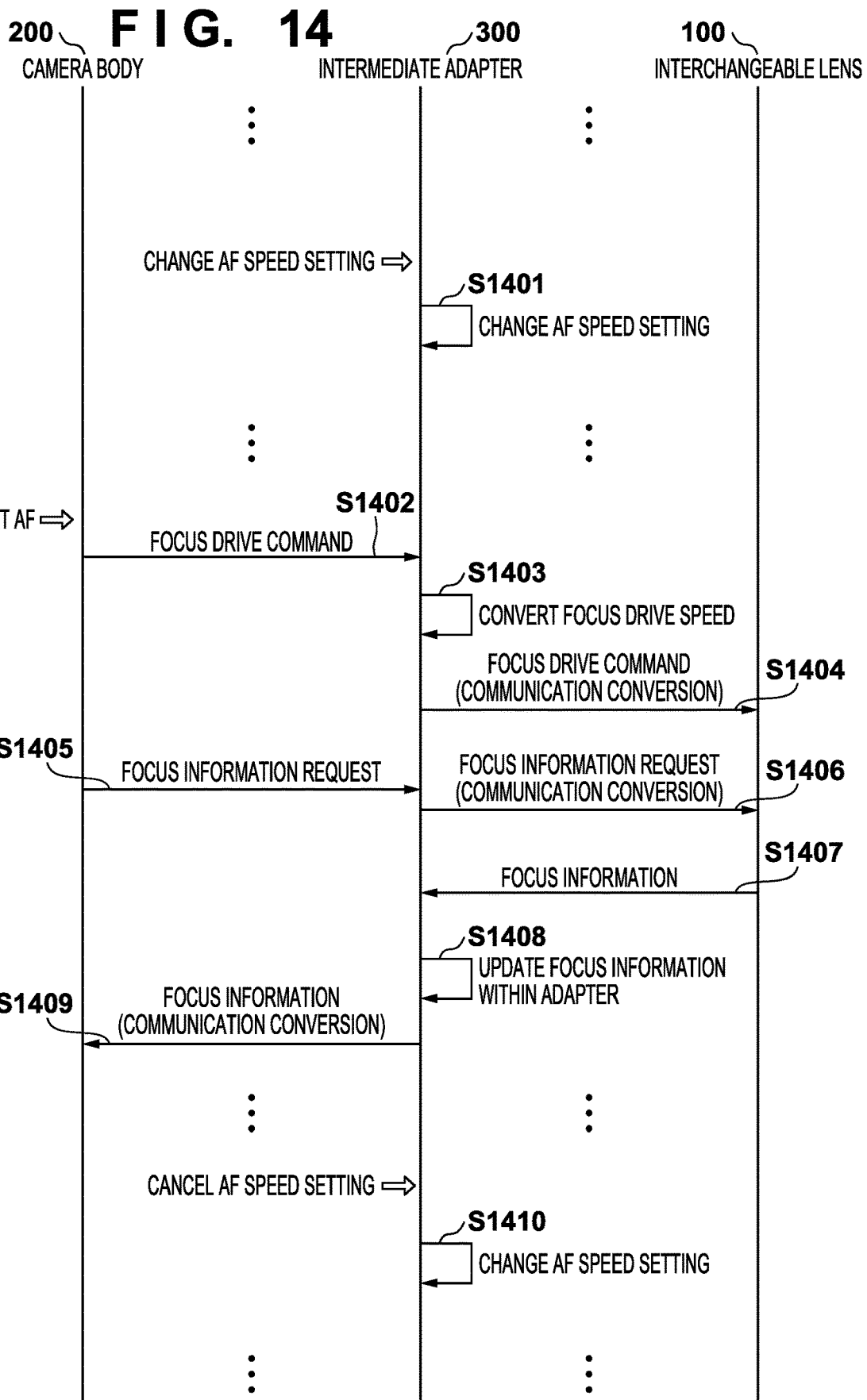

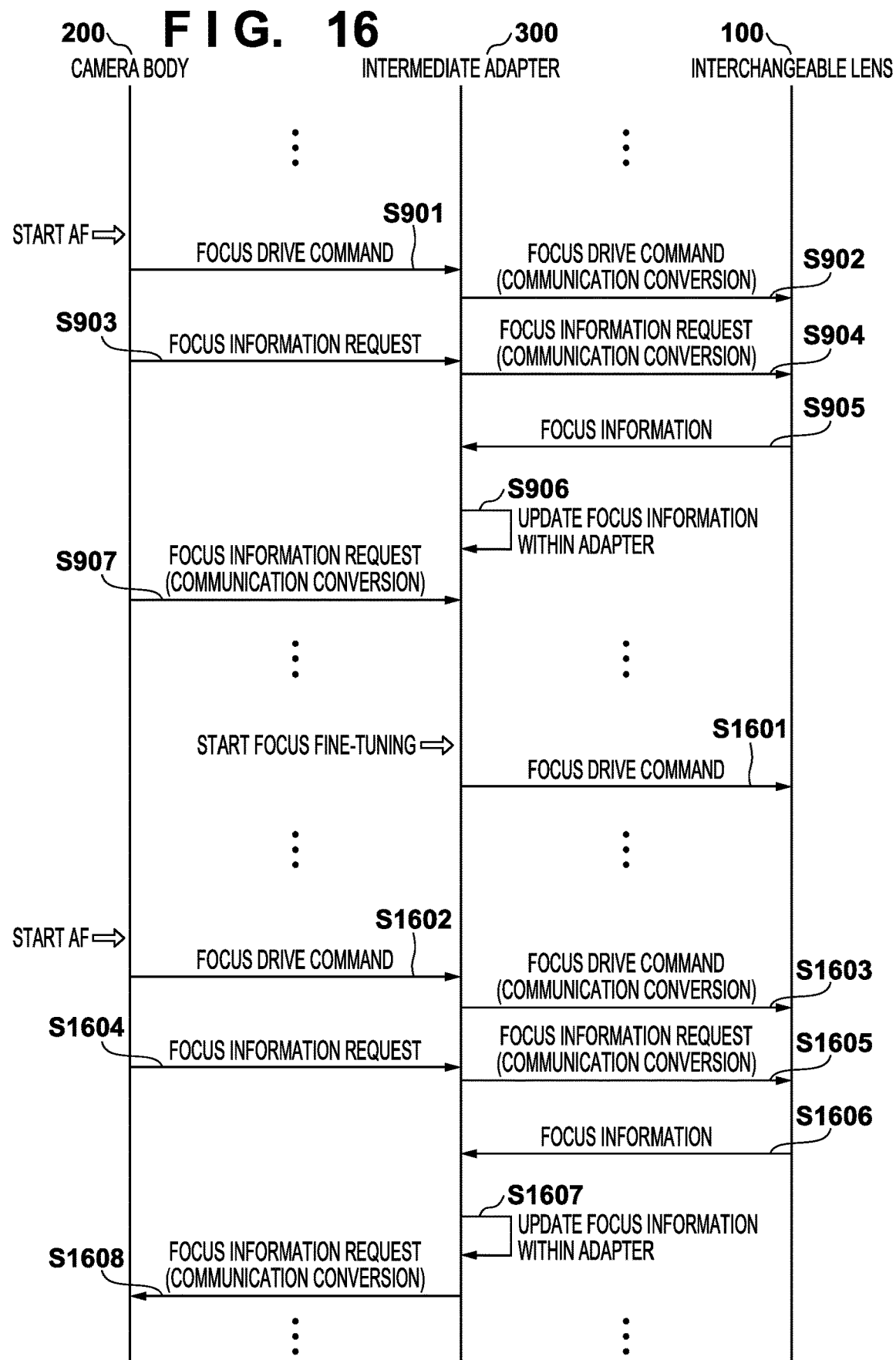

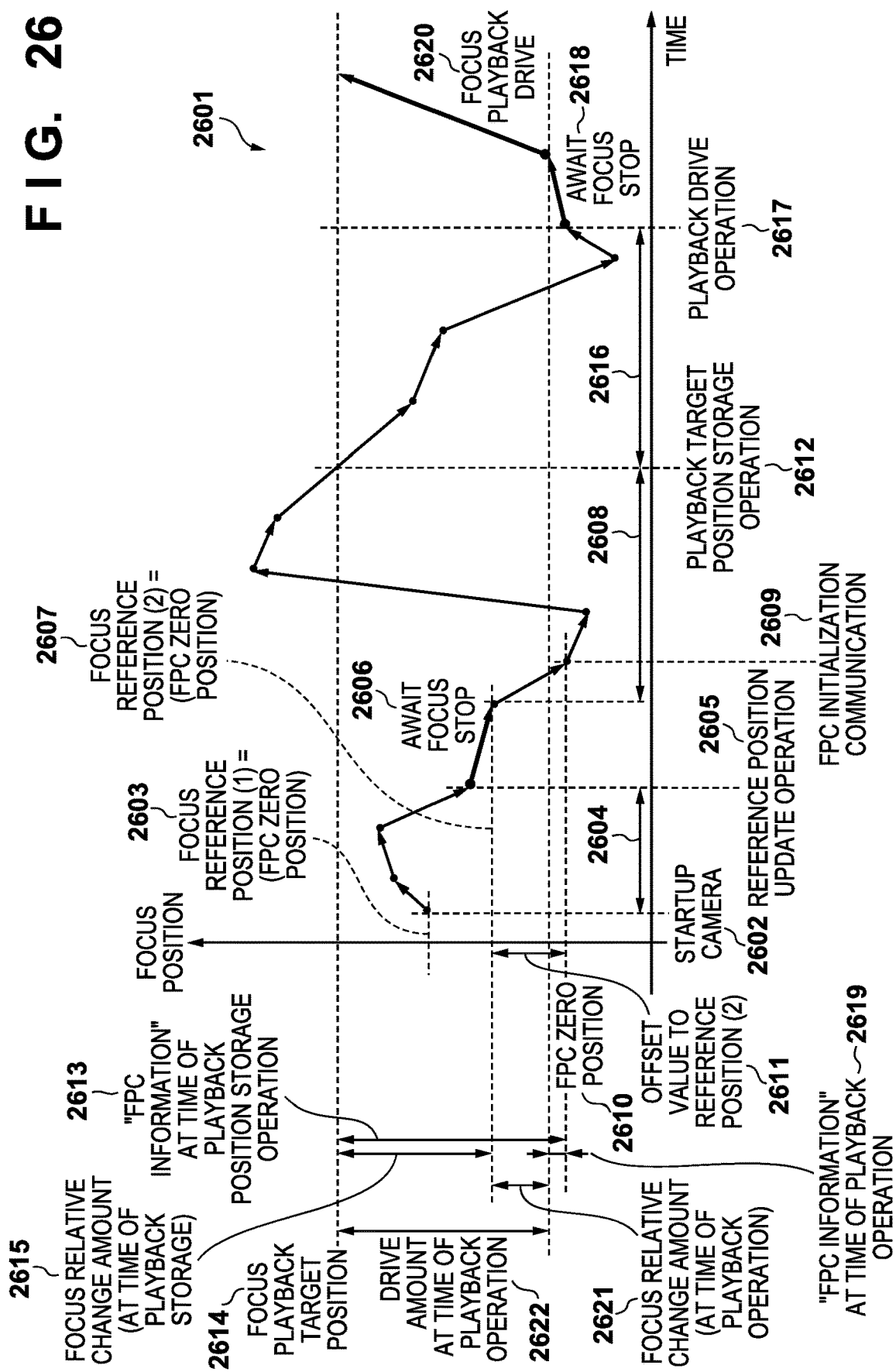

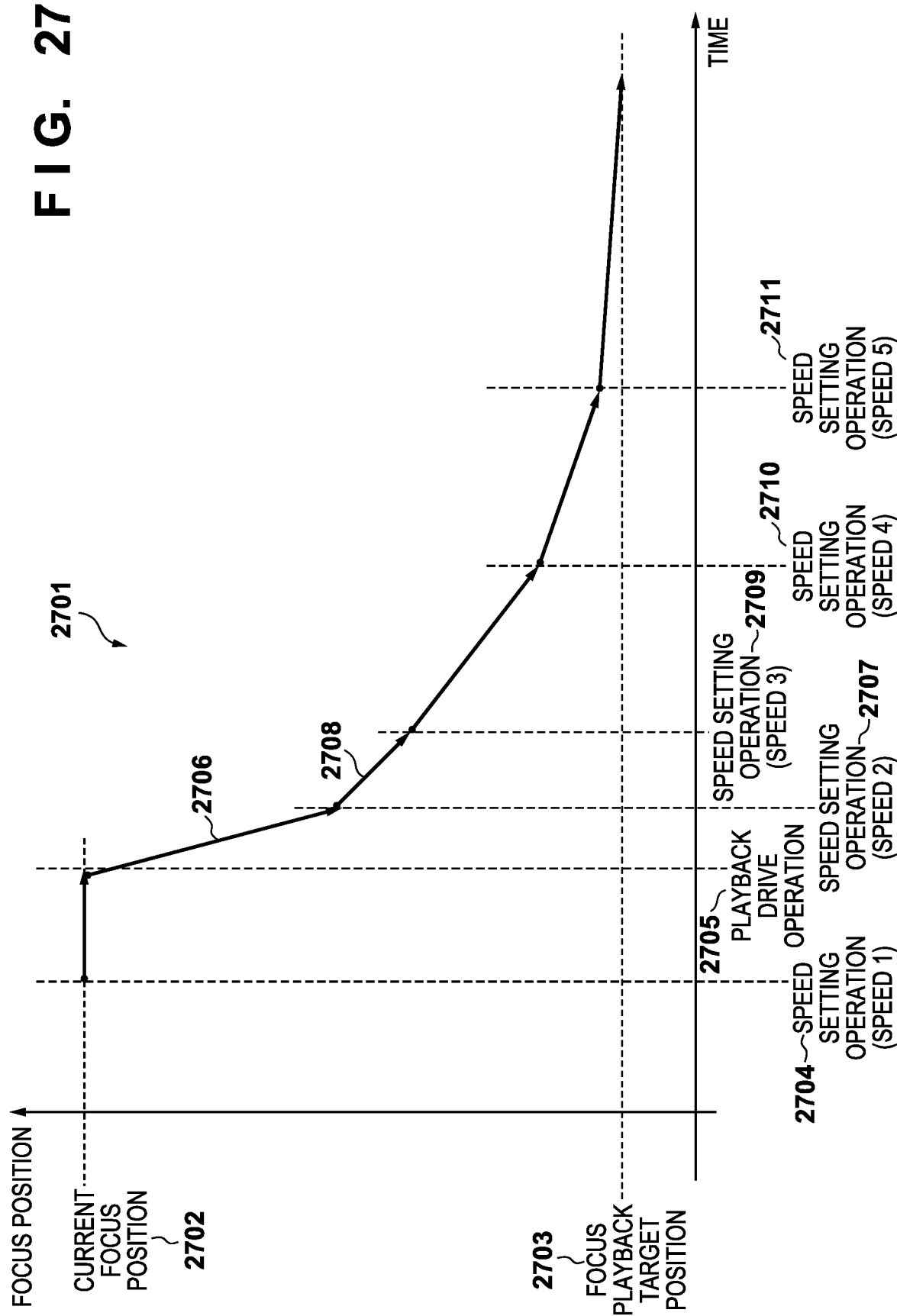

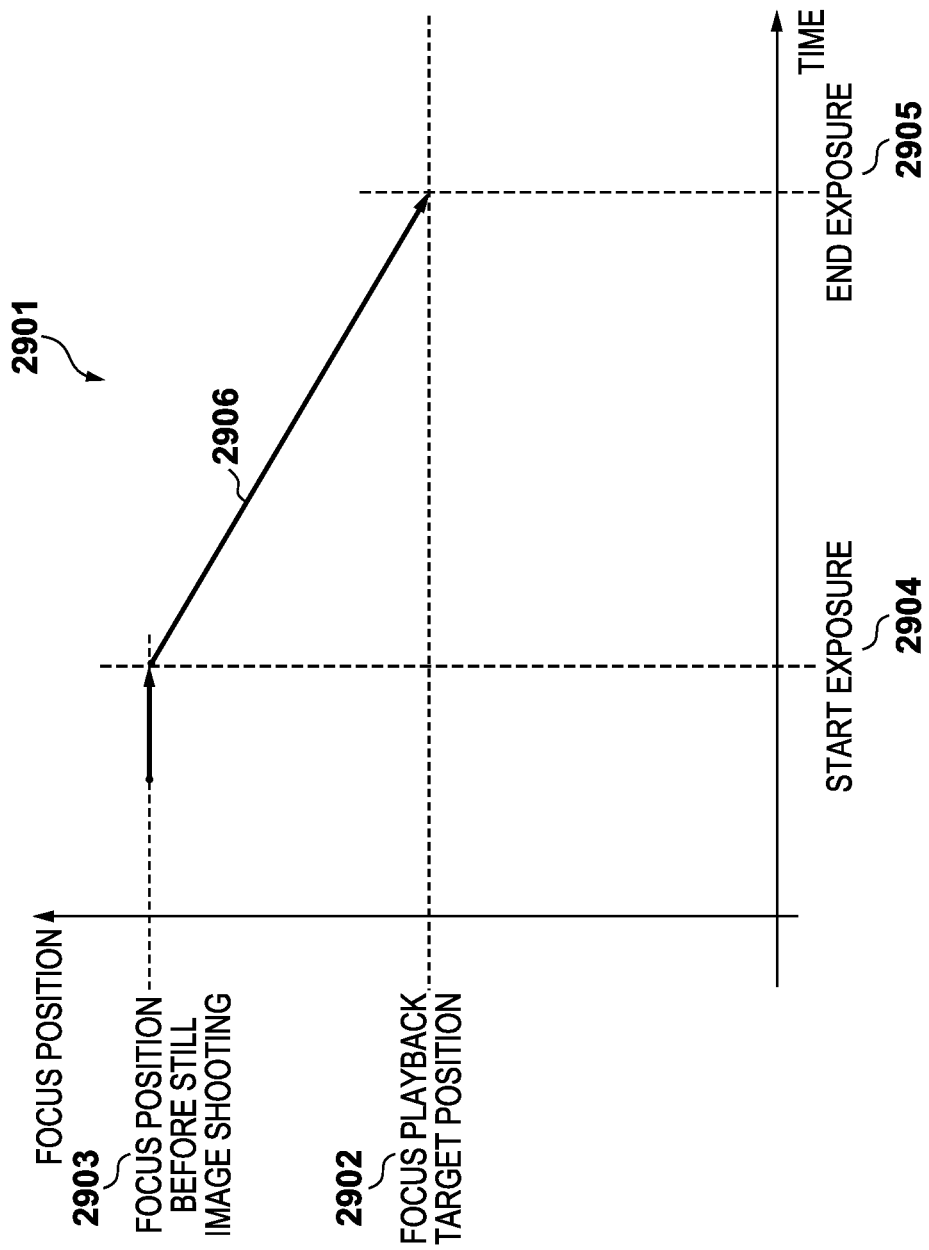

ACCESSORY APPARATUS, CONTROL METHOD, AND STORAGE MEDIUM

BACKGROUND OF THE INVENTION

Field of the Invention

The present invention relates to an accessory apparatus attached between a camera body and an interchangeable lens, as well as to a control method and a storage medium.

Description of the Related Art

In an interchangeable lens camera system, in which an interchangeable lens serving as an accessory apparatus can be attached to an image capturing apparatus (also called a "camera body" hereinafter), the camera body and the interchangeable lens communicate with each other. Such accessory apparatuses include not only interchangeable lenses, but also wide converters, tele converters (extenders) and the like, which change the focal length of the interchangeable lens by attaching at least one such apparatus between the camera body and the interchangeable lens. Mount converters, which change a flange back length to an appropriate length by being attached between an interchangeable lens having a short flange back mount and the camera body, are also known as accessory apparatuses.

Japanese Patent Laid-Open No. 2020-173337 proposes an adapter apparatus which is interposed between a camera body and an interchangeable lens having different communication methods, and which intermediates communication to realize an autofocus (AF) function by controlling focus adjustment using the interchangeable lens. Additionally, Japanese Patent No. 5909860 proposes assisting an AF function when the focus adjustment precision of an interchangeable lens is low by changing the overall length of an adapter apparatus.

According to Japanese Patent Laid-Open No. 2020-173337 and Japanese Patent No. 5909860, an AF function can be assisted by the adapter apparatus. However, no consideration is given to cases where the adapter can be operated by a user.

SUMMARY OF THE INVENTION

The present disclosure has been made in consideration of the aforementioned issues, and provides an accessory apparatus capable of reflecting a user's intentions in an AF function implemented between a camera body and an interchangeable lens.

In order to solve the aforementioned issues, one aspect of the present disclosure provides an accessory apparatus which is removably attached between an image capturing apparatus and an interchangeable lens, the accessory apparatus comprising: one or more processors; and a memory storing instructions which, when the instructions are executed by the one or more processors, cause the accessory apparatus to function as: a communication unit configured to perform first communication with the image capturing apparatus and second communication with the interchangeable lens; an operation unit configured to accept a predetermined operation for operating a predetermined function that assists an autofocus (AF) operation by the image capturing apparatus; and a control unit configured to implement the predetermined function with respect to the AF operation by controlling transmission of a control command to the interchangeable lens through the second communication based on the predetermined operation and the control command for the AF operation accepted from the image capturing apparatus through the first communication, wherein to control the transmission of the control command to the interchangeable lens, the control unit does not transmit a control amount included in the control command and pertaining to focus for the AF operation to the interchangeable lens, or changes the control amount and transmits the control amount changed to the interchangeable lens, in accordance with the predetermined operation.

Another aspect of the present disclosure provides a method of controlling an accessory apparatus which is removably attached between an image capturing apparatus and an interchangeable lens, wherein the accessory apparatus includes a communication unit configured to perform first communication with the image capturing apparatus and second communication with the interchangeable lens, the method comprising: accepting a predetermined operation for operating a predetermined function that assists an autofocus (AF) operation by the image capturing apparatus; and implementing the predetermined function with respect to the AF operation by controlling transmission of a control command to the interchangeable lens through the second communication based on the predetermined operation and the control command for the AF operation accepted from the image capturing apparatus through the first communication, wherein to control the transmission of the control command to the interchangeable lens, in the implementing, a control amount included in the control command and pertaining to focus for the AF operation is not transmitted to the interchangeable lens, or the control amount is changed and transmitted to the interchangeable lens, in accordance with the predetermined operation.

Still another aspect of the present disclosure provides a non-transitory computer-readable storage medium comprising instructions for performing a method of controlling an accessory apparatus which is removably attached between an image capturing apparatus and an interchangeable lens, wherein the accessory apparatus includes a communication unit configured to perform first communication with the image capturing apparatus and second communication with the interchangeable lens, the method comprising: accepting a predetermined operation for operating a predetermined function that assists an autofocus (AF) operation by the image capturing apparatus; and implementing the predetermined function with respect to the AF operation by controlling transmission of a control command to the interchangeable lens through the second communication based on the predetermined operation and the control command for the AF operation accepted from the image capturing apparatus through the first communication, wherein to control the transmission of the control command to the interchangeable lens, in the implementing, a control amount included in the control command and pertaining to focus for the AF operation is not transmitted to the interchangeable lens, or the control amount is changed and transmitted to the interchangeable lens, in accordance with the predetermined operation.

According to the present invention, an accessory apparatus capable of reflecting a user's intentions in an AF function implemented between a camera body and an interchangeable lens can be provided.

Further features of the present invention will become apparent from the following description of exemplary embodiments (with reference to the attached drawings).

BRIEF DESCRIPTION OF THE DRAWINGS

FIGS. 1A and 1B are block diagrams illustrating an example of the configuration of a camera system according to a first embodiment of the present invention.

FIGS. 2A and 2B are diagrams illustrating a communication path of first communication according to the first embodiment.

FIGS. 6A and 6B are diagrams illustrating communication waveforms of a communication method C of the second communication according to the first embodiment.

FIG. 8 is a diagram illustrating a startup sequence of the camera system according to the first embodiment.

FIG. 9 is a diagram illustrating a sequence of an AF stop function of the camera system according to the first embodiment.

FIG. 11 is a diagram illustrating a sequence of an AF drive range change function of the camera system according to a second embodiment.

FIG. 14 is a diagram illustrating a sequence of an AF speed setting function of the camera system according to a third embodiment.

FIG. 16 is a diagram illustrating a sequence of a focus fine-tuning function of the camera system according to a fourth embodiment.

FIG. 26 is a diagram illustrating focus operations when the focus position is stored and the playback operations are performed, according to the sixth embodiment.

FIG. 27 is a diagram illustrating focus operations when a speed setting of the intermediate adapter is switched during focus playback driving, according to the sixth embodiment.

FIG. 29 is a diagram illustrating focus operations in inter-exposure focus driving when shooting a still image, according to the seventh embodiment.

DESCRIPTION OF THE EMBODIMENTS

First Embodiment

Figure 1A:
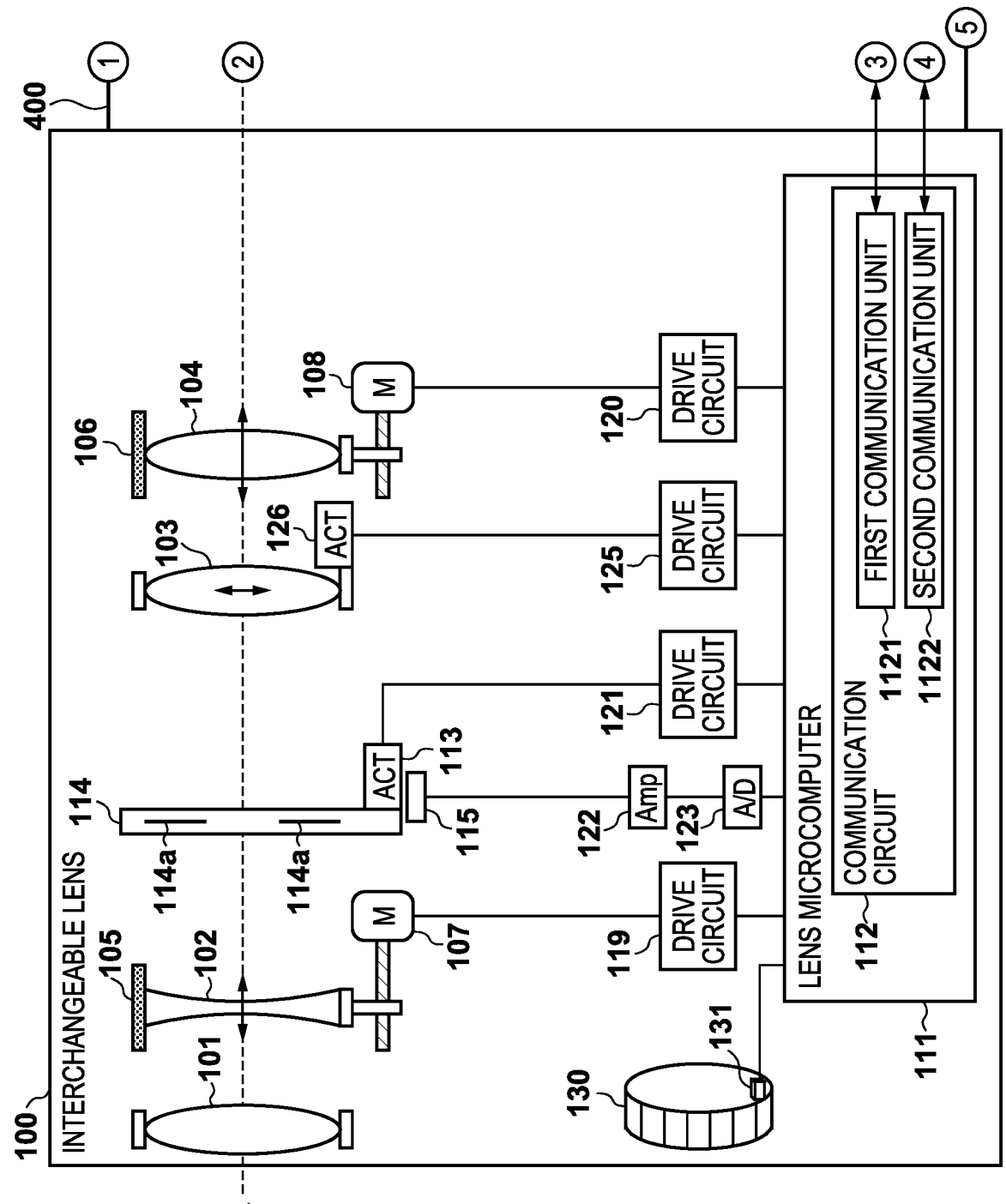

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Camera System Configuration

FIGS. 1A and 1B illustrate an example of the functional configuration of an image capturing system (called a "camera system") that includes a camera body 200 as an example of an image capturing apparatus, an interchangeable lens 100, and an adapter apparatus (called an "intermediate adapter" or simply an "adapter") 300 as an example of an accessory apparatus, according to the present embodiment. The camera body 200 of the present embodiment can be used with both the interchangeable lens 100 and the intermediate adapter 300 attached. The example illustrated in FIGS. 1A and 1B illustrate a camera system in which one intermediate adapter 300 is attached between the camera body 200 and the interchangeable lens 100. However, a plurality of adapters may be connected and attached between the camera body 200 and the interchangeable lens 100.

Note that one or more of the function blocks illustrated in FIGS. 1A and 1B may be implemented by hardware such as an ASIC or a programmable logic array (PLA), or may be implemented by software executed by a processor such as a CPU or an MPU. The function blocks may also be realized as a combination of software and hardware.

In the camera system of the present embodiment, a plurality of communication methods are used for communication between the camera body 200, the interchangeable lens 100, and the intermediate adapter 300. The camera body 200, the interchangeable lens 100, and the intermediate adapter 300 transmit control commands, data (information), and the like through corresponding communication circuits 112, 208, and 303. Specifically, the camera system of the present embodiment has a path for communication through first communication units 1121, 2081, and 3031 of the camera body 200, the interchangeable lens 100, and the intermediate adapter 300. The camera system also has a path for communication through second communication units 1122, 2082, and 3032 of the camera body 200, the interchangeable lens 100, and the intermediate adapter 300. The first communication units 1121, 2081, and 3031 and the second communication units 1122, 2082, and 3032 support a plurality of communication methods. These communication units can select the optimal communication method for various situations by synchronizing with each other and switching to the same communication method according to the type of data to be communicated, the purpose of communication, and the like. Note that the communication methods, the communication circuits, and the communication paths are not limited to those described in the present embodiment, and may be in different forms as long as the camera body 200, the interchangeable lens 100, and the intermediate adapter 300 can communicate with each other. For example, the communication path can be either the first communication units or the second communication units.

First, the configurations of the interchangeable lens 100, the camera body 200, and the intermediate adapter 300 will be described in more detail. The interchangeable lens 100 and the intermediate adapter 300 are mechanically and electrically connected through a mount 400, which is a coupling mechanism. Likewise, the intermediate adapter 300 and the camera body 200 are mechanically and electrically connected through a mount 401, which is a coupling mechanism. Note that the mount 400 is schematically illustrated as a mount provided in the interchangeable lens 100 and a mount provided in the intermediate adapter 300 being coupled, with these mounts being capable of being attached to and detached from each other. Likewise, the mount 401 is schematically illustrated as a mount provided in the intermediate adapter 300 and a mount provided in the camera body 200 being coupled, with these mounts being capable of being attached to and detached from each other.

Mount faces of the mounts provided in each of the interchangeable lens 100, the intermediate adapter 300, and the camera body 200 are provided with communication terminals, which will be described below. When units are connected through a mount, such as the mount 400 or the mount 401, the corresponding communication terminals make contact with each other. This enables the interchangeable lens 100, the camera body 200, and the intermediate adapter 300 to communicate with each other through the communication terminals (described below) provided in the mounts 400 and 401.

The interchangeable lens 100 and the intermediate adapter 300 obtain power from the camera body 200 through power terminals (not shown) provided in the mounts 400 and 401. The interchangeable lens 100 and the intermediate adapter 300 then supply power necessary for operations to various actuators which will be described below, as well as to a lens microcomputer 111 and an adapter microcomputer 302.

The interchangeable lens 100 includes an imaging optical system. The imaging optical system includes, in order from a subject 150 side to an intermediate adapter 300 side, a field lens 101, a zoom lens 102, an aperture unit 114, an anti-vibration lens 103, and a focus lens 104 that adjusts the focus. The zoom lens 102 magnifies a subject image, and the aperture unit 114 adjusts the amount of light received by an image sensor 201. The anti-vibration lens 103 reduces image blur caused by camera shake (e.g., hand shake) by shifting in a direction orthogonal to the optical axis of the imaging optical system.

The zoom lens 102 and the focus lens 104 are held by lens holding frames 105 and 106, respectively. The lens holding frames 105 and 106 are guided so as to be mobile in an optical axis direction (indicated by broken lines in the drawing) by a guide shaft (not shown). The lens holding frames 105 and 106 are then driven in the optical axis direction by stepping motors 107 and 108. The stepping motors 107 and 108 move the zoom lens 102 and the focus lens 104, respectively, in synchronization with drive pulses.

The lens microcomputer 111 is a lens control unit that controls the operations of each unit in the interchangeable lens 100. The lens microcomputer 111 may control the operations of each unit in the interchangeable lens 100 by executing programs, for example. The lens microcomputer 111 receives control commands, transmission request commands, and the like transmitted from the camera body 200 or the intermediate adapter 300 through a lens communication circuit 112. The lens microcomputer 111 performs lens control corresponding to the control commands, and transmits lens data corresponding to the transmission request commands to the camera body 200 or the intermediate adapter 300 through the lens communication circuit 112. The lens microcomputer 111 also drives the stepping motors 107 and 108 by outputting drive signals to a zoom drive circuit 119 and a focus drive circuit in response to commands, among the control commands, which are related to magnification, focusing, and the like. As a result, zoom processing, which controls magnification operations by the zoom lens 102, and AF (autofocus) processing, which controls focus adjustment operations by the focus lens 104, are performed.

The aperture unit 114 includes aperture blades 114a and 114b. The state (position) of the aperture blades 114a and 114b is detected by a Hall device 115. Output from the Hall device 115 is input to the lens microcomputer 111 through an amplification circuit 122 and an A/D conversion circuit 123. The lens microcomputer 111 drives an aperture actuator 113 by outputting a drive signal to an aperture drive circuit 121 based on an input signal from the A/D conversion circuit 123. Light amount adjustment operations by the aperture unit 114 are controlled as a result.

Furthermore, the lens microcomputer 111 drives an anti-vibration actuator 126 through an anti-vibration drive circuit 125 in response to camera shake detected by a vibration sensor such as a vibration gyro or the like (not shown) provided in the interchangeable lens 100. The anti-vibration actuator 126 includes, for example, a voice coil motor or the like. As a result, anti-vibration processing that controls shift operations (anti-vibration operations) of the anti-vibration lens 103 is performed.

The interchangeable lens 100 also includes a manual control ring (what is known as an "electronic ring") 130, which can be rotationally manipulated by the user, and a ring rotation detector 131. The ring rotation detector 131 is constituted by, for example, a photointerrupter that outputs a two-phase signal in response to the rotation of the manual control ring 130. The lens microcomputer 111 can detect a rotational operation amount (including the direction) of the manual control ring 130 using the two-phase signal output from the ring rotation detector 131.

The intermediate adapter 300 is, for example, an extender for changing the focal length, and includes a zoom lens 301 and an adapter microcomputer 302. Although the present embodiment describes a case where the intermediate adapter 300 is an extender as an example, the intermediate adapter 300 may also be a wide converter that changes the focal length, a mount converter that changes a flange back length, or the like.

The adapter microcomputer 302 is an adapter control unit that controls the operations of each unit in intermediate adapter 300. The adapter control unit may also be referred to as an "accessory control unit" or a "communication control unit". The adapter microcomputer 302 may control the operations of at least some of the units in the intermediate adapter 300 by executing a program. The adapter microcomputer 302 receives control commands, transmission request commands, and the like transmitted from the camera body 200 through an adapter communication circuit 303. Upon receiving a control command for the intermediate adapter 300 from the camera body 200, the adapter microcomputer 302 performs adapter control corresponding to the control command. Additionally, upon receiving a transmission request command from the camera body 200, the adapter microcomputer 302 transmits adapter data corresponding to the transmission request command to the camera body 200 through the adapter communication circuit 303.

Additionally, upon receiving a command for the interchangeable lens 100, the adapter microcomputer 302 performs communication conversion processing as necessary and then transmits a control command, a transmission request command, or the like to the interchangeable lens 100 through the adapter communication circuit 303 as necessary. Furthermore, the adapter microcomputer 302 transmits control commands, transmission request commands, and the like to the interchangeable lens 100 through the adapter communication circuit 303 as necessary, based on operations of an adapter operation unit 320 and the like (described below).

The adapter microcomputer 302 receives the lens data, which corresponds to the transmission request command made to the interchangeable lens 100, from the interchangeable lens 100 through the adapter communication circuit 303. In this case, the adapter microcomputer 302 transmits the lens data to the camera body 200 through the adapter communication circuit 303 as necessary after performing the communication conversion processing as necessary.

Like the interchangeable lens 100, the intermediate adapter 300 includes an adapter control ring (what is known as an "electronic ring") 310, serving as an operation member which can be rotationally manipulated by the user, and a ring rotation detector 311. Like the ring rotation detector 131 of the interchangeable lens 100, the ring rotation detector 311 is constituted by, for example, a photointerrupter that outputs a two-phase signal in response to the rotation of the adapter control ring 310. The adapter microcomputer 302 can detect a rotational operation amount (including the direction) of the adapter control ring 310 using the two-phase signal output from the ring rotation detector 311.

Furthermore, the intermediate adapter 300 includes the adapter operation unit 320 aside from the adapter control ring 310. The operation members of the adapter operation unit 320 may include one or more operation members, such as switches, buttons, a touch panel, or the like.

The intermediate adapter 300 also includes an adapter notification unit 330 for notifying the user of information. Notification members provided in the adapter notification unit 330 are LEDs, LCDs (liquid crystal displays), speakers, vibrators, and the like, and one or more notification members may be provided.

The intermediate adapter 300 also includes an adapter storage unit 340 for storing information. The adapter storage unit 340 may be, for example, non-volatile memory. The adapter storage unit 340 stores information such as focus playback target position information for focus position playback driving, information communicated between the camera body 200 and the interchangeable lens 100 for warning determinations, and the like. Each instance of information stored in the adapter storage unit 340 will be described below.

The camera body 200 includes the image sensor 201, which is a CCD sensor, a CMOS sensor, or the like; an A/D conversion circuit 202; a signal processing circuit 203; a recording unit 204; a camera microcomputer 205; and a display unit 206.

The image sensor 201 photoelectrically converts the subject image formed by the imaging optical system in the interchangeable lens 100 and outputs an electrical signal (an analog signal). The A/D conversion circuit 202 converts the analog signal from the image sensor 201 into a digital signal. The signal processing circuit 203 generates a video signal by performing various types of image processing on the digital signal from the A/D conversion circuit 202. The signal processing circuit 203 also generates focus information indicating a contrast state of the subject image (a focus state of the imaging optical system), luminance information indicating an exposure state, and the like from the video signal. The signal processing circuit 203 outputs the video signal to the display unit 206, and the display unit 206 displays the video signal as a live view image used to check the composition, the focus state, and the like.

The camera microcomputer 205, which serves as a camera control unit, controls the camera body 200 in response to inputs from an operation member 207, which is an image capture instruction switch, various setting switches, and the like. The camera microcomputer 205 transmits control commands, transmission request commands, and the like to the interchangeable lens 100 or the intermediate adapter 300 as necessary through a camera communication circuit 208. The camera microcomputer 205 also receives the lens data or the adapter data from the interchangeable lens 100 or the intermediate adapter 300. For example, the camera microcomputer 205 transmits control commands related to focus adjustment operations to the interchangeable lens 100 according to the focus information generated by the signal processing circuit 203. The camera microcomputer 205, for example, transmits, to the interchangeable lens 100, a transmission request command for obtaining lens data related to the focus adjustment operations, and also receives lens data related to the focus adjustment operations from the interchangeable lens 100.

Communication Path of First Communication

Communication paths configured between the camera first communication unit 2081 of the camera microcomputer 205, the adapter first communication unit 3031 of the adapter microcomputer 302, and the lens first communication unit 1121 of the lens microcomputer 111 in the present embodiment will be described next with reference to FIGS. 2A and 2B. In the following descriptions, the communication performed in these communication paths is also referred to as "first communication".

FIG. 2A illustrates an example of the communication paths for the first communication. The adapter first communication unit 3031 and the lens first communication unit 1121 communicate over signal lines that are connected through the communication terminals provided in the mount 400. The communication terminals provided in the mount 400 include LCLK 11211, DCL 11212, DLC 11213, LCLK 30311, DCL 30312, and DLC 30313. The adapter first communication unit 3031 and the camera first communication unit 2081 communicate over signal lines that are connected through the communication terminals provided in the mount 401. The communication terminals provided in the mount 401 include RTS 30314, DCL 30315, DLC 30316, RTS 20811, DCL 20812, and DLC 20813. In the present embodiment, the adapter first communication unit 3031 and the lens first communication unit 1121 communicate using communication method A (described later), which is a three-line clock synchronous serial communication method. On the other hand, the adapter first communication unit 3031 and the camera first communication unit 2081 communicate using communication method B (described later), which is a three-line start-stop synchronous serial communication method and is different from communication method A.

FIG. 2B illustrates an example of a different embodiment of the communication path of the first communication from that illustrated in FIG. 2A. The adapter first communication unit 3031 and the lens first communication unit 1121 communicate using signal lines that are connected through the communication terminals provided in the mount 400. In this embodiment, the communication terminals provided in the mount 400 include RTS 11214, DCL 11215, DLC 11216, RTS 30317, DCL 30318, and DLC 30319. The adapter first communication unit 3031 and the camera first communication unit 2081 communicate using the same signal lines as in FIG. 2A, which are connected through the communication terminals provided in the mount 401. The communication terminals provided in the mount 401 include RTS 30314, DCL 30315, DLC 30316, RTS 20811, DCL 20812, and DLC 20813. In the example illustrated in FIG. 2B, the adapter first communication unit 3031 and the lens first communication unit 1121, and the adapter first communication unit 3031 and the camera first communication unit 2081, both communicate using communication method B, which is a three-line start-stop synchronous serial communication method. Note that the combination of communication paths and communication methods is not limited to these examples, and other combinations may be used. For example, the adapter first communication unit 3031 and the lens first communication unit 1121, and the adapter first communication unit 3031 and the camera first communication unit 2081, may both communicate using communication method A.

Communication Waveforms of Communication Method A in First Communication

Communication method A, which is a three-line clock synchronous serial communication method for the first communication according to the present embodiment, will be described with reference to the communication waveforms illustrated in FIGS. 3A to 3C. Communication method A is a communication method implemented between a communication main, which transmits control commands, data transmission request commands, and the like, and a communication sub, which transmits data in response to the data transmission request commands. In the embodiment illustrated in FIG. 2A, the adapter first communication unit 3031 acts as the communication main, the lens first communication unit 1121 acts as the communication sub, and the two communicate.

A clock signal LCLK is mainly used for a data synchronization clock signal from the communication main to the communication sub. A communication signal DCL is used to transmit data such as control commands, data transmission request commands, and the like from the communication main to the communication sub. A data signal DLC is used to transmit data transmitted from the communication sub to the communication main. In communication method A, the communication is performed in a full-duplex communication system (full duplex system) in which the communication main and the communication sub mutually and simultaneously transmit and receive in synchronization with the common clock signal LCLK.

Figure 3A:
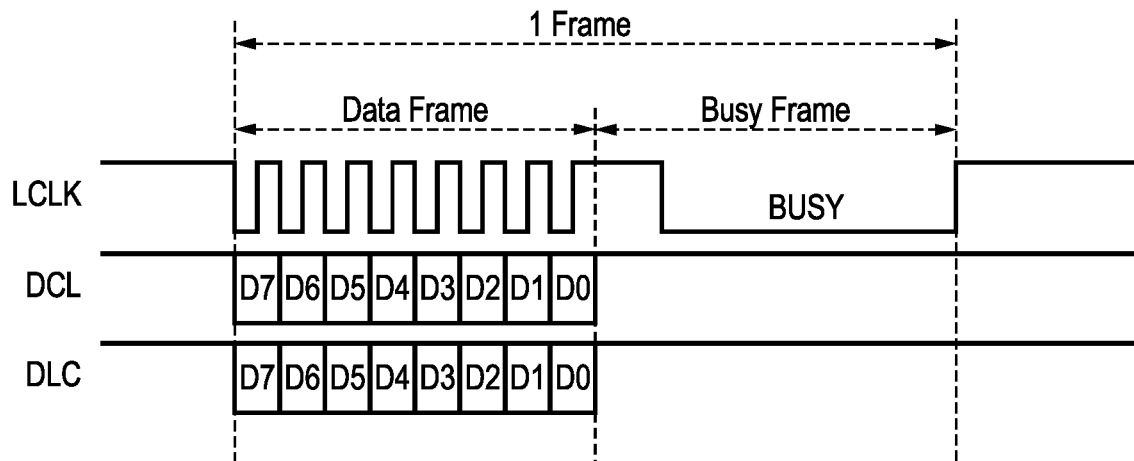
FIGS. 3A to 3C are diagrams illustrating communication waveforms of a communication method A of the first communication according to the first embodiment.

FIG. 3A illustrates the waveforms of communication signals in one frame, which is the smallest unit of communication. The communication main outputs the clock signal LCLK, which is a set of eight periods of pulses, and also transmits the communication signal DCL to the communication sub in synchronization with the clock signal LCLK. At the same time, the communication main receives the data signal DLC output from the communication sub in synchronization with the clock signal LCLK. In this manner, one byte (eight bits) of data is transmitted and received between the communication main and the communication sub in synchronization with the set in the clock signal LCLK. This period of transmission and reception of one byte of data is called a "data frame". After the data frame, a communication pause period is inserted by communication wait request information (called simply a "communication wait request" hereinafter) BUSY, of which the communication main is notified by the communication sub. This communication pause period is called a "BUSY frame". A unit of communication constituted by a set including a data frame and a BUSY frame is called "one frame".

Figure 3B:
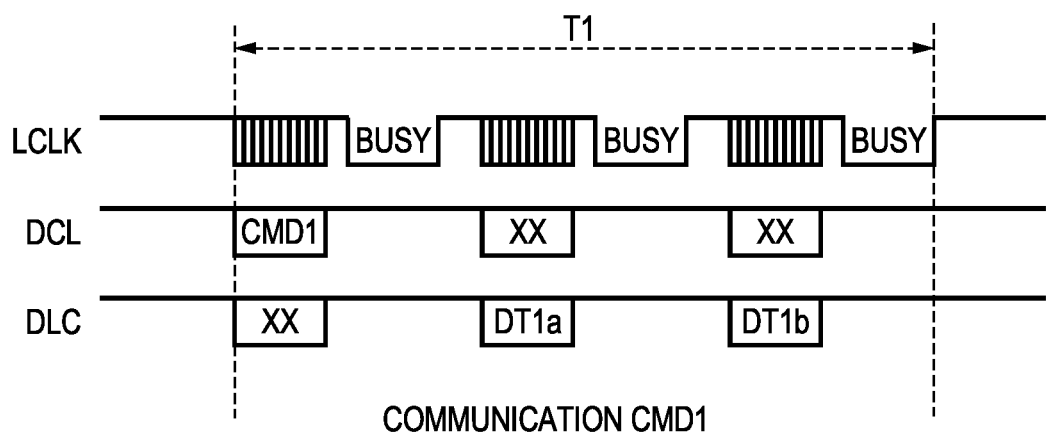

FIG. 3B illustrates the waveforms of communication signals constituted by three frames. In FIG. 3B, during a period (T1) of three frames, the communication main transmits a command CMD1 to the communication sub and receives two-byte data DT1a and DT1b corresponding to that command from the communication sub. The type and number of bytes of data DT corresponding to each command CMD are determined in advance between the communication main and the communication sub. In the first frame, after transmitting the clock signal LCLK, the communication main transmits, as the communication signal DCL, the command CMD1 corresponding to the data DT1a and DT1b requested to be transmitted. The data signal DLC in this frame is treated as invalid data.

The communication main then outputs the clock signal LCLK for eight periods and then switches the communication terminal state on the communication main side from an output format to an input format. The communication sub switches the communication terminal state on the communication sub side from the input format to the output format after the communication terminal state on the communication main side has been switched. The communication sub then sets the signal level of the clock signal LCLK to LOW to notify the communication main of the communication wait request BUSY. The communication main keeps the communication terminal state in the input format during the notification period of the communication wait request BUSY, and pauses communication to the communication sub.

The communication sub generates the data DT1a corresponding to the command CMD1 during the notification period of the communication wait request BUSY. After preparation for transmission of the data signal DLC in the next frame is complete, the communication sub sets the signal level of the clock signal LCLK to HIGH to notify the communication main that the communication wait request BUSY is canceled. Upon recognizing that the communication wait request BUSY has been canceled, the communication main receives the data DT1a from the communication sub by transmitting one frame of the clock signal LCLK to the communication sub. The communication main receives the data DT1b thereafter in the same manner.

Figure 3C:
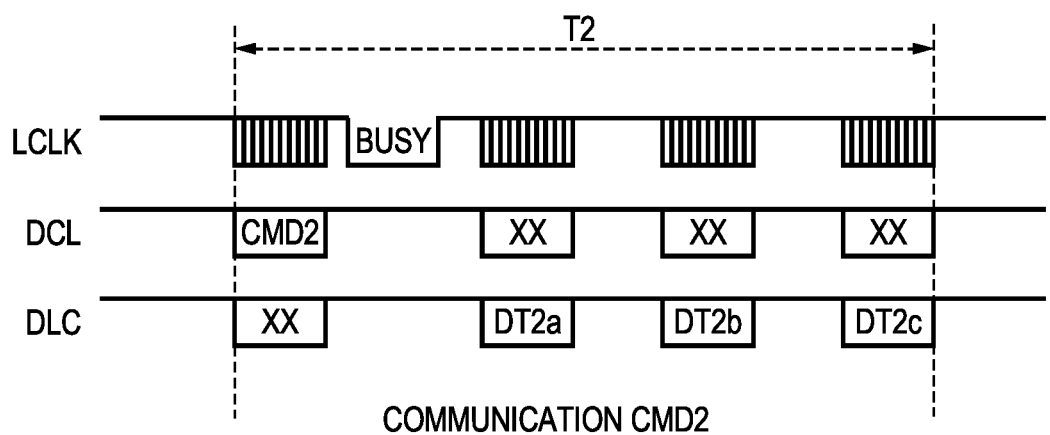

FIG. 3C illustrates the waveforms of communication signals constituted by four frames. In FIG. 3C, during a period (T2) of four frames, the communication main transmits a command CMD2 to the communication sub and receives three-byte lens data DT2a, DT2b, and DT2c corresponding to that command from the communication sub. The communication sub notifies the communication main of the communication wait request BUSY in the first frame, but does not notify the communication main of the communication wait request BUSY in the second to fourth frames. This makes it possible to shorten the time between frames.

Communication Waveforms of Communication Method B in First Communication

Communication method B, which is a three-line start-stop synchronous serial communication method for the first communication according to the present embodiment, will be described with reference to the communication waveforms illustrated in FIGS. 4A to 4C. Communication method B is a communication method implemented between the communication main, which transmits control commands, data transmission request commands, and the like, and the communication sub, which transmits data in response to the data transmission request commands. In the embodiment illustrated in FIG. 2A, the camera first communication unit 2081 acts as the communication main, the adapter first communication unit 3031 acts as the communication sub, and the two communicate. Additionally, in the embodiment illustrated in FIG. 2B, the camera body 200 and the intermediate adapter 300 communicate with each other with the camera first communication unit 2081 acting as the communication main and the adapter first communication unit 3031 acting as the communication sub. The intermediate adapter 300 and the interchangeable lens 100 communicate with each other with the adapter first communication unit 3031 acting as the communication main and the lens first communication unit 1121 acting as the communication sub.

A communication request signal RTS is used to indicate the start timing of transmission and reception from the communication main to the communication sub. The communication signal DCL is used to transmit data such as control commands, data transmission request commands, and the like from the communication main to the communication sub. The data signal DLC is used to transmit data from the communication sub to the communication main.

In communication method B, the communication main and the communication sub do not transmit and receive data in synchronization with a common clock signal as in communication method A, but rather transmit and receive data at a pre-defined communication bit rate. "Communication bit rate" refers to the amount of data that can be transferred in one second, expressed in bits per second (bps). The communication main and the communication sub communicate with each other using a full-duplex communication system (full duplex system), in which transmission and reception are performed mutually and simultaneously.

Figure 4A:
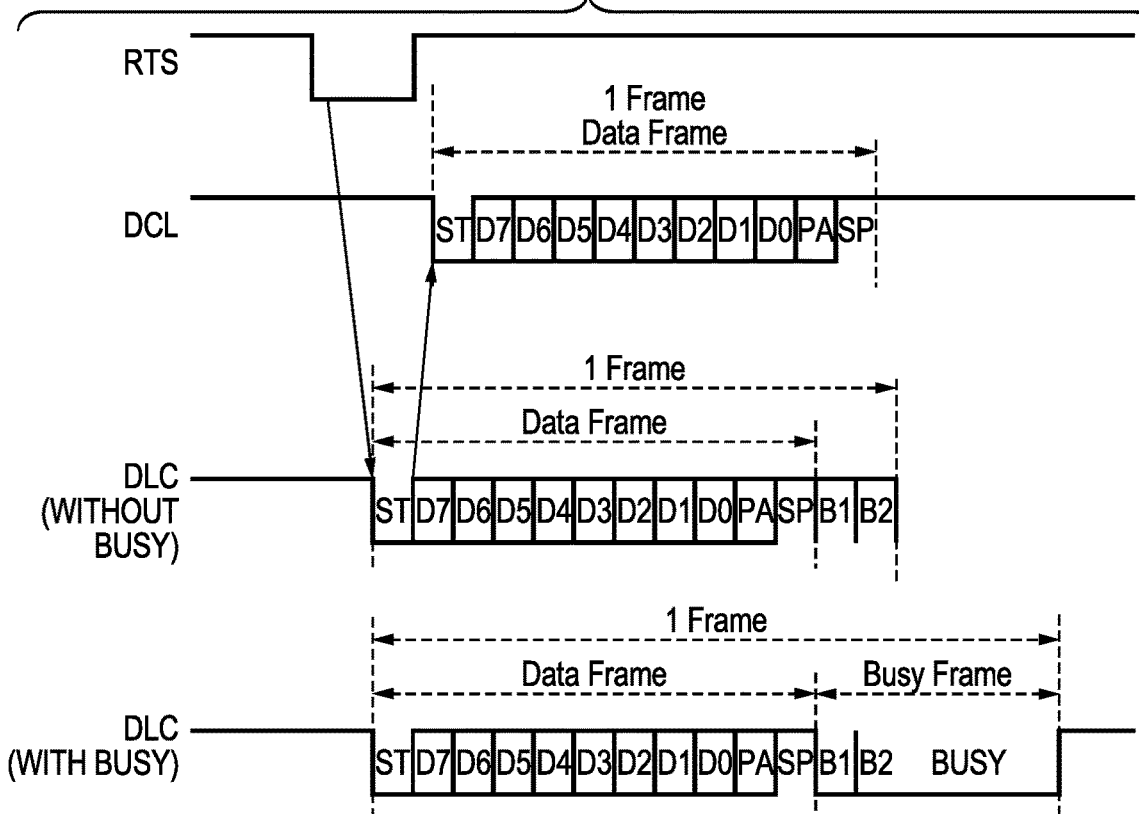
FIGS. 4A to 4C are diagrams illustrating communication waveforms of a communication method B of the first communication according to the first embodiment.
Figure 4B:
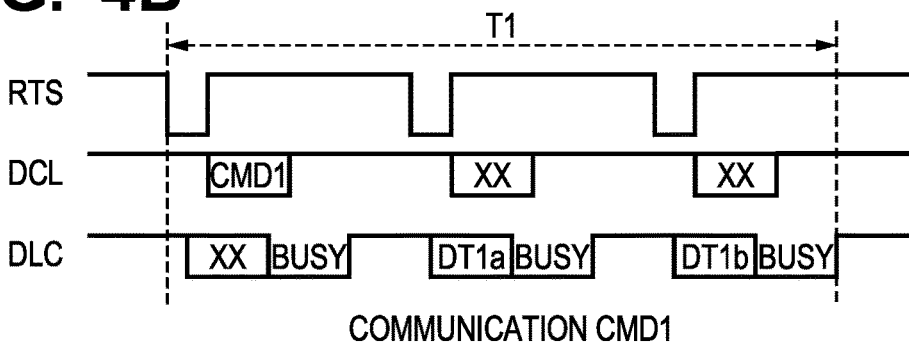
Figure 4C:
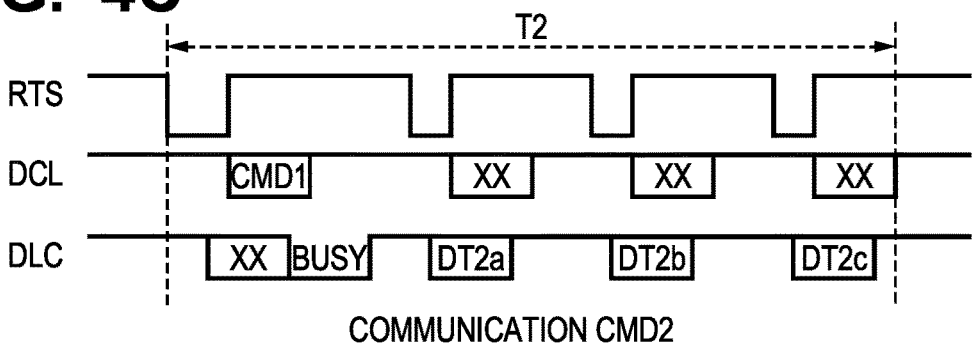

FIG. 4A illustrates the waveforms of communication signals in one frame, which is the smallest unit of communication, in communication method B. When no data is being transmitted or received, the communication request signal RTS is HIGH. When the communication main sets the communication request signal RTS to LOW level, data transmission and reception are started. Upon detecting that the communication request signal RTS has changed to LOW level, the communication sub starts data output on the data signal DLC. Furthermore, upon detecting that the data signal DLC outputs a start bit ST, the communication main starts data output on the data signal DLC.

The data format of the data signal DLC will be described in more detail. One frame of the DLC is constituted by the first half of a data frame and a BUSY frame following thereafter. In a non-transmitting state, in which no data is being transmitted, the signal level is HIGH. The communication sub notifies the communication main of the start of transmission of the data signal DLC for one frame by setting the signal level to LOW level for a one-bit period. This one-bit period is called the "start bit ST", and the data frame is started from this bit. The communication sub then transmits one byte of data in the eight-bit period from the second to the ninth bit. The data bit sequence is in MSB-first format, starting with the most significant data D7, followed by data D6 and D5 in sequence, and ending with the least significant data D0. One bit of parity PA information is added to the 10th bit. By setting the signal level to HIGH during the period of a stop bit SP, which indicates the end of one frame, the data frame started from the start bit ST is completed. A BUSY frame is added after the stop bit SP. The BUSY frame period is the period during which the communication sub notifies the communication main of the communication wait request BUSY. As indicated by "DLC (with BUSY)" in the drawing, the signal level is LOW until the communication wait request BUSY is canceled. When there is no need for the communication sub to make a notification of the communication wait request BUSY, a data format that constitutes one frame without a BUSY frame is also defined, as indicated by "DLC (no BUSY)" in the drawing. In other words, as the data format of the data signal DLC, it is possible to select whether to make a notification of the communication wait request BUSY or not depending on the processing status of the communication sub.

A method for identifying the presence or absence of the communication wait request BUSY performed by the communication main will be described here. The communication main defines one of bit positions B1 and B2 in the waveforms of DLC (no BUSY) and DLC (with BUSY) in the drawing as a specified position P that identifies the presence or absence of the communication wait request BUSY. Selecting the specified position P from the bit positions B1 and B2 makes it possible to solve a problem in which, depending on the processing performance of the communication sub, there are different processing times until the signal level goes LOW to make the notification of the communication wait request BUSY after the data frame of the data signal DLC has passed. Which of the bit positions B1 and B2 is to be used as the specified position P is to be determined in advance by communication between the communication main and the communication sub. Note that the specified position P need not be selected from as one of the bit positions B1 and B2, and may instead may be selected from an even later bit position according to the processing capabilities of both microcomputers.

The BUSY frame being added to the data signal DLC in communication method B will be described next as a supplement to the BUSY frame. In communication method A, the BUSY frame is added to the clock signal LCLK. In communication method A, the clock signal LCLK output by the communication main and the communication wait request BUSY for which a notification is made by the communication sub are communicated using the same signal line. Therefore, collisions between the outputs of the communication main and communication sub are prevented by allocating available output periods on a time-division basis. To ensure that outputs do not collide with each other, an output prohibition period, during which both outputs are prohibited, is inserted between the time when the communication main completes output of the clock signal LCLK and the time when the communication sub is permitted to output the communication wait request BUSY. However, inserting an output prohibition period during which communication is not possible reduces the effective communication speed. In communication method B, this problem does not occur because the BUSY frame is added to the data signal DLC, which is a dedicated output signal for the communication sub.

The data format of the communication signal DCL will be described below. Because the communication signal DCL and the data signal DLC share the same data frame specifications from ST to B2, detailed descriptions will not be given. Unlike the data signal DLC, adding a BUSY frame to the communication signal DCL is prohibited. FIG. 4B illustrates the waveforms, corresponding to those in FIG. 3B, in communication method B. That is, during a period (T1) of three frames, the communication main transmits the command CMD1 to the communication sub and receives two-byte data DT1a and DT1b corresponding to that command from the communication sub. FIG. 4C illustrates the waveforms, corresponding to those in FIG. 3C, in communication method B. That is, this drawing illustrates the waveforms occurring when, during a period (T2) of four frames, the communication main transmits a command CMD2 to the communication sub and receives three-byte lens data DT2a, DT2b, and DT2c corresponding to that command from the communication sub.

Communication Path of Second Communication

Figure 5:
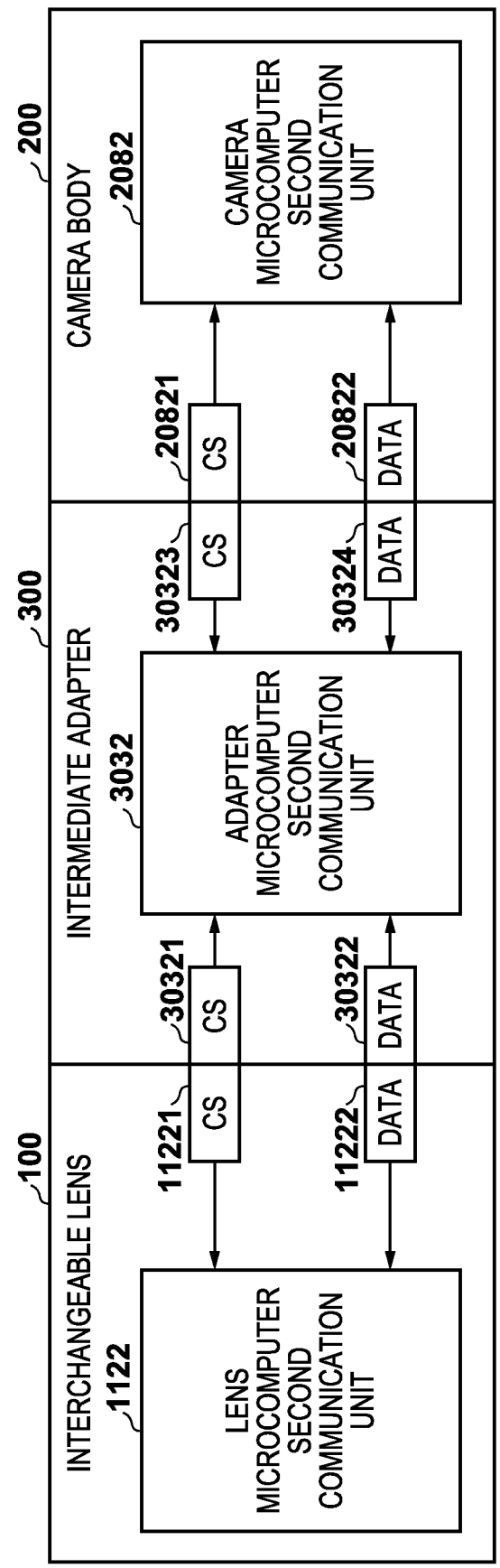
FIG. 5 is a diagram illustrating a communication path of second communication according to the first embodiment.

The communication path of the second communication will be described next with reference to FIG. 5. A second communication path is configured among the camera second communication unit 2082 provided in the camera microcomputer 205, the adapter second communication unit 3032 provided in the adapter microcomputer 302, and the lens second communication unit 1122 provided in the lens microcomputer 111 in the present embodiment. The communication performed over this communication path is also called "second communication".

The adapter second communication unit 3032 and the lens second communication unit 1122 communicate using signal lines that are connected through the communication terminals provided in the mount 400. The communication terminals provided in the mount 400 include CS 11221, DATA 11222, CS 30321, and DATA 30322. The adapter second communication unit 3032 and the camera second communication unit 2082 communicate using signal lines that are connected through the communication terminals provided in the mount 401. The communication terminals provided in the mount 401 include CS 30323, DATA 30324, CS 20821, and DATA 20822. In the present embodiment, the adapter second communication unit 3032 and the lens second communication unit 1122, and the adapter second communication unit 3032 and the camera second communication unit 2082, both communicate using communication method C, which is a two-line start-stop synchronous serial communication method. Communication method C will be described below.

Note that the foregoing is merely an example of an embodiment for the communication path of the second communication, and the combination of communication path and communication method is not limited thereto, and may be another combination instead. For example, the adapter second communication unit 3032 and the lens second communication unit 1122 may communicate using communication method C, while the adapter second communication unit 3032 and the camera second communication unit 2082 may communicate using communication method A.

Communication Waveforms of Second Communication

Communication method C, which is a two-line start-stop synchronous serial communication method for the second communication according to the present embodiment, will be described with reference to the communication waveforms illustrated in FIGS. 6A and 6B. Communication method C is a communication method implemented between a communication main, which transmits control commands, data transmission request commands, and the like, and one or more communication subs that transmit data in response to the data transmission request commands. In the communication between the camera second communication unit 2082 and the adapter second communication unit 3032 illustrated in FIG. 5, the camera second communication unit 2082 is the communication main and the adapter second communication unit 3032 is the communication sub. In the communication between the adapter second communication unit 3032 and the lens second communication unit 1122, the adapter second communication unit 3032 is the communication main and the lens second communication unit 1122 is the communication sub.

In contrast to communication method A and communication method B, which are one-to-one communication between a communication main and a communication sub, communication method C is one-to-many communication in which a communication main and a plurality of communication subs can communicate. Thus, for example, another adapter second communication unit (not shown) may be connected between the camera second communication unit 2082 and the adapter second communication unit 3032. In this case, the camera second communication unit 2082 can communicate with both adapter second communication units.

Communication method C implements one-to-many communication by switching between a broadcast communication mode and a P2P communication mode. The broadcast communication mode is a mode in which data is transmitted from the communication main to all connected communication subs at the same time. The P2P communication mode is a mode in which data is transmitted and received between the communication main and any one of the connected communication subs.

In the broadcast communication mode, a control signal CS is used to indicate the start timing of transmission and reception from the communication main to the communication sub. Additionally, a communication signal DATA is used to transmit data such as control commands, data transmission request commands, and the like from the communication main to the communication sub.

In the P2P mode, the control signal CS is used for a data reception completion notification between the communication main and communication sub. The communication signal DATA is then used for data transmission, such as control commands, data transmission request commands, and the like, from the communication main to the communication sub, as well as for data transmission from the communication sub to the communication main.

In communication method C, transmission and reception are performed at a pre-defined communication bit rate, as in communication method B. The communication main and communication sub communicate using a half-duplex communication method (half-duplex method), which uses a single data signal line for bidirectional communication by switching between transmission and reception in an alternating manner.

FIG. 6A illustrates the communication waveform of the communication signal DATA in one frame, which is the smallest unit of communication, in communication method C. The communication data format of communication method C will be described with reference to FIG. 6A. The communication data format is the same for broadcast communication and P2P communication. This section will describe the communication data format in the case of what is known as "start-stop synchronous communication", in which the communication speed to be used for communication is established in advance and data is transmitted and received at a communication bit rate according to that speed.

First, in a non-transmitting state, in which no data is being transmitted, the signal level is kept at HIGH. Next, the signal level is set to LOW for one bit period to notify the data reception side of the start of data transmission. This one-bit period is called the start bit ST. Next, one byte of data is transmitted in the eight-bit period from the second to the ninth bit. The data bit sequence is in MSB-first format, starting with the most significant data D7, followed by data D6, data D5, and so on to data D1, and ending with the least significant data D0. One bit of parity PA information is added to the 10th bit, and finally, the signal level is set to HIGH for the period of the stop bit SP, which indicates the end of the transmitted data, which completes the one frame period started from the start bit ST.

The above is merely an example of an embodiment of the communication data format in communication method C, and other communication data formats may be used instead. For example, the data bit sequence may be LSB-first or nine bits long, and the parity PA information need not be added. The communication data format may be switched between the broadcast communication mode and the P2P communication mode.

The communication formats of broadcast communication and P2P communication will be described next with reference to FIG. 6B. In broadcast communication, the communication main sets the signal level of the control signal CS to LOW to notify the communication sub that broadcast communication will start, and then outputs the data to be transmitted on the communication signal DATA. Meanwhile, the communication sub sets the signal level of the control signal CS to LOW at the timing upon detecting the start bit ST input from the communication signal DATA. Note that the signal level of the control signal CS does not change at this point because the communication main has already set the signal level of the control signal CS to LOW.

Once the output up to the stop bit SP is complete, the communication main cancels the setting of the control signal CS to LOW. After receiving data input from the communication signal DATA up to the stop bit SP, the communication sub analyzes the received data and performs internal processing associated with the received data. Then, after the communication sub has completed preparations for receiving the next data, the signal level of the control signal CS goes to HIGH as a result of the LOW output of the signal level of the control signal CS being canceled. The communication main can then detect that the reception processing by the communication sub is complete by confirming that the signal level of the control signal CS has gone to HIGH, and can determine that preparations for the next communication are complete. In this manner, in broadcast communication, the signal transmitted by the control signal CS functions as a signal indicating that the broadcast communication mode has started and is being executed.

The P2P communication mode is a one-to-one communication (individual communication) mode in which the communication main designates one of a plurality of communication subs and transmits/receives data only to/from the designated communication sub. To realize the P2P communication mode, the communication main includes a unit which enables the communication partner to be designated in P2P communication. In the present embodiment, for example, the communication main can designate a communication partner for P2P communication by transmitting data in broadcast communication mode with identification information of the communication sub to be designated as the communication partner for P2P communication.

In P2P communication, the communication main first outputs the data to be transmitted to the communication sub of the communication partner on the communication signal DATA. Next, the communication main sets the signal level of the control signal CS to LOW after finishing as far as the output of the stop bit SP. The communication main then cancels output of the LOW signal level of the control signal CS after preparations to receive data from the communication sub are complete.

After detecting the LOW level of the control signal CS, the communication sub designated as the partner for the P2P communication analyzes the received data input from the communication signal DATA and performs the internal processing associated with that received data. Next, the communication sub designated as the partner for the P2P communication outputs the data to be transmitted on the communication signal DATA after confirming that the signal level of the control signal CS has returned to HIGH. The communication sub then sets the signal level of the control signal CS to LOW after finishing as far as the output of the stop bit SP of the final byte of data to be transmitted. The communication sub designated as the P2P communication partner cancels output of the LOW signal level of the control signal CS after preparations to receive data from the communication main are complete. Note that communication subs that are not designated as P2P communication partners do not output signals on the control signal CS and communication signal DATA. As described above, the signal transmitted by the control signal CS in P2P communication functions as a state notification signal indicating the end of data transmission and a request to stand by for the next data transmission.

External Appearance of Intermediate Adapter

Figure 7:
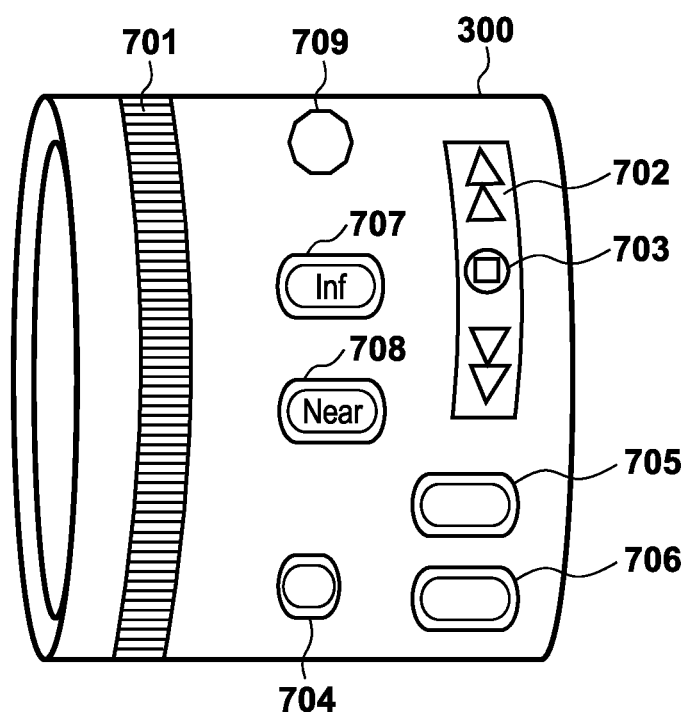
FIG. 7 is a diagram illustrating an example of the external appearance of an intermediate adapter according to the first embodiment.

The external appearance of the intermediate adapter 300, serving as an example of the adapter apparatus, will be described next with reference to FIG. 7. An operation member 701 is a control ring corresponding to the adapter control ring 310. Operating members 702 to 708 correspond to the adapter operation unit 320, and include buttons and the like. The operating members 702 to 708 may be in the form of buttons, for example, but may also be in other forms, such as being constituted by a touch-sensitive panel. An LED 709 is an example of the adapter notification unit 330, and notifies the user of an operating state of a function by light, for example.

The operation member 702 sets a focus drive speed in the autofocus control implemented in the present embodiment, or a sensitivity that indicates a relationship between an operation amount of the adapter control ring 310 and a focus drive amount in the manual focus control. The operation member 703 is an AF stop button that is manipulated to realize a focus pause function implemented in the present embodiment. The operation member 704 is a reset button that is manipulated to realize storage of the focus position (the position of the focus lens) and playback drive implemented in the present embodiment. The operation member 705 is a focus position storage button that is manipulated to realize storage of the focus position and playback drive implemented in the present embodiment. The operation member 706 is a playback drive button that is manipulated to realize storage of the focus position and playback drive implemented in the present embodiment. The operation member 707 is a focus movement button used for the purpose of limiting a focus drive range with respect to the infinite side, or for the purpose of driving the focus to the infinite side in manual focus control, as implemented in the present embodiment. The operation member 708 is a focus movement button used for the purpose of limiting a focus drive range with respect to the near side, or for the purpose of driving the focus to the near side in manual focus control, as implemented in the present embodiment.

Camera System Startup Sequence

A startup sequence of the camera system will be described next with reference to the sequence chart in FIG. 8. The processing of this startup sequence is executed when the power of the camera body 200 is turned on in a state where the intermediate adapter 300 according to the present embodiment, the interchangeable lens 100 attached to the adapter, and the camera body 200 are combined.

In step S801, once the power is turned on, the camera body 200 starts supplying power to the interchangeable lens 100. The power to the interchangeable lens 100 is supplied through the mount 400, the mount 401, and the intermediate adapter 300.

In step S802, parameters in focus position information (denoted as "FPC information" hereinafter), which is returned to the camera body 200 by the interchangeable lens 100, are initialized. The parameters in the FPC information are initialized, for example, in order starting from the current physical focus position (focus lens position). This "FPC information" is parameters exchanged as communication data between the camera body 200 and the interchangeable lens 100. The FPC information does not absolutely have to be parameters indicating an absolute position of the focus lens 104, as long as the FPC interchangeable lens 100 enables a starting point position to be updated as needed between the camera body 200 and the interchangeable lens 100, as described with respect to steps S814 to S818 below. On the other hand, in order to realize the "function of storing the focus position at a desired position and perform playback drive", which is implemented in the present embodiment, the intermediate adapter 300 stores the "focus reference position information", which will be described later, in order to manage the absolute position of the focus lens 104.

In step S803, the camera body 200 requests authentication information, for ascertaining the functions of the interchangeable lens 100, from the interchangeable lens 100. This communication is transmitted to the intermediate adapter 300 through the mount 401, and the intermediate adapter 300 converts the request for the authentication information to the communication protocol supported by the interchangeable lens 100. In step S804, the intermediate adapter 300 requests the authentication information from the interchangeable lens 100 through the mount 400 using the communication protocol into which the request has been converted.

In step S805, the interchangeable lens 100 transmits the authentication information to the intermediate adapter 300 through the mount 400 as a response to the request for the authentication information. The authentication information includes information about the functions of the interchangeable lens 100. The intermediate adapter 300 converts the response to the request for the authentication information into the communication protocol supported by the camera body 200. At this point, the intermediate adapter 300 can ascertain the functions of the interchangeable lens 100 currently attached. In step S806, the intermediate adapter 300 transmits the response to the camera body 200 through the mount 401 using the communication protocol to which the response to the request for the authentication information has been converted.

In step S807, the "focus reference position information" managed by the intermediate adapter 300 itself is initialized using the "FPC information". In other words, at this point, the "FPC information" exchanged between the camera body 200 and the interchangeable lens 100 and the "focus reference position information" managed by the intermediate adapter 300 are both initialized to the same value. In addition to the "focus reference position information", the intermediate adapter 300 manages a "focus relative change amount", which is the relative amount of change of the focus lens 104 from the reference position. The intermediate adapter 300 also initializes the "focus relative change amount" in this processing.

Thereafter, when the AF operations are started by operating the operation member 207 of the camera body 200, in step S808, the camera body 200 transmits a focus drive command, which is a control command, to the intermediate adapter 300. In step S809, the focus drive command is transmitted to the interchangeable lens 100 after the communication protocol conversion processing by the intermediate adapter 300. Upon receiving this communication request, the interchangeable lens 100 drives the focus lens 104. Furthermore, the interchangeable lens 100 changes the "FPC information" managed by the interchangeable lens 100 by a value corresponding to the drive amount of the focus lens 104.

In steps S810 and S811, an "FPC information" obtainment request is transmitted to the interchangeable lens 100 after the communication protocol conversion processing by the intermediate adapter 300. Upon receiving this obtainment request, the interchangeable lens 100 responds with the "FPC information" managed by the interchangeable lens 100. This response is transmitted to the camera body 200 after the communication protocol conversion processing by the intermediate adapter 300 in steps S812 and S813.

In step S814, the camera body 200 transmits an initialization request for the "FPC information". As mentioned above, the "FPC information" does not necessarily indicate the absolute position of the focus lens 104, and can instead be re-set, using the current position as the starting point, according to the circumstances of the camera body 200. Upon detecting that a notification of the initialization request for the "FPC information" has been made from the camera body 200, the intermediate adapter 300 performs the following steps S815 to S817 before transmitting the request to the interchangeable lens 100.

In step S815, the intermediate adapter 300 makes an obtainment request for the newest "FPC information" to the interchangeable lens 100. In step S816, upon receiving the "FPC information" obtainment request, the interchangeable lens 100 responds to the intermediate adapter 300 with the newest "FPC information" managed internally by the interchangeable lens 100. In step S817, the intermediate adapter 300 re-stores the "focus reference position information", stored by the intermediate adapter 300 itself, offset by the newest "FPC information" obtained in step S816.

In step S818, the interchangeable lens 100 is requested to initialize the "FPC information" after the communication protocol conversion by the intermediate adapter 300. Upon receiving the request, the interchangeable lens 100 initializes the "FPC information" it manages itself. At this point, the "FPC information" exchanged between the camera body 200 and the interchangeable lens 100 and the "focus reference position information" managed by the intermediate adapter 300 have different values. The "FPC information" is a parameter based on the current focus position (0). In contrast, the "focus reference position information" managed by the intermediate adapter 300 is information indicating the position of the focus lens 104 determined at the point in time of step S807. The processing of updating the "focus reference position information" managed internally by the adapter in steps S814 to S818 using the newest "FPC information" will be described later with reference to the flowchart in FIG. 20.

AF Stop Function

In the camera system of the first embodiment, the camera body 200 and the interchangeable lens 100 are connected through the intermediate adapter 300 having the AF stop function. The processing of the camera system having the AF stop function in the present embodiment will be described with reference to the sequence chart in FIG. 9.

First, the AF stop function will be described. Generally, a camera system starts AF when an AF start button provided in the camera body 200 or the interchangeable lens 100 is pressed by the user, when a shutter button is depressed halfway, or the like. Alternatively, the camera body 200 may automatically start AF (tracking) upon detecting a change in the shooting situation or the like. The AF stop function is a function for temporarily stopping those AF operations.

For example, in the present embodiment, while the operation member 703 (the AF stop button) provided in the intermediate adapter 300 is pressed, the intermediate adapter 300 can fix the focus at a timing intended by the user by stopping AF tracking operations. Note that the method for operating the AF stop function is not limited thereto, and for example, the start and end of the AF stop function may be switched each time the operation member is depressed.

When the AF operations are started by operating the operation member 207 of the camera body 200, in steps S901 and S902, a focus drive command is transmitted from the camera body 200 to the interchangeable lens 100 after the communication protocol conversion processing by the intermediate adapter 300. Upon receiving the focus drive command, the interchangeable lens 100 drives the focus lens 104 and updates the focus information managed by the interchangeable lens 100. In addition to the FPC information described above, the focus information includes a focus drive state, which indicates whether the focus lens 104 is being driven, and AF/MF information, which indicates whether the interchangeable lens 100 is in an AF state or an MF state.

In step S903, the camera body 200 transmits a focus information request to the intermediate adapter 300. In step S904, the focus information request is transmitted to the interchangeable lens 100 after the communication protocol conversion processing by the intermediate adapter 300.

Upon receiving this focus information request, the interchangeable lens 100 responds with the focus information managed by the interchangeable lens 100. In step S905, the intermediate adapter 300 transmits the focus information to the intermediate adapter 300 as a response to the focus information request. In step S907, the focus information is communicated to the camera body 200 after the communication protocol conversion processing by the intermediate adapter 300. Additionally, in step S906, the intermediate adapter 300 updates the focus information stored by the intermediate adapter 300 itself based on the newest focus information obtained in step S905.

When the operation of the AF stop function is started by the operation member 703 of the intermediate adapter 300, in step S908, the intermediate adapter 300 updates an adapter state setting stored in the intermediate adapter 300 itself. The adapter state setting is information including AF stop function state information indicating whether the AF stop function is currently operating. In step S908, the intermediate adapter 300 updates the AF stop function state information to a value expressing "currently operating". Then, in step S909, the intermediate adapter 300 transmits a focus stop command to the interchangeable lens 100. This is done to fix the focus at the position intended by the user by immediately stopping the focus lens 104 when the focus lens 104 is being driven. Note that the method for fixing the focus is not limited thereto, and for example, if the focus lens 104 can be determined to be stopped from the focus information, the processing of step S909 need not be performed. For example, an MF prohibition command (a command that prohibits driving of the focus lens through manual focus) may be transmitted to the interchangeable lens 100 to prevent changes in focus due to the user unintentionally operating the manual control ring 130 or the like.

The AF operations are started in response to the operation member 207 of the camera body 200 being manipulated. When the AF stop function of the intermediate adapter 300 is operating, even if the intermediate adapter 300 receives a focus drive command in step S910, the intermediate adapter 300 does not perform the communication protocol conversion processing for the focus drive command. The processing performed when the intermediate adapter 300 receives the focus drive command while the AF stop function is operating is not limited thereto. For example, the intermediate adapter 300 may convert its own stored focus information to information indicating a different state from the newest focus information received from the interchangeable lens 100. Additionally, for example, the intermediate adapter 300 may return a response corresponding to the focus drive command to the camera body 200 without transmitting the focus drive command to the interchangeable lens 100. Alternatively, the intermediate adapter 300 may transmit, to the interchangeable lens 100, the focus drive command converted to a state in which the focus lens position is fixed.

Additionally, even if the AF stop function of the intermediate adapter 300 is operating, the camera body 200 transmits the focus information request in step S911. Then, in step S912, the focus information request is transmitted to the interchangeable lens 100 after the communication protocol conversion processing by the intermediate adapter 300. Upon receiving this focus information request, the interchangeable lens 100 responds with the focus information managed by the interchangeable lens 100. This response is communicated to the camera body 200 after the communication protocol conversion processing by the intermediate adapter 300 in steps S913 and S915. Additionally, in step S914, the intermediate adapter 300 updates the focus information stored by the intermediate adapter 300 itself based on the newest focus information obtained in step S913. Note that the intermediate adapter 300 may convert the focus information stored by the intermediate adapter 300 itself into information indicating a state different from the newest focus information obtained in step S913. For example, even if the focus information from the interchangeable lens 100 indicates the AF state, the intermediate adapter 300 may update the focus information stored by the intermediate adapter 300 itself to the MF state and transmit information indicating the MF state to the camera body 200.

When the operation of the AF stop function is ended by the operation member 703 of the intermediate adapter 300, in step S916, the intermediate adapter 300 updates the AF stop function state information, in the adapter state setting stored in the intermediate adapter 300 itself, to a value indicating "not currently operating".

Series of Operations Involved in AF Stop Function

Figure 10A:
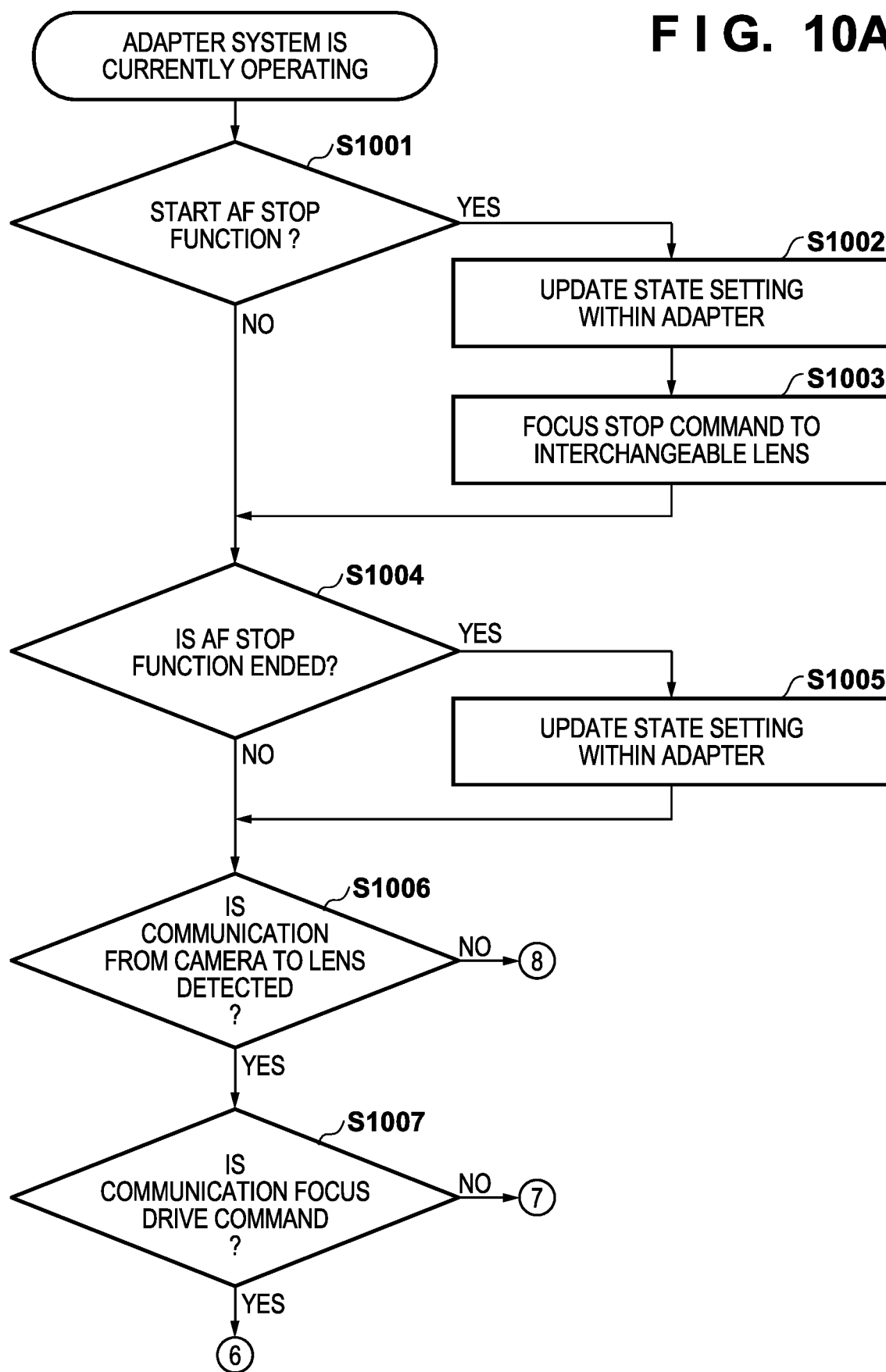
FIGS. 10A and 10B are flowcharts illustrating operations of the AF stop function of the intermediate adapter according to the first embodiment.
Figure 10B:
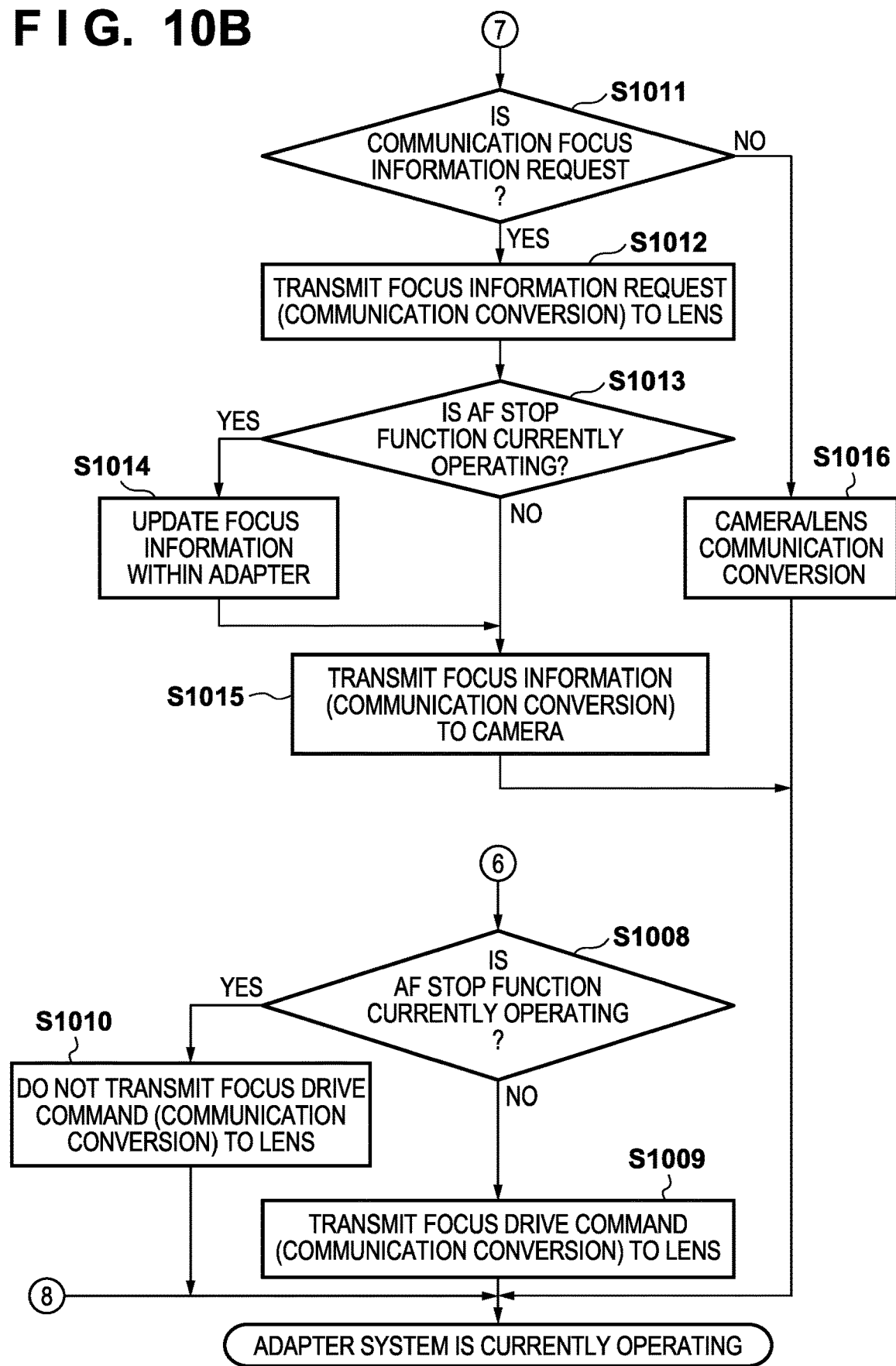

A series of operations by the intermediate adapter 300 having the AF stop function in the present embodiment will be described next with reference to FIGS. 10A and 10B. This series of operations indicates control operations involved in the AF stop function of the adapter microcomputer 302 in the intermediate adapter 300 during normal operation after completing the startup sequence described earlier with reference to FIG. 8. This series of operations may be realized by the adapter microcomputer 302 executing a program, and is started when the operation member 703 of the intermediate adapter 300 is depressed.

In step S1001, the adapter microcomputer 302 determines whether to start the AF stop function. For example, the adapter microcomputer 302 determines to start the AF stop function by detecting the operation member 703 being depressed when the AF stop function state information is "not currently operating". Note that the method of determining to start the AF stop function is not limited thereto. If the adapter microcomputer 302 determines the AF stop function is to start, the sequence moves to step S1002, and if not, the sequence moves to step S1004.

In steps S1002 and S1003, the adapter microcomputer 302 updates the adapter state setting stored in the intermediate adapter 300 itself and transmits a focus stop command to the interchangeable lens 100 to start the AF stop function. The processing details of steps S1002 and S1003 are similar to those in steps S908 and S909 above, and will therefore not be described in detail.

In step S1004, the adapter microcomputer 302 determines whether to end the AF stop function. For example, the adapter microcomputer 302 determines to stop the AF stop function by detecting the operation member 703 not being depressed when the AF stop function state information is "currently operating". Note that the method of determining to end the AF stop function is not limited thereto. If the adapter microcomputer 302 determines the AF stop function is to end, the sequence moves to step S1005, and if not, the sequence moves to step S1006.

In step S1005, the adapter microcomputer 302 ends the AF stop function by updating the adapter state setting stored in the intermediate adapter 300 itself. This processing is similar to step S916 described above, and will therefore not be described in detail.

If in step S1006 the adapter microcomputer 302 detects communication from the camera body 200 to the interchangeable lens 100, the sequence moves to step S1007 to perform the communication protocol conversion processing. If no communication is detected, the adapter microcomputer 302 resumes from the start of this series of operations to repeat this control processing, i.e., the sequence moves to step S1001.

In step S1007, the adapter microcomputer 302 analyzes the content of the communication from the camera body 200, with the sequence moving to step S1008 if the content of the communication is a focus drive command, and moving to step S1011 if not. In step S1008, the adapter microcomputer 302 determines whether the AF stop function state information is "currently operating", with the sequence moving to step S1010 if the information is "currently operating", and moving to step S1009 if not. In step S1009, the adapter microcomputer 302 converts the communication content to the communication protocol corresponding to the interchangeable lens 100, and transmits a focus drive command to the interchangeable lens 100. In step S1010, the adapter microcomputer 302 does not transmit the focus drive command to the interchangeable lens 100. The details are similar to step S910 described above, and will therefore not be described. After the processing of step S1009 or step S1010 ends, the sequence resumes from the start of this flow to repeat this control processing, i.e., the sequence moves to step S1001.

In step S1011, the adapter microcomputer 302 analyzes the content of the communication from the camera body 200, with the sequence moving to step S1012 if the content of the communication is a focus information request, and moving to step S1016 if not. In step S1012, the adapter microcomputer 302 converts the communication content to the communication protocol corresponding to the interchangeable lens 100, transmits a focus information request to the interchangeable lens 100, and receives focus information from the interchangeable lens 100. This processing is similar to steps S904 and S905, or steps S912 and S913, described above, and will therefore not be described in detail. In step S1013, the adapter microcomputer 302 determines whether the AF stop function state information is "currently operating", with the sequence moving to step S1014 if the information is "currently operating", and moving to step S1015 if not. In step S1014, the adapter microcomputer 302 updates the focus information stored in the intermediate adapter 300 itself based on the obtained focus information. This processing is similar to step S914 described above, and will therefore not be described in detail. In step S1015, the adapter microcomputer 302 transmits the focus information stored by the intermediate adapter 300 itself using the protocol corresponding to the camera body 200. This processing is similar to step S915 described above, and will therefore not be described in detail. After the processing of step S1015 ends, the sequence resumes from the start of this processing to repeat this control processing, i.e., the sequence moves to step S1001.

In step S1016, the adapter microcomputer 302 analyzes the communication content received from the camera body 200, converts the communication content into the communication protocol corresponding to the interchangeable lens 100, and transmits the communication to the interchangeable lens 100. At this time, if there is a response to the communication from the interchangeable lens 100, the system stands by until the response is received. If a response to the camera body 200 is required, the camera body 200 transmits the response using the corresponding communication protocol. After the processing of steps S1006, S1009, S1010, S1015, and S1016 ends, the adapter microcomputer 302 may end this processing, or may resume from the start to repeat this processing, i.e., the sequence may move to step S1001.

As described thus far, according to the present embodiment, the intermediate adapter 300 first accepts an operation to operate a predetermined function (the AF stop function) that assists the AF operations by the camera body 200. Then, based on this operation and the control command for AF operations (the focus drive command) from the camera body, the AF stop function for AF operations is realized by controlling the transmission of the control command to the interchangeable lens. In particular, to control the transmission of the control command to the interchangeable lens, the intermediate adapter 300 ensures that a control amount pertaining to the focus for the AF operations, included in the control command, is not transmitted to the interchangeable lens. In this manner, by using an intermediate adapter having an AF stop function, a camera system having an AF stop function can be provided even when the camera body, the interchangeable lens, or the like does not have an AF stop function. In other words, the user's intentions in the AF function implemented between the camera body and the interchangeable lens can be reflected.

Second Embodiment

A second embodiment of the present invention will be described next. In the present embodiment, the camera body and the interchangeable lens are connected through an intermediate adapter having an AF drive range change function. However, the configuration of the camera system in the present embodiment can be substantially the same as in the first embodiment. As such, configurations and processes identical or substantially identical to those in the foregoing embodiment will be assigned the same reference signs and redundant descriptions will be skipped, with attention focused on the differences.

AF Drive Range Change Function

The AF drive range change function will be described first. The AF drive range change function is a function capable of shortening an AF search time or improving subject tracking performance by limiting the focus lens drive range of the AF operations to a desired range. For example, in the present embodiment, upon accepting the operation member 707 being depressed by the user, the intermediate adapter 300 sets a limit so that the focus lens 104 is not driven toward the infinite side beyond the position of the focus lens 104 at that time. Upon accepting the operation member 707 being depressed by the user again, the intermediate adapter 300 cancels the set limit. Additionally, when the operation member 708 is similarly depressed by the user, the intermediate adapter 300 sets a limit so that the focus lens 104 is not driven toward the near side beyond the position of the focus lens 104 at that time. When the operation member 708 is depressed again by the user, the intermediate adapter 300 cancels the set limit. Note that the method of operating the AF drive range change function is not limited thereto. For example, instead of the focus position at the time a desired setting button is depressed, a range having a predetermined width set in advance based on the focus position at the time the button was depressed may be set as the drive range. Alternatively, a desired predetermined position set in advance may be set as the drive range, without being based on the focus position at the time the button was depressed.

The processing of the camera system having the AF drive range change function in the present embodiment will be described next with reference to the sequence chart in FIG. 11. In this camera system, the camera body 200 and the interchangeable lens 100 are connected through the intermediate adapter 300 having the AF drive range change function.

When the AF drive range is set by pressing the operation member 707 or the operation member 708 of the intermediate adapter 300, in steps S1101 and S1102, the intermediate adapter 300 obtains the newest "FPC information" from the interchangeable lens 100. At this time, the intermediate adapter 300 can manage the absolute position of the focus lens 104 using the "focus position information" obtained by adding the newest "FPC information" to the aforementioned "focus reference position information".

In step S1103, the intermediate adapter 300 updates an AF drive range state in the adapter state setting stored by the intermediate adapter 300 itself to a value indicating "currently set", and sets the AF drive range based on the "focus position information". The AF drive range is constituted by an infinite side limit position and a near side limit position. The intermediate adapter 300 controls the focus lens 104 to stay within the AF drive range when the AF drive range state is "currently set". For example, if a user operation is an operation for setting the AF drive range using the operation member 707, the intermediate adapter 300 sets the infinite side limit position based on the "focus position information". Additionally, for example, if a user operation is an operation for setting the AF drive range using the operation member 708, the intermediate adapter 300 sets the near side limit position based on the "focus position information". Note that the method of setting the AF drive range is not limited thereto. The intermediate adapter 300 may set the AF drive range to any desired range set in advance based on the "focus position information" at the point in time a desired setting button is pressed, for example. Alternatively, the intermediate adapter 300 may set the AF drive range to any desired position set in advance based on the "focus position information" at the point in time a desired setting button is pressed. Furthermore, for example, if the operation member is operated to set the infinite side limit position further on the near side than the near side limit position, this operation may be ignored. The same is true when an attempt is made to set the near side limit position. Additionally, at this time, the intermediate adapter 300 may also notify the user that the AF drive range setting was ignored by lighting an LED in the adapter notification unit 330. The method for notifying the user that the AF drive range has been canceled through the adapter notification unit 330 is not limited thereto, however, and for example, the fact that the AF drive range has been canceled may be displayed on an LCD provided in the adapter notification unit 330.

When the AF operations are started by operating the operation member 207 of the camera body 200, in step S1104, the focus drive command, which is a control command for the interchangeable lens 100, is transmitted from the camera body 200 to the intermediate adapter 300. Then, in step S1105, the intermediate adapter 300, for which the AF drive range state is "currently set", converts the focus drive amount transmitted to the interchangeable lens 100 so as to fall within the AF drive range. Details regarding the processing for converting the focus drive amount will be given later with reference to FIG. 13. Then, in step S1106, the intermediate adapter 300 uses the post-conversion focus drive amount to transmit a focus drive command to the interchangeable lens 100. Upon receiving this focus drive command, the interchangeable lens 100 drives the focus lens 104 and updates the focus information managed by the interchangeable lens 100. The focus information is information that includes, in addition to the aforementioned FPC information, infinite end information indicating whether the position of the focus lens 104 is at the infinite side end of the drivable range, near end information indicating whether the position of the focus lens 104 is at the near side end of the drivable range, and the like.

In steps S1107 and S1108, the focus information request from the camera body 200 is transmitted to the interchangeable lens 100 after the communication protocol conversion processing by the intermediate adapter 300. Upon receiving this focus information request, the interchangeable lens 100 responds with the focus information managed by the interchangeable lens 100. This response is transmitted from the interchangeable lens 100 to the camera body 200 after the communication protocol conversion processing by the intermediate adapter 300 in steps S1109 and S1111. Additionally, in step S1110, the intermediate adapter 300 updates the focus information stored by the intermediate adapter 300 itself based on the newest focus information obtained in step S1109. Note that the intermediate adapter 300 may convert the focus information stored by the intermediate adapter 300 itself into information indicating a state different from the newest focus information obtained in step S1109. For example, even if the infinite end information from the interchangeable lens 100 indicates a state which is not at the infinite end, if the "focus position information" is equal to the infinite side limit position, the infinite end information stored in the intermediate adapter 300 itself may be updated to a state which is at the infinite end. The intermediate adapter 300 may then transmit an indication that the state is as the infinite end to the camera body 200. The intermediate adapter 300 can perform similar operations for the case of the near side as well.

If, when the AF drive range state is "currently set", the operation member 707 or the operation member 708 of the intermediate adapter 300 is depressed and the AF drive range is canceled, in step S1112, the intermediate adapter 300 updates the AF drive range state to a value indicated "not currently set". Furthermore, the intermediate adapter 300 clears the AF drive range. The intermediate adapter 300 may also update the focus information stored by the intermediate adapter 300 itself to information matching the newest focus information. Note that the method for canceling the AF drive range is not limited to operations made through operation members. For example, the intermediate adapter 300 may cancel the AF drive range in response to detecting the interchangeable lens 100 being removed, or may cancel the AF drive range in response to the zoom lens 102 of the interchangeable lens 100 being driven (the imaging optical system changing). Additionally, the intermediate adapter 300 may also notify the user that the AF drive range was canceled by lighting an LED in the adapter notification unit 330. Note that the method for notifying the user that the AF drive range was canceled through the adapter notification unit 330 is not limited thereto. The intermediate adapter 300 may display the fact that the AF drive range was canceled in the LCD provided in the adapter notification unit 330, for example.

Series of Operations Involved in AF Drive Range Change Function

Figure 12A:
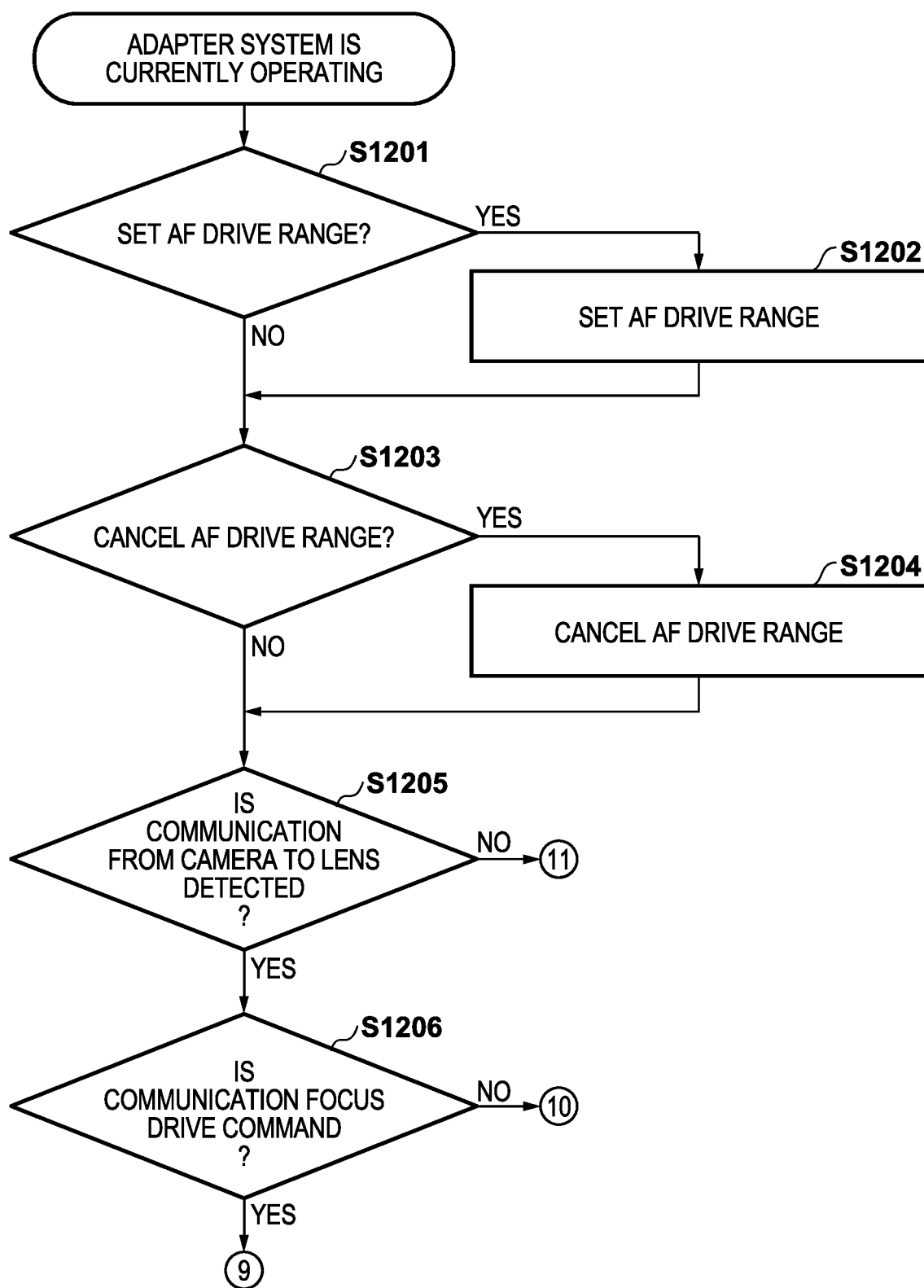
FIGS. 12A and 12B are flowcharts illustrating operations of the AF drive range change function of the intermediate adapter according to the second embodiment.
Figure 12B:
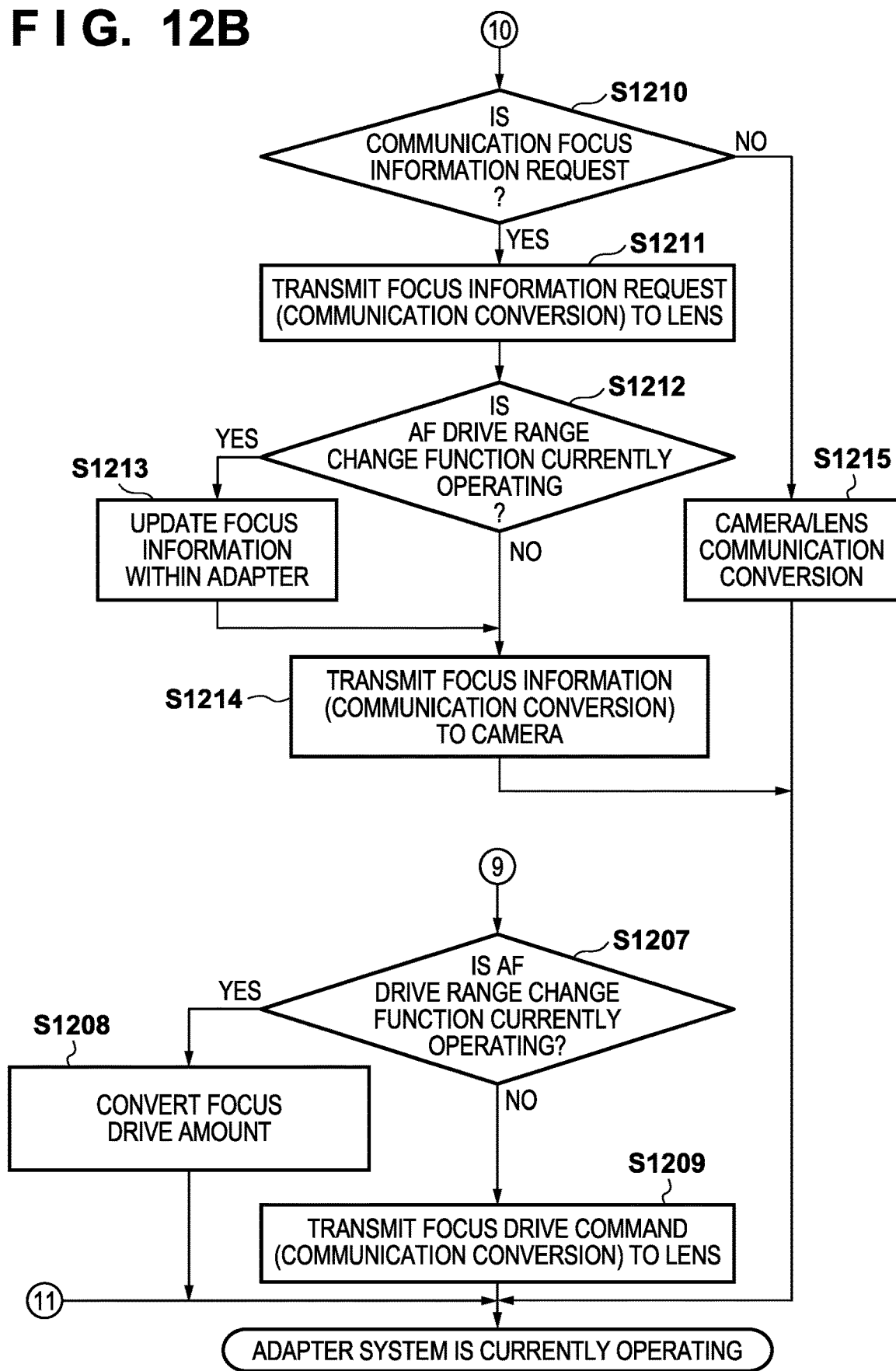

A series of operations by the intermediate adapter 300 having the AF drive range change function in the present embodiment will be described next with reference to FIGS. 12A and 12B. This series of operations indicates control operations involved in the AF drive range change function of the adapter microcomputer 302 in the intermediate adapter 300 during normal operation after completing the startup sequence described earlier with reference to FIG. 8. This series of operations may be realized by the adapter microcomputer 302 executing a program, and is started when the operation member 707 or 708 of the intermediate adapter 300 is depressed.

In step S1201, the adapter microcomputer 302 determines whether to set the AF drive range. If the adapter microcomputer 302 determines to set the AF drive range, the sequence moves to step S1202, and if not, the sequence moves to step S1203. In step S1202, the adapter microcomputer 302 sets the AF drive range. The method for determining the start of the setting of the AF drive range in step S1201 and the method of setting the AF drive range in step S1202 are similar to steps S1101 to S1103 described above, and will therefore not be described in detail here.

In step S1203, the adapter microcomputer 302 determines whether to cancel the AF drive range. If the adapter microcomputer 302 determines to cancel the AF drive range, the sequence moves to step S1204, and if not, the sequence moves to step S1205. The method for determining the start of the canceling of the AF drive range in step S1203 and the method of canceling the AF drive range in step S1204 are similar to step S1112 described above, and will therefore not be described in detail here.

If in step S1205 the adapter microcomputer 302 detects communication from the camera body 200 to the interchangeable lens 100, the sequence moves to step S1206 to perform the communication protocol conversion processing. If no communication is detected, the adapter microcomputer 302 resumes from the start of this series of operations to repeat this control processing, i.e., the sequence moves to step S1201.

In step S1206, the adapter microcomputer 302 analyzes the content of the communication from the camera body 200, with the sequence moving to step S1207 if the content of the communication is a focus drive command, and moving to step S1210 if not. In step S1207, the adapter microcomputer 302 determines whether the AF drive range state is "currently set". The adapter microcomputer 302 moves the sequence to step S1208 if "currently set", and to step S1209 if not. In step S1208, the adapter microcomputer 302 converts the focus drive amount transmitted to the interchangeable lens 100 so as to fall within the AF drive range, after which the sequence moves to step S1209. Details regarding the processing for converting the focus drive amount will be given later with reference to FIG. 13. In step S1209, the adapter microcomputer 302 transmits a focus drive command to the interchangeable lens 100 using the communication protocol corresponding to the interchangeable lens 100.

In step S1210, the adapter microcomputer 302 analyzes the content of the communication from the camera body 200, with the sequence moving to step S1211 if the content of the communication is a focus information request, and moving to step S1215 if not. In step S1211, the adapter microcomputer 302 converts the communication content to the communication protocol corresponding to the interchangeable lens 100, and transmits a focus information request to the interchangeable lens 100. Additionally, the adapter microcomputer 302 receives the focus information from the interchangeable lens 100, after which the sequence moves to step S1212. The details of step S1210 are similar to those of steps S1107 and S1108 described above, and details thereof will therefore be omitted. In step S1212, the adapter microcomputer 302 determines whether the AF drive range state is "currently set". The adapter microcomputer 302 moves the sequence to step S1213 if the AF drive range state is "currently set", and to step S1214 if not.

In step S1213, the adapter microcomputer 302 updates the focus information stored in the intermediate adapter 300 itself based on the received focus information. The details of step S1213 are similar to those of step S1110 described above, and details thereof will therefore be omitted. In step S1214, the adapter microcomputer 302 transmits the focus information stored by the intermediate adapter 300 itself using the communication protocol corresponding to the camera body 200. The details of step S1214 are similar to step S1111 described above, and will therefore not be described.

In step S1215, the adapter microcomputer 302 analyzes the communication content received from the camera body 200, converts the communication content into the communication protocol corresponding to the interchangeable lens 100, and transmits the communication content to the interchangeable lens 100. At this time, if there is a response to the communication from the interchangeable lens 100, the adapter microcomputer 302 stands by until the response is received. If a response to the camera body 200 is required, the camera body 200 transmits the response using the corresponding communication protocol. After the processing of steps S1205, S1209, S1214, and S1215 ends, the adapter microcomputer 302 may end this processing, or may resume from the start to repeat this processing, i.e., the sequence may move to step S1201.

Figure 13:
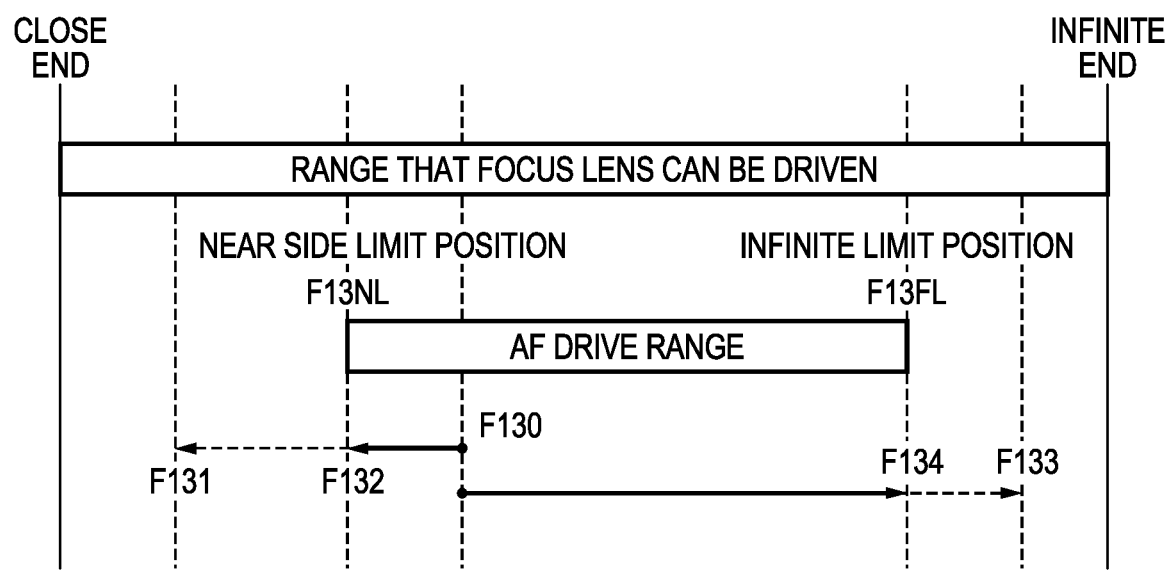
FIG. 13 is a diagram illustrating operations of the AF drive range change function of the camera system according to the second embodiment.

Next, operations by the focus lens 104 when the AF drive range state is "currently set", in a camera system including the intermediate adapter 300 having the AF drive range change function in the present embodiment, will be described with reference to FIG. 13. The "close end" to the "infinite end" in FIG. 13 indicates the range over which the focus lens 104 can be driven. At this time, current position information of the focus lens 104 is transmitted to the intermediate adapter 300 and the camera body 200 as the "FPC information". Additionally, the absolute position of the focus lens 104 is managed internally in the intermediate adapter 300 by the aforementioned "focus position information".

When the AF drive range state is "currently set", the AF drive range, which is constituted by a near side limit position F13NL and an infinite side limit position F13FL, is managed internally in the intermediate adapter 300. The AF drive range is set based on the "focus position information", and is set to be within the range from the close end to the infinite end. Additionally, the near side limit position F13NL is set further on the near side than the infinite side limit position F13FL.

For example, consider a case where the "focus position information" is F130 and the camera body 200 transmits a focus drive command with a focus drive amount toward F131. In this case, the intermediate adapter 300 converts the command to a focus drive amount toward F132 based on the "focus position information", so as not to pass the near side limit position F13NL, and then transmits the focus drive command to the interchangeable lens 100. Even if the focus drive command transmitted by the camera body 200 is for search driving which does not specify a focus drive amount toward the close end, the intermediate adapter 300 transmits the focus drive command to the interchangeable lens 100 so as not to pass the near side limit position F13NL. Specifically, the intermediate adapter 300 calculates a focus drive amount toward F134 based on the "focus position information", and then transmits a focus drive command designating the focus drive amount to the interchangeable lens 100.

Additionally, for example, consider a case where the "focus position information" is F130 and the camera body 200 transmits a focus drive command with a focus drive amount toward F133. In this case, the intermediate adapter 300 converts the command to a focus drive amount toward F134 based on the "focus position information", so as not to pass the infinite side limit position F13FL, and then transmits the focus drive command to the interchangeable lens 100. Even if the focus drive command transmitted by the camera body 200 is for search driving which does not specify a focus drive amount toward the infinite end, the intermediate adapter 300 transmits the focus drive command to the interchangeable lens 100 so as not to pass the infinite side limit position F13FL. Specifically, the intermediate adapter 300 calculates a focus drive amount toward F134 based on the "focus position information", and then transmits a focus drive command designating the focus drive amount to the interchangeable lens 100. In this manner, the focus lens 104 of the interchangeable lens 100 is controlled so as not to exceed the AF drive range managed by the intermediate adapter 300 itself.

As described thus far, according to the present embodiment, the intermediate adapter 300 first accepts an operation to operate the AF drive range change function, which assists the AF operations by the camera body 200. Then, based on this operation and the control command for AF operations (the focus drive command) from the camera body, the AF drive range change function is realized by controlling the transmission of the control command to the interchangeable lens. In particular, the intermediate adapter 300 changes a control amount pertaining to focus for AF operations (a focus drive amount) included in a control command, such that the amount falls within a predetermined drive range of the focus lens of the interchangeable lens 100, and then transmits that control amount to the interchangeable lens 100. In this manner, by using an intermediate adapter having an AF drive range change function, a camera system having an AF drive range change function can be provided even when the camera body, the interchangeable lens, or the like does not have an AF drive range change function. In other words, the user's intentions in the AF function implemented between the camera body and the interchangeable lens can be reflected.

Third Embodiment

A third embodiment of the present invention will be described next. In the present embodiment, the camera body and the interchangeable lens are connected through an intermediate adapter having an AF speed setting function. However, the configuration of the camera system in the present embodiment can be substantially the same as in the above embodiments. As such, configurations and processes identical or substantially identical to those in the foregoing embodiment will be assigned the same reference signs and redundant descriptions will be skipped, with attention focused on the differences.

AF Speed Setting Function

The AF speed setting function will be described first. The AF speed setting function is a function which makes it possible to increase or reduce the AF speed by changing a drive speed of the focus lens in AF operations to a desired speed setting. For example, in the present embodiment, when one of the buttons in the operation member 702 included in the intermediate adapter 300 is depressed, the AF speed increases by a desired multiple. When another of the buttons included in the intermediate adapter 300 is depressed, the AF speed decreases by a desired multiple. Note that the method of operating the AF speed setting function is not limited thereto. For example, the intermediate adapter 300 may have a plurality of multiples as levels for the AF speed (e.g., five levels, namely ¼×, ½×, equal, 2×, and 4×), and the intermediate adapter may switch through the multiples in order each time a setting button is depressed.

The processing of the camera system having the AF speed setting function in the present embodiment will be described next with reference to the sequence chart in FIG. 14. In this camera system, the camera body 200 and the interchangeable lens 100 are connected through the intermediate adapter 300 having the AF speed setting function.

When the operation member 702 of the intermediate adapter 300 is operated and an AF speed setting is changed, in step S1401, the intermediate adapter 300 changes an AF speed setting state in the adapter state setting stored in the intermediate adapter 300 itself to a value indicating "currently set". The intermediate adapter 300 sets the AF speed setting as desired. At this time, the AF speed setting is a multiple that is multiplied by the focus lens drive speed when the focus drive command from the camera body 200 is converted to the communication protocol corresponding to the interchangeable lens 100. Note that the specifications for the AF speed setting are not limited thereto, and for example, may be managed as a value that replaces the focus drive speed at the time of conversion to the communication protocol corresponding to the interchangeable lens 100. Note also that if the interchangeable lens 100 is detected as being a lens for which the focus speed cannot be designated, the intermediate adapter 300 may notify the user than the AF speed setting cannot be made by lighting an LED provided in the adapter notification unit 330. The method for notifying the user that the AF speed setting cannot be made through the adapter notification unit 330 is not limited thereto. The intermediate adapter 300 may display the fact that the AF speed setting cannot be made in the LCD provided in the adapter notification unit 330, for example.

When the AF operations are started by the user operating the operation member 207 of the camera body 200, in step S1402, the focus drive command, which is a control command for the interchangeable lens 100, is transmitted from the camera body 200 to the intermediate adapter 300. Then, in step S1403, the intermediate adapter 300, for which the AF speed setting state is "currently set", converts the focus drive speed transmitted to the interchangeable lens 100, based on the AF speed setting. Then, in step S1404, the intermediate adapter 300 uses the post-conversion focus drive speed to transmit a focus drive command to the interchangeable lens 100. Upon receiving this focus drive command, the interchangeable lens 100 drives the focus lens 104 and updates the focus information managed by the interchangeable lens 100. The "focus information" is information including the aforementioned FPC information and the like.

In steps S1405 and S1406, the focus information request from the camera body 200 is transmitted to the interchangeable lens 100 after the communication protocol conversion processing by the intermediate adapter 300. Upon receiving this focus information request, the interchangeable lens 100 responds with the focus information managed by the interchangeable lens 100. This response is transmitted from the interchangeable lens 100 to the camera body 200 after the communication protocol conversion processing by the intermediate adapter 300 in steps S1407 and S1409. Additionally, in step S1408, the intermediate adapter 300 updates the focus information stored by the intermediate adapter 300 itself based on the newest focus information obtained in step S1407.

If, when the AF speed setting state is "currently set", the AF speed setting is canceled by the operation member 702 of the intermediate adapter 300 being operated or the like, in step S1410, the intermediate adapter 300 updates the AF speed setting state to a value indicating "not currently set". The intermediate adapter 300 also clears the AF speed setting. Note that the method for canceling the AF speed setting is not limited to the operation member being operated. For example, the intermediate adapter 300 may cancel the AF speed setting in response to the interchangeable lens 100 being removed, or may cancel the AF speed setting when the imaging optical system changes in response to the zoom lens 102 of the interchangeable lens 100 being driven. Additionally, the user may be notified that the AF speed setting was canceled by lighting an LED in the adapter notification unit 330. The method for notifying the user that the AF speed setting has been canceled through the adapter notification unit 330 is not limited thereto, and for example, the intermediate adapter 300 may display the fact that the AF speed setting has been canceled on an LCD provided in the adapter notification unit 330.

Series of Operations Involved in AF Speed Setting Function

Figure 15A:
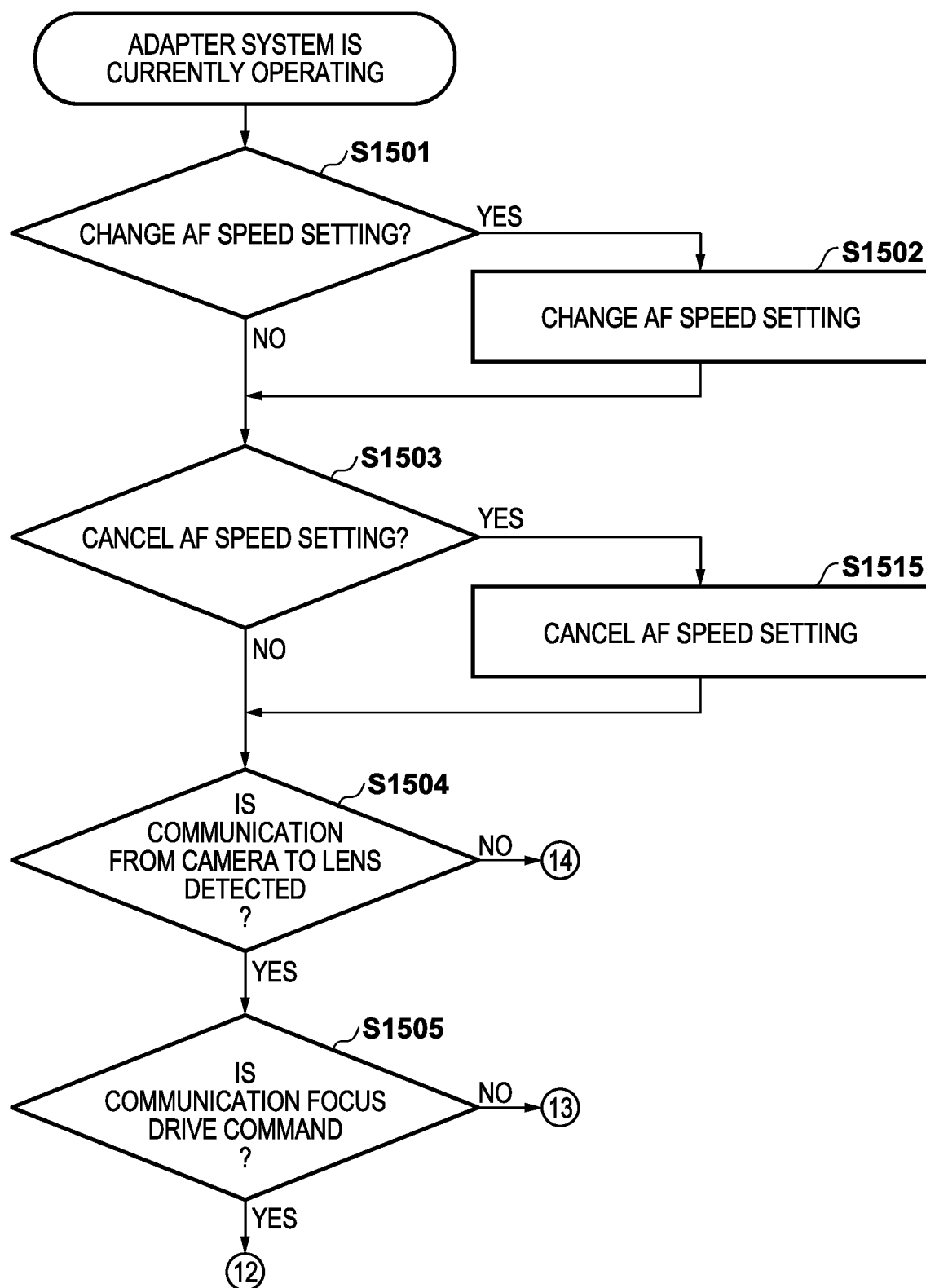
FIGS. 15A and 15B are flowcharts illustrating operations of the AF speed setting function of the intermediate adapter according to the third embodiment.
Figure 15B:
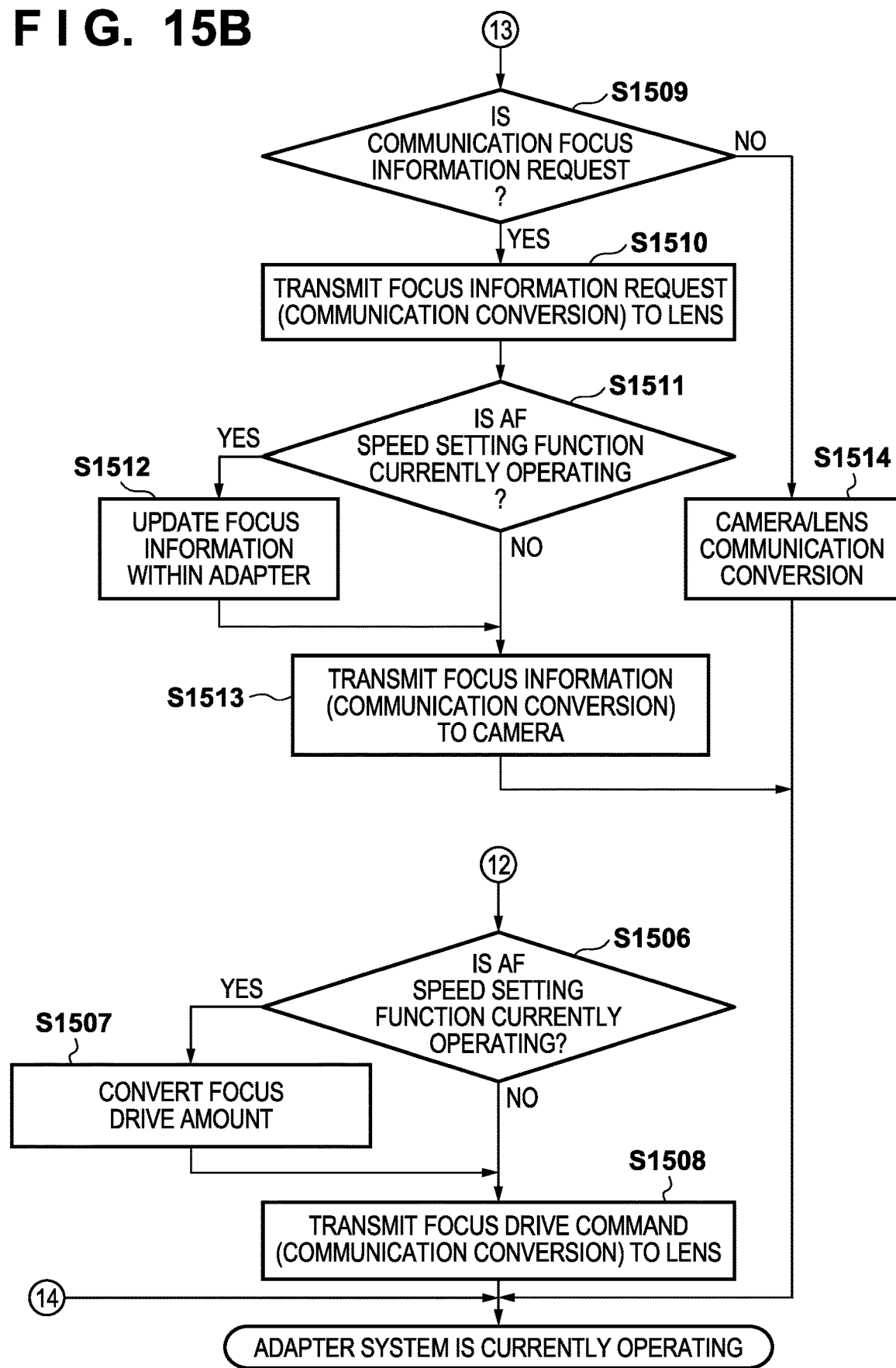

A series of operations by the intermediate adapter 300 having the AF speed setting function in the present embodiment will be described next with reference to FIGS. 15A and 15B. Th processing described here indicates control processing involved in the AF speed setting function of the adapter microcomputer 302 in the intermediate adapter 300 during normal operation after completing the startup sequence described earlier with reference to FIG. 8. This series of operations may be realized by the adapter microcomputer 302 executing a program, and is started when the operation member 702 of the intermediate adapter 300 is depressed.

In step S1501, the adapter microcomputer 302 determines whether to change the AF speed setting. If the adapter microcomputer 302 determines to change the AF speed setting, the sequence moves to step S1502, and if not, the sequence moves to step S1503. The method for determining the start of the change of the AF speed setting in step S1501, and the method for changing the AF speed setting in step S1502, are similar to the aforementioned step S1401, and will therefore not be described in detail.

In step S1503, the adapter microcomputer 302 determines whether to cancel the AF speed setting. If the adapter microcomputer 302 determines to cancel the AF speed setting, the sequence moves to step S1515, and if not, the sequence moves to step S1504. The method for determining the cancellation of the AF speed setting in step S1503, and the method for canceling the AF speed setting in step S1515, are similar to the aforementioned step S1410, and will therefore not be described in detail.

In step S1504, the adapter microcomputer 302 determines whether communication from the camera body 200 to the interchangeable lens 100 has been detected. If the adapter microcomputer 302 has detected communication from the camera body 200, the sequence moves to step S1505 to perform the communication protocol conversion processing. On the other hand, if no communication has been detected, the adapter microcomputer 302 may end this processing, or may resume from the start to repeat this processing, i.e., the sequence may move to step S1501.

In step S1505, the adapter microcomputer 302 analyzes the content of the communication from the camera body 200, with the sequence moving to step S1506 if the communication is a focus drive command, and moving to step S1509 if not. In step S1506, the adapter microcomputer 302 determines whether the AF speed setting function is currently operating. The adapter microcomputer 302 determines whether the AF speed setting state is "currently set", with the sequence moving to step S1507 if the state is "currently set" and to step S1508 if not. In step S1507, the adapter microcomputer 302 converts the focus drive speed transmitted to the interchangeable lens 100 based on the AF speed setting (i.e., converts the focus drive amount). In step S1508, the adapter microcomputer 302 transmits a focus drive command to the interchangeable lens 100 using the communication protocol corresponding to the interchangeable lens 100. After the processing of step S1508 ends, the adapter microcomputer 302 may end this processing, or may resume from the start to repeat this processing, i.e., the sequence may move to step S1501.

In step S1509, the adapter microcomputer 302 analyzes the content of the communication from the camera body 200, with the sequence moving to step S1510 if the content of the communication is a focus information request, and moving to step S1514 if not. In step S1510, the adapter microcomputer 302 converts the communication content to the communication protocol corresponding to the interchangeable lens 100, transmits a focus information request to the interchangeable lens 100, and receives focus information from the interchangeable lens 100, after which the sequence moves to step S1511. The details are similar to steps S1405 and S1406 described above, and details thereof will therefore be omitted. In step S1511, the adapter microcomputer 302 determines whether the AF speed setting state is "currently set", with the sequence moving to step S1512 if the state is "currently set" and to step S1513 if not. In step S1512, the adapter microcomputer 302 updates the focus information stored in the intermediate adapter 300 itself based on the received focus information. The details are similar to step S1408 described above, and details thereof will therefore be omitted. In step S1513, the adapter microcomputer 302 transmits the focus information stored by the intermediate adapter 300 itself using the communication protocol corresponding to the camera body 200. The details are similar to step S1409 described above, and details thereof will therefore be omitted. After the processing of step S1513 ends, the adapter microcomputer 302 may end this processing, or may resume from the start to repeat this processing, i.e., the sequence may move to step S1501.

In step S1514, the adapter microcomputer 302 analyzes the communication content received from the camera body 200, converts the communication content into the communication protocol corresponding to the interchangeable lens 100, and transmits the communication to the interchangeable lens 100. At this time, if there is a response to the communication from the interchangeable lens 100, the system stands by until the response is received. If a response to the camera body 200 is required, the camera body 200 transmits the response using the corresponding communication protocol. After the processing of step S1514 ends, the adapter microcomputer 302 may end this processing, or may resume from the start to repeat this processing, i.e., the sequence may move to step S1501.

As described thus far, according to the present embodiment, the intermediate adapter 300 first accepts an operation to operate an AF speed change function, which assists the AF operations by the camera body 200. Then, based on this operation and the control command for AF operations (focus drive control) from the camera body, the AF speed change function is realized by controlling the transmission of the control command to the interchangeable lens. In particular, the intermediate adapter 300 changes the focus lens drive speed included in the control command, and transmits the control command to the interchangeable lens 100. In this manner, by using an intermediate adapter having an AF speed setting function, a camera system having an AF drive range change function can be provided even when the camera body, the interchangeable lens, or the like does not have an AF drive range change function. In other words, the user's intentions in the AF function implemented between the camera body and the interchangeable lens can be reflected.

Fourth Embodiment

A fourth embodiment will be described next. In the camera system of the present embodiment, the camera body 200 and the interchangeable lens 100 are connected through the intermediate adapter 300 having a focus fine-tuning function. However, the configuration of the camera system in the present embodiment can be substantially the same as in the above embodiments. As such, configurations and processes identical or substantially identical to those in the foregoing embodiment will be assigned the same reference signs and redundant descriptions will be skipped, with attention focused on the differences.

Focus Fine-Tuning Function

The focus fine-tuning function will be described first. Generally, when shooting scenes such as a starry sky, the camera body is often fixed to a tripod and the MF function is used to fine-tune the focus, rather than using the AF function. For example, the focus can be fine-tuned by manipulating a manual control ring. However, with this method, it is difficult to operate the manual control ring by small amounts, which makes it difficult to fine-tune the focus. To give another example, there is a method in which the focus is fine-tuned by controlling the camera body from a smartphone application. However, it tends to take time before the camera body can be controlled by the application, and the inability to shoot an image quickly can result in missed changes to take a shot. Furthermore, this function can only be used with a camera body supported by the application.

The focus fine-tuning function is a function that can fine-tune the focus without requiring delicate operations. For example, in the present embodiment, when the operation member 707 or 708 provided in the intermediate adapter 300 is depressed, the focus lens 104 is driven to the infinite side and the near side, respectively, according to the number of times the member is depressed. Doing so makes it possible to fine-tune the focus without making delicate adjustments as with the manual control ring. Note that the focus fine-tuning function is not limited thereto, and may be a method which, for example, continuously drives the focus little by little while an operation member is being depressed. Furthermore, the function is not limited to one which fine-tunes the focus, and may instead be configured to drive the focus broadly to make larger adjustments, for example.

The processing of the camera system having the focus fine-tuning function in the present embodiment will be described next with reference to the sequence chart in FIG. 16. First, the processing of steps S901 to S907 is executed in the same manner as in the foregoing embodiments, and the focus information of the interchangeable lens 100 is transmitted to the intermediate adapter 300 and the camera body 200.

When the operation member 707 or 708 provided in the intermediate adapter 300 is operated and the operations of the focus fine-tuning function are started, in step S1601, the intermediate adapter 300 transmits a focus drive command to the interchangeable lens 100. The focus can be fine-tuned without the user making small operations by the intermediate adapter 300 transmitting a minute focus drive amount to the interchangeable lens 100 each time the operation member 707 or 708 is operated. Additionally, the intermediate adapter 300 may transmit information indicating that the interchangeable lens 100 is in the MF state to the camera body 200. Doing so makes it possible to ensure that unnecessary focus drive commands are not transmitted from the camera body 200 to the interchangeable lens 100. Note that the appropriate focus drive amount differs depending on the lens, but this point will be discussed later. Although the foregoing example describes a case where the operation member 707 or 708 is used, the configuration is not limited thereto, and for example, an electronic ring such as the operation member 701, which provides a clicking sensation, a lever (not shown), or the like may be used instead. The user operating the operation member 707 or 708 means that the user wishes to use the focus fine-tuning function, and thus the intermediate adapter 300 may take a set period following the completion of step S1601 as a period in which step S1603, which is AF operations, is not performed (not shown). Alternatively, the intermediate adapter 300 may take a set period after accepting the start of the focus fine-tuning function through the operation member 707 or the like as a period in which step S1603 is not performed even if a focus drive command is accepted. Note that at this time, the intermediate adapter 300 may convert the focus information stored by the intermediate adapter 300 itself into information indicating a state different from the newest focus information obtained in step S905. Here, in addition to the FPC information described above, the focus information may include the focus drive state indicating whether the focus lens 104 is being driven, the AF/MF information indicating whether the interchangeable lens 100 is in the AF state or the MF state, and the like. For example, even if the focus information from the interchangeable lens 100 indicates the AF state, the intermediate adapter 300 may update the focus information stored by the intermediate adapter 300 itself to the MF state and transmit an indication of the MF state to the camera body 200. Notifying the camera body 200 of the MF state makes it possible to suppress unnecessary focus drive commands. Furthermore, depending on the camera, if the camera body 200 is not capable of shooting in AF mode, being in the MF state makes it possible to shoot.

After the focus is fine-tuned using the focus fine-tuning function of the intermediate adapter 300, the AF operations are performed in response to an operation made in the camera body 200. When the AF operations are started by operating the operation member 207 of the camera body 200, in steps S1602 and S1603, a focus drive command is transmitted from the camera body 200 to the interchangeable lens 100 after the communication protocol conversion processing by the intermediate adapter 300. Upon receiving this focus drive command, the interchangeable lens 100 drives the focus lens 104 and updates the focus information managed by the interchangeable lens 100.

Then, in steps S1604 and S1605, the focus information request from the camera body 200 is transmitted to the interchangeable lens 100 after the communication protocol conversion processing by the intermediate adapter 300. Upon receiving this focus information request, the interchangeable lens 100 responds with the focus information managed by the interchangeable lens 100. This response is transmitted to the camera body 200 after the communication protocol conversion processing by the intermediate adapter 300 in steps S1606 and S1608. Additionally, in step S1607, the intermediate adapter 300 updates the focus information stored by the intermediate adapter 300 itself based on the newest focus information obtained in step S1606. The above-described operations enable the focus fine-tuning function to operate temporarily during adapter operations, and then return to AF operations based on instructions from the camera body 200.

Series of Operations Involved in Focus Fine-Tuning Function

Figure 17:
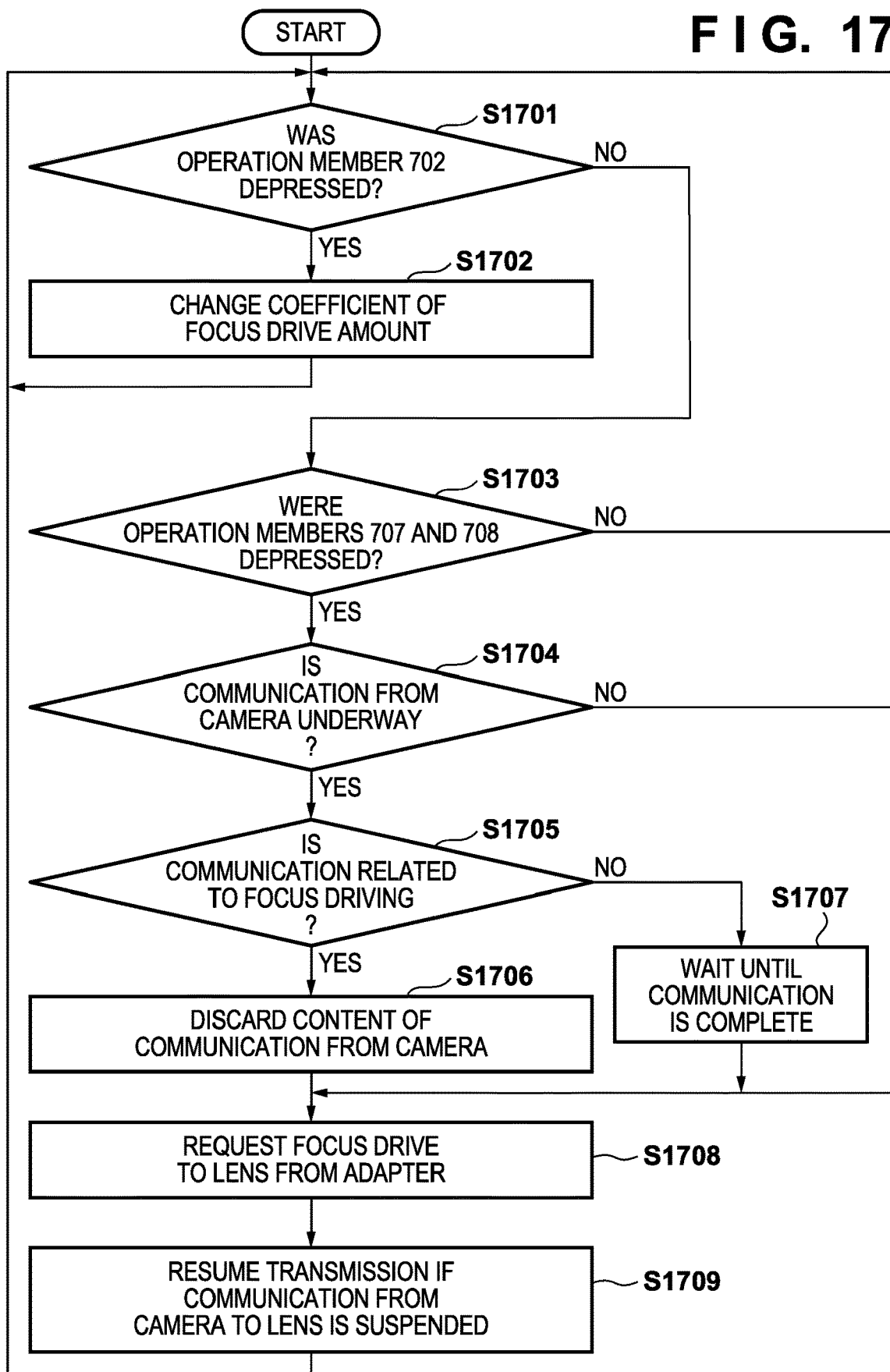
FIG. 17 is a flowchart illustrating operations of the focus fine-tuning function of the camera system according to the fourth embodiment.

A series of operations by the intermediate adapter 300 having the focus fine-tuning function in the present embodiment will be described next with reference to FIG. 17. Note that this series of operations may be realized by the adapter microcomputer 302 executing a program.

In step S1701, the adapter microcomputer 302 determines whether the operation member 702 provided in the intermediate adapter 300 has been depressed. The adapter microcomputer 302 moves the sequence to step S1702 if the operation member 702 has been depressed, and to step S1703 if not. In step S1702, the adapter microcomputer 302 changes a coefficient of the focus drive amount. This will be described in detail later with reference to step S1708.

In step S1703, the adapter microcomputer 302 determines whether the operation member 707 or 708 provided in the intermediate adapter 300 has been depressed (whether the focus fine-tuning function has started). The adapter microcomputer 302 moves the sequence to step S1704 if the operation member 707 or 708 has been depressed, and to step S1701 if not. In step S1704, the adapter microcomputer 302 determines whether communication is underway from the camera body 200 to the interchangeable lens 100. The adapter microcomputer 302 moves the sequence to step S1705 if communication is underway, and to step S1708 if not. In step S1705, the adapter microcomputer 302 determines whether the data which the camera body 200 is attempting to transmit to the interchangeable lens 100 is data related to focus driving. "Data related to focus driving" refers to, for example, focus drive commands, focus stop commands, and the like. The adapter microcomputer 302 moves the sequence to step S1706 if the data involved in the transmission from the camera body 200 to the interchangeable lens 100 is data related to focus driving, and to step S1707 if not. In step S1706, the adapter microcomputer 302 operates so that the intermediate adapter 300 behaves in the same manner as when data involved in focus driving in not transmitted to the interchangeable lens 100. For example, one method has the adapter microcomputer 302 discarding the data so that a request is not transmitted from the intermediate adapter 300 to the interchangeable lens 100. Alternatively, the adapter microcomputer 302 may transmit meaningless data from the intermediate adapter 300 to the interchangeable lens 100 (specifically, data which does not drive the focus). This is because the user is attempting to fine-tune the focus, and inadvertently driving the focus may confuse the user. Although not shown, if the focus lens 104 is not to be driven from the current state, a command to stop focus driving may be sent to the interchangeable lens 100.

In step S1707, the adapter microcomputer 302 waits until the communication transmitted from the camera body 200 to the interchangeable lens 100 is complete. For example, if the adapter microcomputer 302 recognizes that a focus information request is being communicated, the adapter microcomputer 302 waits until that communication is complete. Doing so makes it possible to transmit the focus drive command from the intermediate adapter 300 to the interchangeable lens 100 such that inconsistencies do not arise in the camera system.

In step S1708, the adapter microcomputer 302 transmits a focus drive amount, based on the operation of the operation member 707 or 708 provided in the intermediate adapter 300, from the intermediate adapter 300 to the interchangeable lens 100. For example, in response to the operation member 707 being depressed, the adapter microcomputer 302 transmits data to the interchangeable lens 100 to drive the focus lens 104 to the infinite side. Similarly, in response to the operation member 708 being depressed, the adapter microcomputer 302 transmits data to the interchangeable lens 100 to drive the focus lens 104 to the near side. At this time, the usability is improved by having the adapter microcomputer 302 reflect the coefficient of the focus drive amount updated in step S1702 in the drive amount. For example, in step S1702, it is conceivable for the adapter microcomputer 302 to simply perform operations for changing the multiple of the focus drive amount to ¼×, ½×, 1×, 2×, and 4×. The user selects the desired coefficient for the focus drive amount according to the type of the lens, the focal length, the aperture value, or the like. Doing so makes it possible to provide an appropriate focus fine-tuning function for a single press of the operation member 707 or 708. Additionally, the adapter microcomputer 302 may ensure that the focus lens 104 is driven with certainty by notifying the interchangeable lens 100 that the status is the AF state at the point in time of the start of this series of processing. The details described here are merely an example, and it is widely known that the depth of field (the range of distance on the side of the subject field where a photograph appears to be in focus) changes depending on the size of the pixels, the focal length and aperture value, and the like. Accordingly, the configuration may be such that the adapter microcomputer 302 makes the determination based on that information and changes the coefficient. Furthermore, the configuration may be such that changes to the coefficient of the focus drive amount are accepted from an external device such as a smartphone (not shown). Additionally, although an example of changing the coefficient of the focus drive amount has been given here, the configuration may be such that the focus drive speed is changed. Furthermore, when it is not desirable for focus drive sounds to be recorded when recording a moving image, the configuration may be such that a limitation is placed on the focus drive amount, the focus drive speed, or the like.

Note that in this series of operations, if the camera body 200 transmits data to the interchangeable lens 100 while focus driving data is being transmitted from the intermediate adapter 300 to the interchangeable lens 100, it is necessary to suspend the communication between the camera body 200 and the interchangeable lens 100. In the case of the first communication, the communication pause period can be expressed by the BUSY frame. Accordingly, a BUSY frame may be maintained in the communication between the camera body 200 and the intermediate adapter 300 while focus drive data is being transmitted from the intermediate adapter 300 to the interchangeable lens 100.

In step S1709, if the transmission from the camera body 200 to the interchangeable lens 100 is suspended, the adapter microcomputer 302 resumes that transmission. Once the processing of step S1709 ends, the adapter microcomputer 302 may end this processing, or may resume from the start to repeat this processing, i.e., may move the sequence to step S1701.

As described thus far, according to the present embodiment, the intermediate adapter 300 first accepts an operation to operate a focus fine-tuning function, which assists the AF operations by the camera body 200. Then, based on this operation and the control command for AF operations from the camera body, the focus fine-tuning function is realized by controlling the transmission of the control command to the interchangeable lens. In particular, the intermediate adapter 300 controls the focus lens of the interchangeable lens based on operations pertaining to the focus fine-tuning function while suppressing the transmission of control commands to the interchangeable lens 100. In this manner, using an intermediate adapter having a focus fine-tuning function makes it possible to provide a camera system having a focus fine-tuning function regardless of the combination of the camera body and the interchangeable lens. In other words, the user's intentions in the AF function implemented between the camera body and the interchangeable lens can be reflected.

Fifth Embodiment

Next, a fifth embodiment will be described. In the camera system of the present embodiment, the camera body 200 and the interchangeable lens 100 are connected through the intermediate adapter 300 having an MF function. However, the configuration of the camera system in the present embodiment can be substantially the same as in the above embodiments. As such, configurations and processes identical or substantially identical to those in the foregoing embodiment will be assigned the same reference signs and redundant descriptions will be skipped, with attention focused on the differences.

MF Function

In the present embodiment, the focus lens 104 is driven in accordance with an operation amount by operating the operation member 701 provided in the intermediate adapter 300, even if the camera body 200 is set to an AF mode. This is because there are situations where it is desirable for the camera body 200 to be capable of MF operations while shooting in the AF mode. For example, when the subject has low brightness or low contrast and it is therefore difficult to focus through AF, it is desirable that the user be able to quickly adjust the focus through MF operations. With the intermediate adapter 300 of the present embodiment, the user can quickly adjust the focus even in such scenes, without switching the setting of the camera body 200 from AF mode to MF mode.

Figure 18:
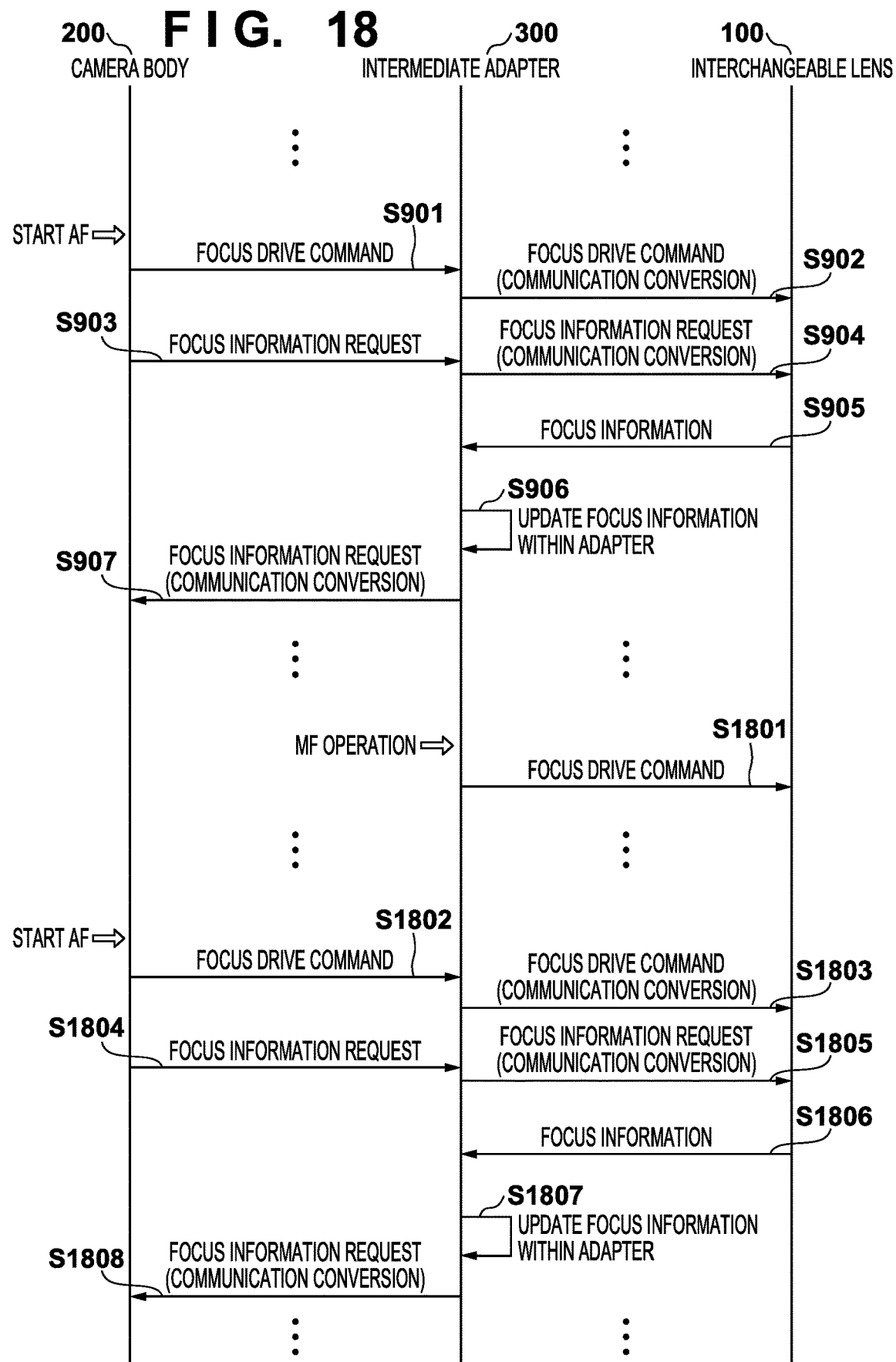
FIG. 18 is a diagram illustrating a sequence of a temporary MF function of the camera system according to a fifth embodiment.

The processing of the camera system having the MF function in the present embodiment will be described next with reference to the sequence chart in FIG. 18. First, the processing of steps S901 to S907 is executed in the same manner as in the foregoing embodiments, and the focus information of the interchangeable lens 100 is transmitted to the intermediate adapter 300 and the camera body 200.

When the MF function operations are started by the operation member 701 provided in the intermediate adapter 300, in step S1801, the intermediate adapter 300 transmits a focus drive command to the interchangeable lens 100. The intermediate adapter 300 implements an operation similar to when the manual control ring 130 provided in the interchangeable lens 100 is operated, by changing the focus drive amount in accordance with the operation amount of the operation member 701. For example, the focus lens 104 can be driven by a small MF operation amount when the user rotates the manual control ring 130 a small amount, and by a large MF operation amount when the user rotates the manual control ring 130 a large amount. At this time, the intermediate adapter 300 may transmit an indication that the lens is in the MF state to the camera body 200 to ensure that unnecessary focus drive commands are not transmitted from the camera body 200 to the interchangeable lens 100. Note that the appropriate focus drive amount differs depending on the lens, but this point will be discussed later. Note also that although a case where the operation member 701 is used is given as an example, it is not necessary to limit the present embodiment to this configuration. For example, the configuration may be such that the MF operation amount is changed according to the length of time for which the operation member 707 or 708 is depressed, or the MF operation amount is changed according to the operation amount of a lever (not shown). The user operating the operation member 701 means that the user wishes to use the MF function, and thus a set period following the completion of step S1801 may be taken as a period in which step S1803, which is AF operations, is not performed (not shown). Alternatively, the intermediate adapter 300 may take a set period after accepting the start of the MF function through the operation member 701 or the like as a period in which step S1803 is not performed even if a focus drive command is accepted. Note that at this time, the intermediate adapter 300 may convert the focus information stored by the intermediate adapter 300 itself into information indicating a state different from the newest focus information obtained in step S1806. The focus information is information that includes, in addition to the FPC information described above, the focus drive state indicating whether the focus lens 104 is currently being driven, the AF/MF information indicating whether the interchangeable lens 100 is in the AF state or the MF state, and the like. For example, even if the focus information from the interchangeable lens 100 indicates the AF state, the intermediate adapter 300 may update the focus information stored by the intermediate adapter 300 itself to the MF state and transmit an indication of the MF state to the camera body 200. Notifying the camera body 200 of the MF state makes it possible to suppress unnecessary focus drive commands. Furthermore, depending on the camera, if the camera body 200 is not capable of shooting in AF mode, being in the MF state makes it possible to shoot.

After the MF function of the intermediate adapter 300 is complete, AF operations are performed in accordance with the operation of the operation member 207 of the camera body 200. When the AF operations are started by operating the operation member 207 of the camera body 200, in steps S1802 and S1803, a focus drive command is transmitted to the interchangeable lens 100 after the communication protocol conversion processing by the intermediate adapter 300. Upon receiving this focus drive command, the interchangeable lens 100 drives the focus lens 104 and updates the focus information managed by the interchangeable lens 100.

In steps S1804 and S1805, the focus information request from the camera body 200 is transmitted to the interchangeable lens 100 after the communication protocol conversion processing by the intermediate adapter 300. Upon receiving this focus information request, the interchangeable lens 100 responds with the focus information managed by the interchangeable lens 100. This response is transmitted to the camera body 200 after the communication protocol conversion processing by the intermediate adapter 300 in steps S1806 and S1808. Additionally, in step S1807, the intermediate adapter 300 updates the focus information stored by the intermediate adapter 300 itself based on the newest focus information obtained in step S1806. The above-described operations enable the focus function to operate temporarily during adapter operations, and then return to AF operations based on instructions from the camera body 200.

Series of Operations Involved in MF Function

Figure 19:
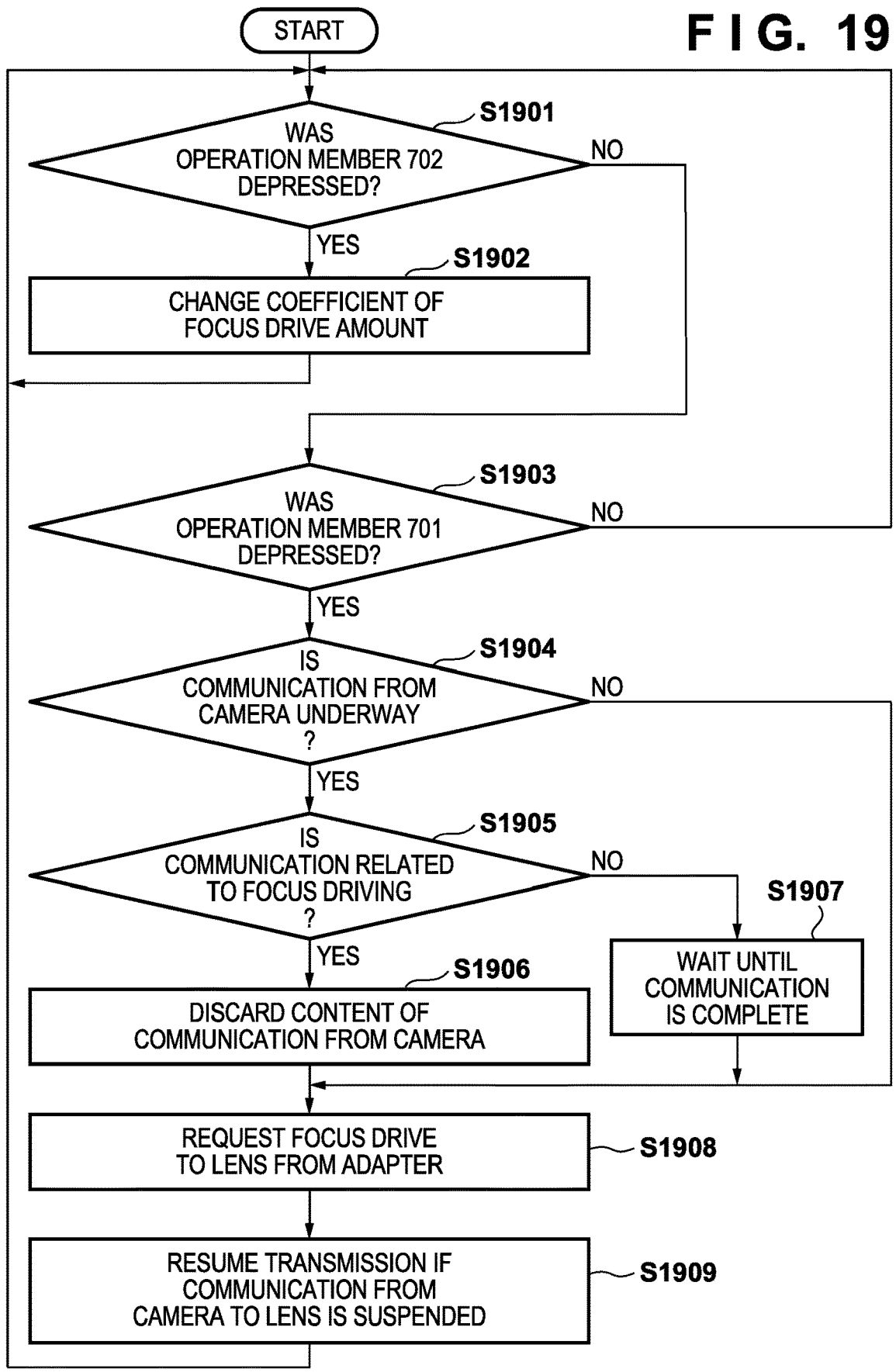
FIG. 19 is a flowchart illustrating operations of the temporary MF function of the camera system according to the fifth embodiment.

A series of operations by the intermediate adapter 300 capable of temporarily providing the MF function even when the camera body 200 is set to the AF mode in the present embodiment will be described next with reference to FIG. 19. Note that this series of operations may be realized by the adapter microcomputer 302 executing a program.

In step S1901, the adapter microcomputer 302 determines whether the operation member 702 provided in the intermediate adapter 300 has been depressed. The adapter microcomputer 302 moves the sequence to step S1902 if the operation member 702 has been depressed, and to step S1903 if not. In step S1902, the adapter microcomputer 302 changes a coefficient of the focus drive amount. This will be described in detail later with reference to step S1908. In step S1903, the adapter microcomputer 302 determines whether the operation member 701 provided in the intermediate adapter 300 has been operated. The adapter microcomputer 302 moves the sequence to step S1904 if the operation member 701 has been operated, and to step S1901 if not. In step S1904, the adapter microcomputer 302 determines whether communication is underway from the camera body 200 to the interchangeable lens 100. The adapter microcomputer 302 moves the sequence to step S1905 if communication is underway, and to step S1907 if not. In step S1905, the adapter microcomputer 302 determines whether the data which the camera body 200 is attempting to transmit to the interchangeable lens 100 is data related to focus driving. "Data related to focus driving" refers to, for example, focus drive commands, focus stop commands, and the like, as described above. The adapter microcomputer 302 moves the sequence to step S1906 if the data is data related to focus driving, and to step S1907 if not. In step S1906, the adapter microcomputer 302 operates so that the intermediate adapter 300 behaves in the same manner as when data involved in focus driving in not transmitted to the interchangeable lens 100. A specific example may be the same as that described for the focus fine-tuning function in the fourth embodiment.

In step S1907, the adapter microcomputer 302 waits until the communication transmitted from the camera body 200 to the interchangeable lens 100 is complete. For example, if the intermediate adapter 300 recognizes that a focus information request is being communicated, the intermediate adapter 300 waits until that communication is complete. Doing so makes it possible to transmit the focus drive command from the intermediate adapter 300 to the interchangeable lens 100 such that inconsistencies do not arise in the camera system.

In step S1908, the adapter microcomputer 302 transmits a focus drive amount, based on the operation of the operation member 701 provided in the intermediate adapter 300, from the intermediate adapter 300 to the interchangeable lens 100. At this time, the usability is improved by reflecting the coefficient of the focus drive amount updated in step S1902 in the drive amount. For example, in step S1902, a configuration is conceivable in which the adapter microcomputer 302 to simply changes the multiple of the focus drive amount to ¼×, ½×, 1×, 2×, and 4×. The user selects the desired coefficient for the focus drive amount according to the type of the lens, the focal length, the aperture value, or the like. Doing so makes it possible to provide an MF function in which the relationship between the operation amount of the operation member 701 and the focus drive amount is set appropriately. Additionally, the adapter microcomputer 302 may ensure that the focus lens 104 is driven with certainty by notifying the interchangeable lens 100 that the status is the AF state at the start of this step. The details described here are merely an example, and it is widely known that the depth of field (the range of distance on the side of the subject field where a photograph appears to be in focus) changes depending on the size of the pixels, the focal length and aperture value, and the like. Accordingly, the configuration may be such that the adapter microcomputer 302 makes the determination based on that information and changes the coefficient. Furthermore, the configuration may be such that the coefficient of the focus drive amount can be changed from an external device such as a smartphone (not shown). Additionally, although an example of changing the coefficient of the focus drive amount has been given here, the configuration may be such that the focus drive speed is changed. Furthermore, when it is not desirable for focus drive sounds to be recorded when recording a moving image, the configuration may be such that a limitation is placed on the focus drive amount, the focus drive speed, or the like.

Note that in this series of operations, if the camera body 200 is transmitting data to the interchangeable lens 100 while focus driving data is being transmitted from the intermediate adapter 300 to the interchangeable lens 100, it is necessary to suspend the communication between the camera body 200 and the interchangeable lens 100. In the case of the first communication, the communication pause period can be realized by a BUSY frame, and thus a BUSY frame may be maintained in the communication between the camera body 200 and the intermediate adapter 300 while focus drive data is being transmitted from the intermediate adapter 300 to the interchangeable lens.

In step S1909, if the transmission from the camera body 200 to the interchangeable lens 100 is suspended, the adapter microcomputer 302 resumes that transmission. Once the processing of step S1909 ends, the adapter microcomputer 302 may end this processing, or may resume from the start to repeat this processing, i.e., may move the sequence to step S1901.

As described thus far, according to the present embodiment, operations pertaining to a temporary MF function, which assists the AF operations by the camera body 200, are accepted. Then, based on this operation and the control command for AF operations from the camera body 200, the MF function is realized by controlling the transmission of the control command to the interchangeable lens. In particular, the intermediate adapter 300 controls the focus lens of the interchangeable lens based on operations pertaining to the MF function while suppressing the transmission of control commands to the interchangeable lens 100. In this manner, a camera system capable of temporarily providing an MF function while executing an AF function can be provided, regardless of the combination of the camera body and the interchangeable lens. In other words, the user's intentions in the AF function implemented between the camera body and the interchangeable lens can be reflected.

Sixth Embodiment

Next, a sixth embodiment will be described. In the camera system of the present embodiment, the intermediate adapter 300 stores the focus position and implements playback driving. The configuration of the camera system in the present embodiment can be substantially the same as in the above embodiments. As such, configurations and processes identical or substantially identical to those in the foregoing embodiment will be assigned the same reference signs and redundant descriptions will be skipped, with attention focused on the differences.

Operations of Intermediate Adapter 300 during Processing of Initializing "FPC Information"

Figure 20:
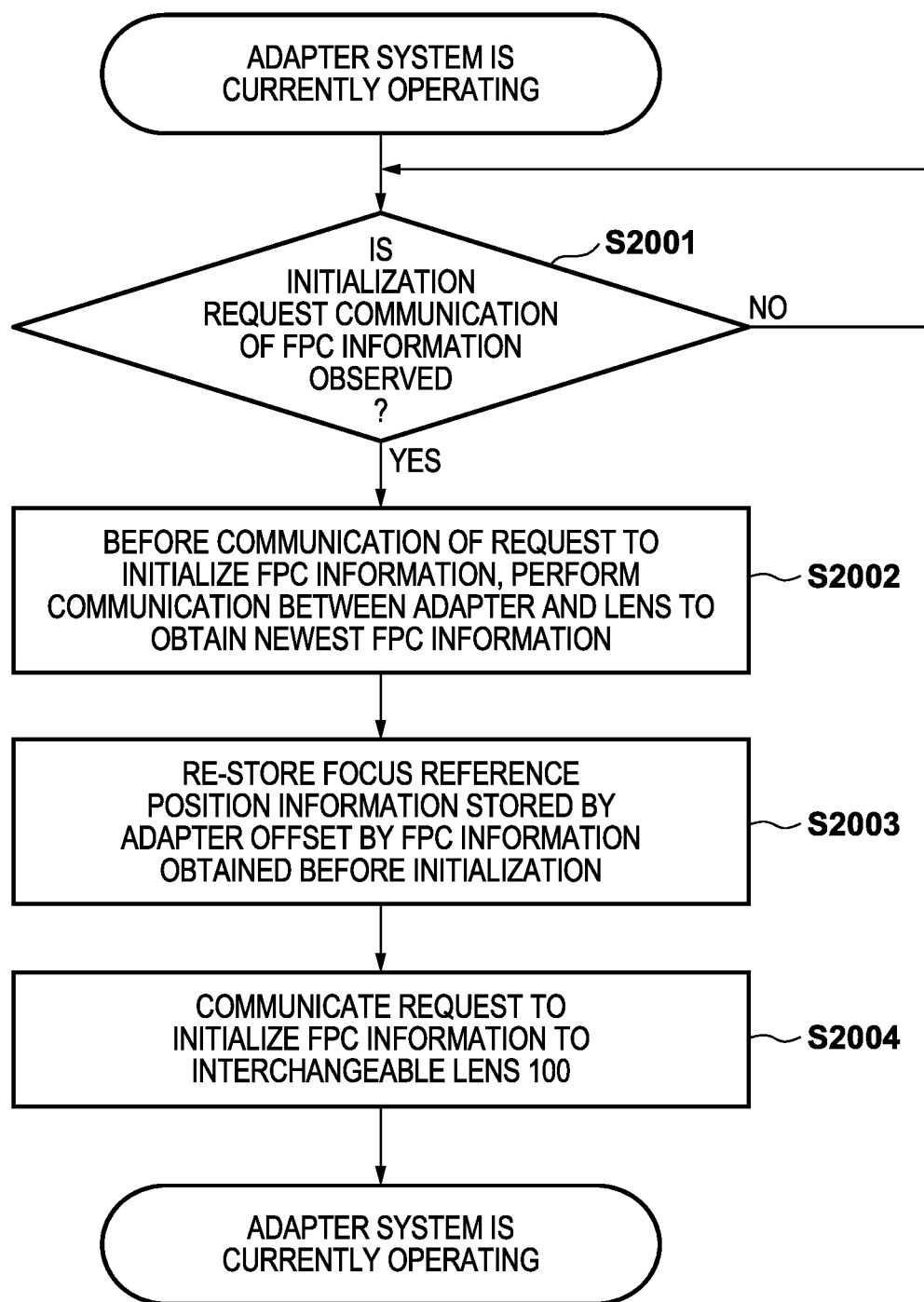
FIG. 20 is a flowchart illustrating operations for updating "focus reference position information" stored by the intermediate adapter according to a sixth embodiment.

A series of operations for updating the "focus reference position information" managed internally by the intermediate adapter 300, performed when processing for initializing the "FPC information" is performed between the camera body 200 and the interchangeable lens 100, will be described with reference to FIG. 20. Note that this series of operations may be realized by the adapter microcomputer 302 executing a program.

In step S2001, the adapter microcomputer 302 determines the content of the communication from the camera body 200, and determines whether or not the communication is an initialization request for the "FPC information". The adapter microcomputer 302 moves the sequence to step S2002 if the communication is communication related to the initialization request, and repeats the processing of step S2001 if not.

In step S2002, the adapter microcomputer 302 performs processing for obtaining the newest "FPC information" for the interchangeable lens 100. This processing is performed before requesting the interchangeable lens 100 to initialize the "FPC information". In step S2003, the adapter microcomputer 302 re-stores the "focus reference position information", stored by the intermediate adapter 300 itself, offset by the newest "FPC information" obtained in step S2002. In step S2004, the adapter microcomputer 302 converts the communication protocol for the initialization request for the "FPC information" detected in step S2001 and transmits the result to the interchangeable lens 100.

By performing the above-described processing, the intermediate adapter 300 can ascertain the absolute position of the focus using the "focus position information", even if focus drive control has been performed between the camera body 200 and the interchangeable lens 100. At this time, the intermediate adapter 300 can obtain the "focus position information" by adding the "focus reference position information" managed by the intermediate adapter 300 itself with the "FPC information" exchanged between the camera body 200 and the interchangeable lens 100.

Figures 1, 25A:
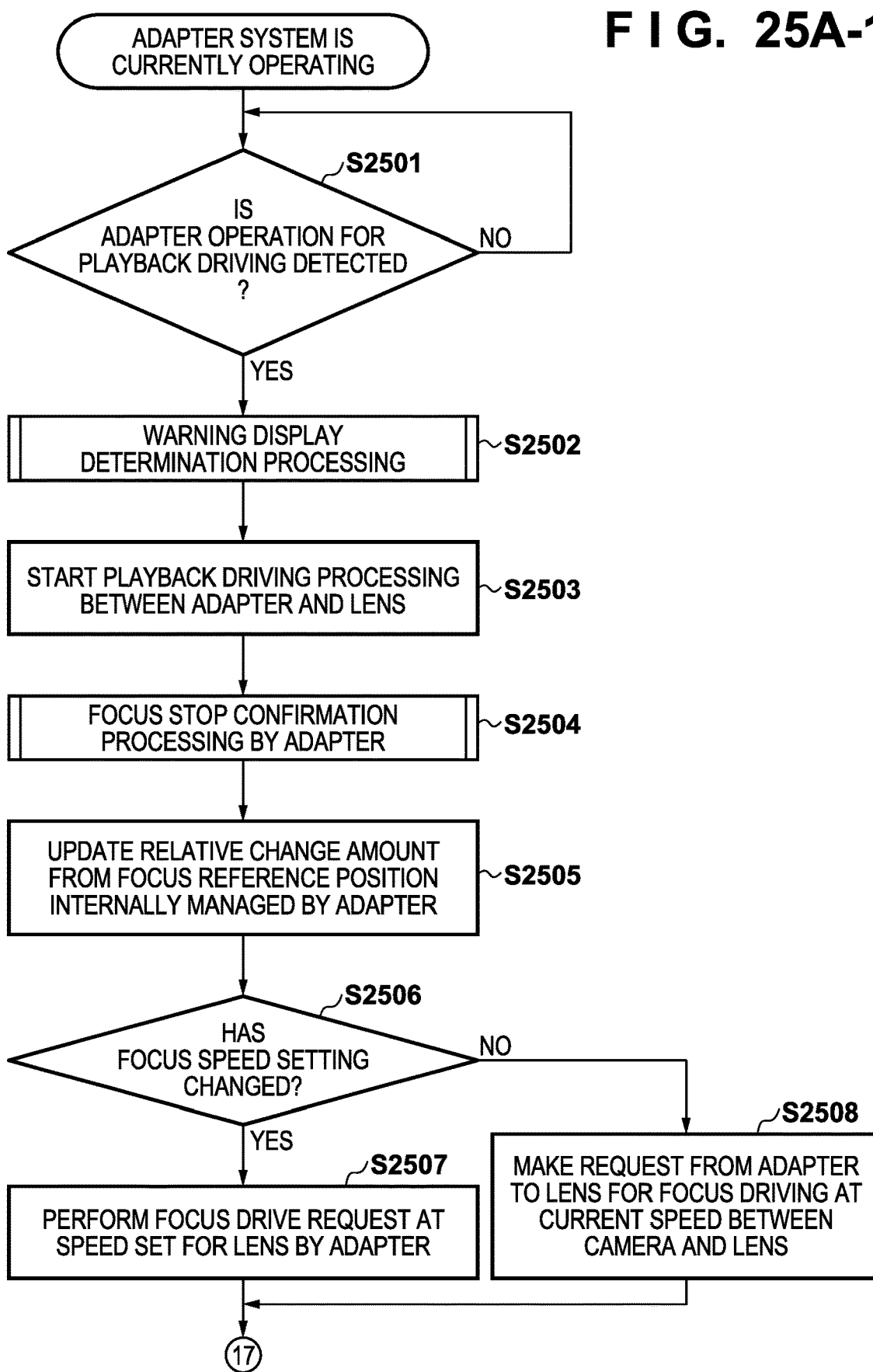
FIGS. 25A-1 and 25A-2 are flowcharts illustrating operations performed in focus position playback operations according to the sixth embodiment.
Figures 2, 25A:
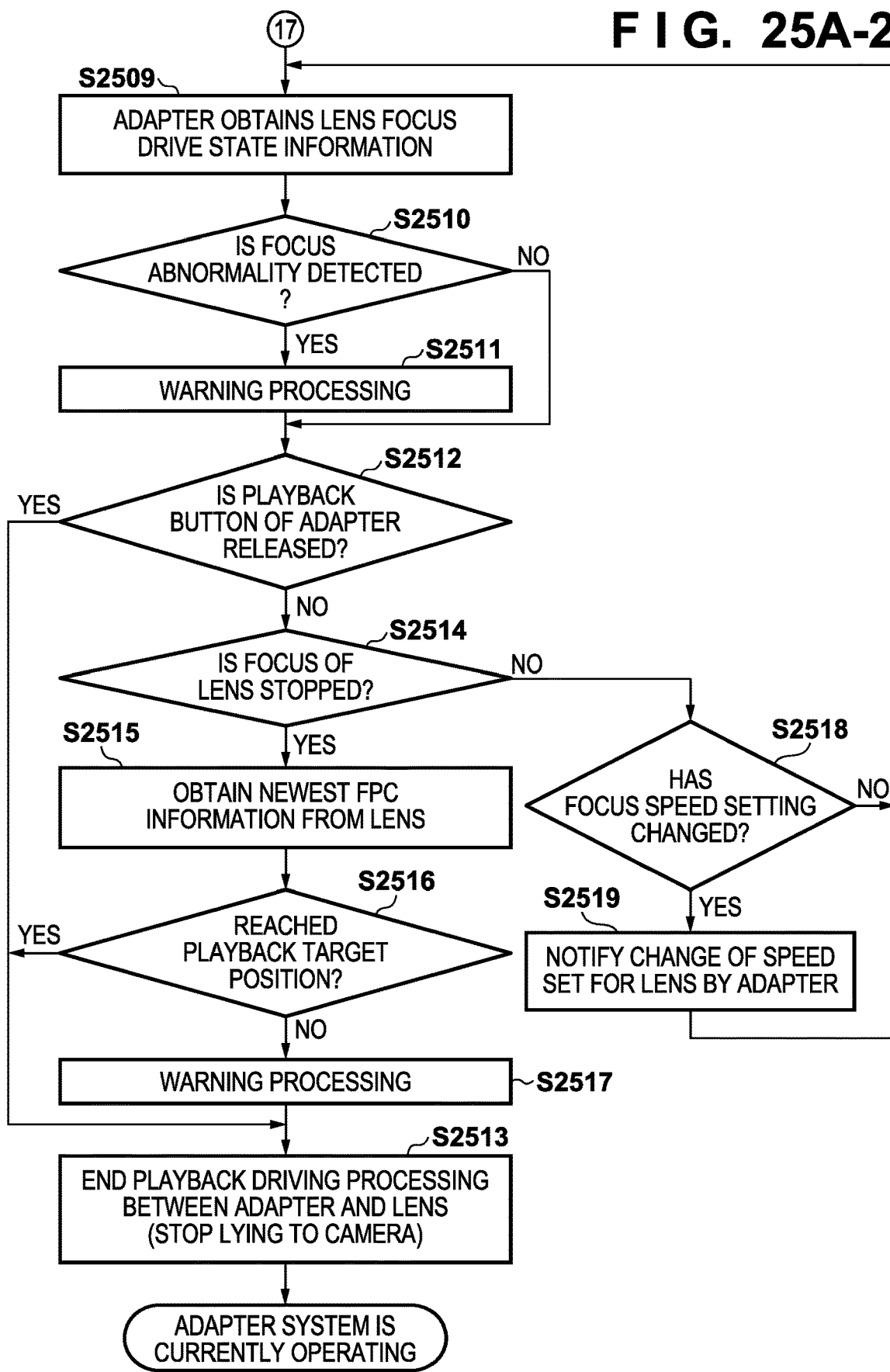
Figure 25B:
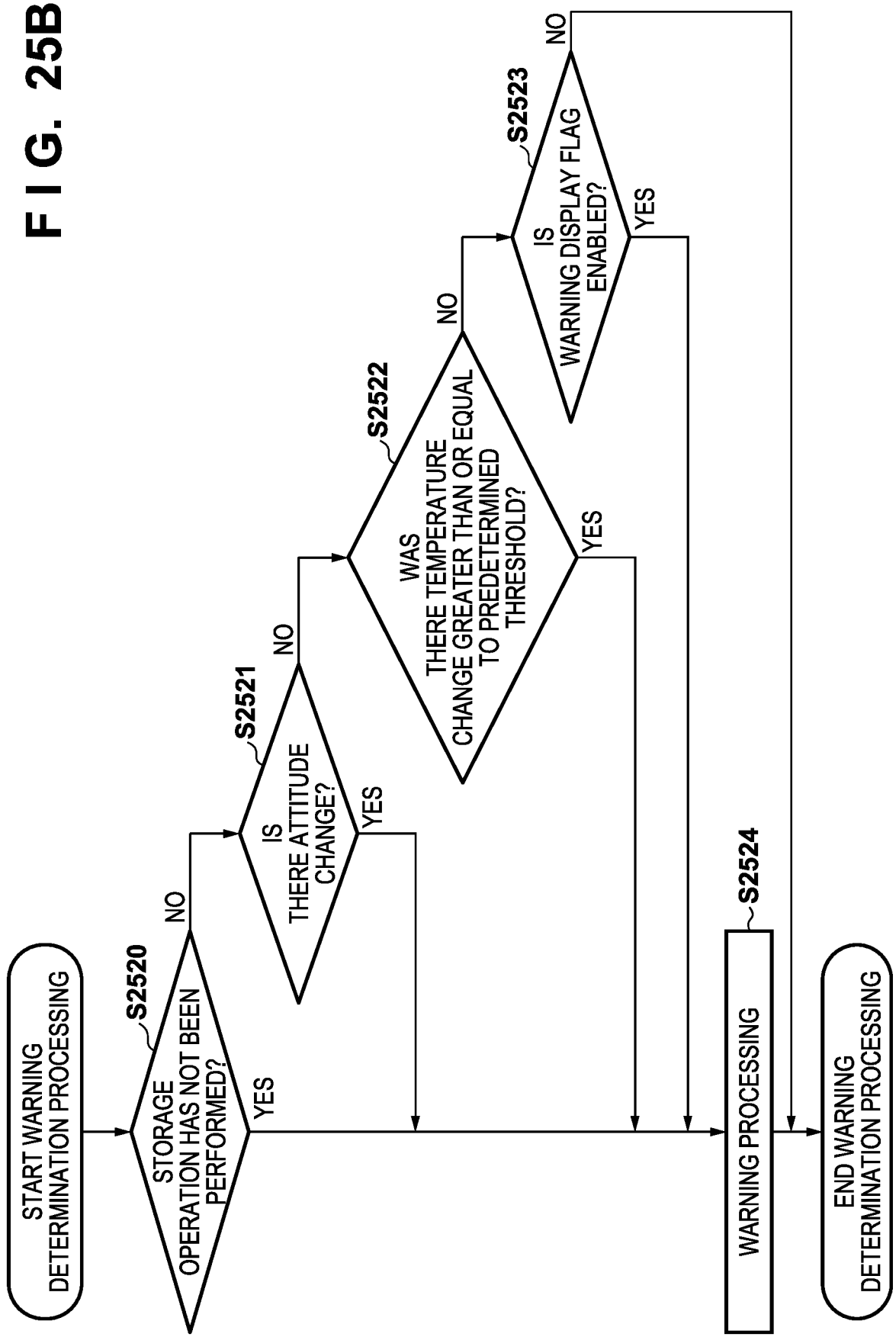
FIG. 25B is a flowchart illustrating operations performed in warning display processing according to the sixth embodiment.

However, as will be described later with respect to a warning display subroutine 2502 indicated in FIG. 25B, when zoom driving is performed, errors may occur between the focus position as the actual focus plane and the "FPC information" due to the mechanical structure. Alternatively, depending on the type of the actuator that controls the driving of the focus lens 104, errors may occur between the focus position as the actual focus plane and the "FPC information" when focus driving is performed repeatedly. The intermediate adapter 300 manages the focus position information using the "FPC information" exchanged between the camera body 200 and the interchangeable lens 100, and the reliability of the "focus reference position information" managed by the intermediate adapter 300 may decrease as a result. In such a case, the intermediate adapter 300 performs update processing for the "focus reference position", illustrated in FIG. 21A, in response to the "focus reference position" reset button (the operation member 704) provided in the intermediate adapter 300 being depressed.

Update Processing for "Focus Reference Position Information" by Intermediate Adapter 300

Figure 21A:
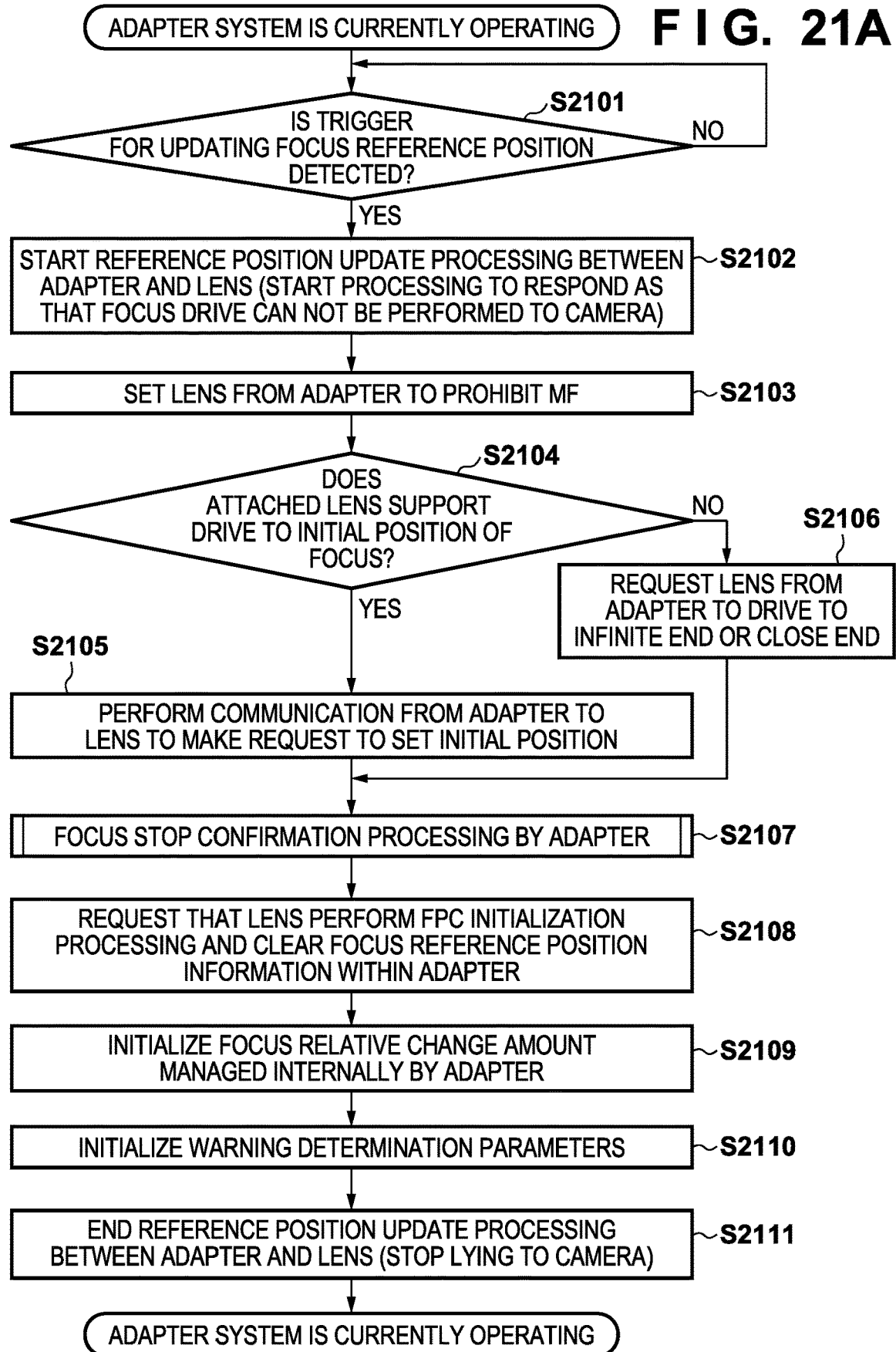
FIG. 21A is a flowchart illustrating operations in update processing for a "focus reference position" stored by the intermediate adapter according to the sixth embodiment.

The "focus reference position" update processing will be described next with reference to FIG. 21A. Note that this series of operations may be realized by the adapter microcomputer 302 executing a program. In step S2101, the adapter microcomputer 302 determines whether there is a trigger for updating the "focus reference position" within the intermediate adapter 300. The trigger corresponds to the operation member 704 being depressed, for example. The adapter microcomputer 302 moves the sequence to step S2102 if the trigger is detected, and repeats the processing of step S2101 if not.

In step S2102, the adapter microcomputer 302 starts the update processing for the "focus reference position" between the intermediate adapter 300 and the interchangeable lens 100. As will be described later with respect to steps S2112 and beyond, which corresponds to a detailed description of step S2107, the intermediate adapter 300 cannot accept focus driving from the camera body 200 during this processing. Accordingly, the adapter microcomputer 302 disguises the state of the interchangeable lens 100 from the camera body 200, e.g., as being in manual focus.

In step S2103, the adapter microcomputer 302 communicates with the interchangeable lens 100 to prohibit manual focus (MF) operations. This processing is processing for preventing the "FPC information" within the interchangeable lens 100 from being changed by MF operations of the interchangeable lens 100 while the "focus reference position information" managed by the intermediate adapter 300 is being updated, as will be described below.

In step S2104, the adapter microcomputer 302 determines whether the interchangeable lens 100 is a lens which can confirm an absolute reference position of the focus lens 104. The adapter microcomputer 302 makes this determination for the lens using the authentication information communicated to the intermediate adapter 300 by the interchangeable lens 100 in step S805. A lens configuration in which a device capable of precisely detecting an absolute position, called a "reset sensor", is provided at a specific position within the focus drive range, can be given as an example of such a lens capable of confirming the absolute reference position of the focus lens 104. With such a lens, the absolute position of the focus can be reconfirmed by driving the focus lens 104 to the position where the aforementioned reset sensor is disposed. If the intermediate adapter 300 determines, based on the authentication information, that a lens capable of confirming the absolute reference position of the focus, the sequence moves to step S2105, and if not, the sequence moves to step S2106.

In step S2105, the adapter microcomputer 302 makes a request to the interchangeable lens 100 from the intermediate adapter 300 to confirm the absolute reference position of a focus unit. In step S2106, the adapter microcomputer 302 transmits a request, from the intermediate adapter 300 to the interchangeable lens 100, to drive the focus lens 104 to the infinite end or the close end. In step S2107, the adapter microcomputer 302 performs processing to wait for the focus lens 104 to stop or processing to ignore the focus drive request from the camera body 200. This will be described in detail with reference to FIG. 21B.

In step S2108, the adapter microcomputer 302 is in a state in which the focus lens 104 has reached, and is stopped at, the infinite end or the close end. In this state, the adapter microcomputer 302 requests the interchangeable lens 100 to initialize the "FPC information", and initializes the "focus reference position information" managed by the intermediate adapter 300 itself. At this point in time, the "FPC information" exchanged between the camera body 200 and the interchangeable lens 100 and the "focus reference position information" managed by the intermediate adapter 300 are initialized to the same value again.

In step S2109, the adapter microcomputer 302 initializes the "focus relative change amount" managed internally by the intermediate adapter 300. The "focus relative change amount" is a parameter indicating a change amount of the focus lens as a differential value from the "focus reference position information", and will be described in detail later. In step S2110, the adapter microcomputer 302 initializes various "warning determination parameters" for determining a state in which the accuracy of the focus position playback drive cannot be ensured, which will be described later with reference to the warning display subroutine 2502 indicated in FIG. 25B. In step S2111, the adapter microcomputer 302 ends the update processing for the "focus reference position information" between the intermediate adapter 300 and the interchangeable lens 100. The adapter microcomputer 302 cancels the prohibition of the MF operations set in step S2102 (the processing that ensures focus drive requests are not accepted from the camera body 200).

Figure 21B:
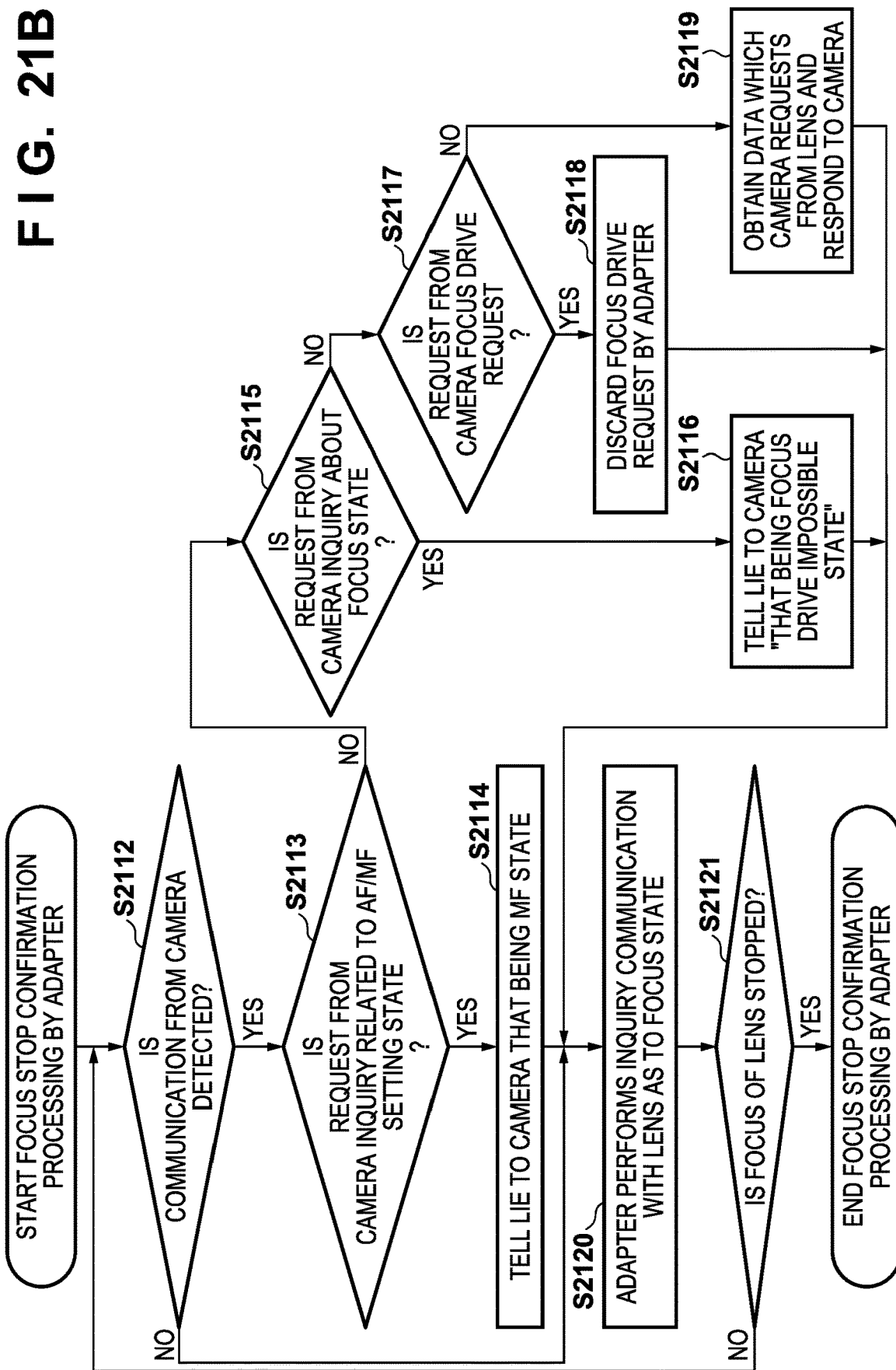
FIG. 21B is a flowchart illustrating operations in focus stop confirmation processing performed by the intermediate adapter according to the sixth embodiment.

The focus stop confirmation processing by the intermediate adapter 300 (steps S2112 to S2319), performed in step S2107, will be described next with reference to FIG. 21B.

In step S2112, the adapter microcomputer 302 determines whether there is communication from the camera body 200. The adapter microcomputer 302 moves the sequence to step S2113 if there is some kind of communication, and to step S2120 if not. In step S2113, the adapter microcomputer 302 confirms the content of the communication from the camera body 200. Specifically, the adapter microcomputer 302 determines whether the detected communication is communication for inquiring as to the state of a switch, provided in the interchangeable lens 100, for switching between the AF function and the MF function. The adapter microcomputer 302 moves the sequence to step S2114 if the communication is communication for inquiring as to the state of AF and MF, and to step S2115 if not.

In step S2114, the adapter microcomputer 302 communicates to the camera body 200 that the MF function is set. This makes it possible to ensure that thereafter, focus drive requests are not made from the camera body 200 in a period until the updating of the "focus reference position information" of the adapter, executed in this series of operations, is complete.

In step S2115, the adapter microcomputer 302 determines whether the content of the communication from the camera body 200 is a focus drive request, with the sequence moving to step S2116 if the content of the communication is a focus drive request, and to step S2117 if not. In step S2116, the adapter microcomputer 302 transmits information to the camera body 200 indicating that focus driving cannot be performed. In step S2117, the adapter microcomputer 302 determines whether the content of the communication from the camera body 200 is a focus drive request. The adapter microcomputer 302 moves the sequence to step S2118 if the content of the communication is a focus drive request, and to step S2119 if not. In step S2118, even if the intermediate adapter 300 receives the communication, the adapter microcomputer 302 does not perform that communication with the interchangeable lens 100. In step S2119, the adapter microcomputer 302 performs communication protocol conversion on the communication requested from the camera body 200, and then performs that communication with the interchangeable lens 100. The adapter microcomputer 302 also performs communication protocol conversion for the response from the interchangeable lens 100, and makes the response to the camera body 200.

In step S2120, the adapter microcomputer 302 inquires with the interchangeable lens 100 as to the state of focus. In step S2121, the adapter microcomputer 302 determines whether the focusing of the lens is stopped based on a response from the interchangeable lens 100 to step S2120. The adapter microcomputer 302 moves the sequence to step S2112 to repeat the processing of FIG. 21B if the response from the interchangeable lens 100 indicates that the focusing is not stopped, and moves the sequence to step S2108 (ends this subroutine) if the focusing is stopped.

Through the processing described above, error from the actual position of the focus lens 104, accumulated in the "FPC information" exchanged between the camera body 200 and the interchangeable lens 100 due to driving error when the focus lens 104 is repeatedly driven, can be canceled.

Note that the processing for bringing the focus to the infinite end or the close end in step S2106 may be performed as follows. For example, whether to bring the focus to the infinite end or the close end may be determined by intercepting communication between the camera body 200 and the interchangeable lens 100, or based on optical data such as subject distance information obtained by the intermediate adapter 300 itself communicating with the interchangeable lens 100.

Additionally, the intermediate adapter 300 may determine whether an actuator which is prone to driving error, such as a stepping motor, is installed based on the authentication information of the interchangeable lens 100 obtained in step S805. The adapter microcomputer 302 can determine whether to drive the focus to the infinite end or the close end based on the characteristics of the actuator. Furthermore, the focus may be stopped at the current focus position and the "focus reference position" may be updated, without performing processing for bringing the focus to one end, when an actuator not prone to focus driving error is installed. In this case, the intermediate adapter 300 makes the determination using the authentication information received from the interchangeable lens 100 in step S805.

Focus Playback Target Position Storage Processing Operations

Processing performed when the operation member 705 (a focus position storage button) provided in the intermediate adapter 300 is depressed will be described next with reference to FIGS. 22A and 22B. Note that this series of operations may be realized by the adapter microcomputer 302 executing a program.

In step S2201, the adapter microcomputer 302 determines whether a press of the operation member 705 has been detected, and if a press of the operation member 705 has been detected, the subsequent processing for updating the "focus relative change amount" managed by the intermediate adapter 300 is started (that is, the sequence moves to step S2202). The adapter microcomputer 302 repeats the processing of step S2201 if a press of the operation member 705 is not detected.

In step S2202, the adapter microcomputer 302 determines whether a communication request from the camera body 200 is being transmitted to the intermediate adapter 300 at the time when the press of the operation member 705 is detected in step S2201. The adapter microcomputer 302 moves the sequence to step S2203 if communication processing is underway at this time, and to step S2208 if no communication processing is underway.

In step S2203, the adapter microcomputer 302 analyzes a communication command group transmitted from the camera body 200, determines a communication delimitation of the minimum meaningful unit of one data length, converts the communication protocol for that data length, and communicates the result to the interchangeable lens 100. This processing is performed such that the communication commands implemented between the camera body 200 and the interchangeable lens 100, e.g., communication commands of any desired data length such as illustrated in FIG. 4B, can be concatenated and communicated.

In step S2204, the adapter microcomputer 302 communicates with the interchangeable lens 100 to obtain the "FPC information" after the communication of step S2203, regardless of the communication request from the camera body 200. In step S2205, the adapter microcomputer 302 communicates with the interchangeable lens 100 to obtain "zoom position information" after the communication of step S2204, regardless of the communication request from the camera body 200. This "zoom position information" is used in a determination for displaying a warning when there is a possibility of a drop in the accuracy to the drive position during playback driving. The warning display will be described later with reference to the warning display subroutine 2502 indicated in FIG. 25B. In step S2206, the adapter microcomputer 302 causes communication between the intermediate adapter 300 and the interchangeable lens 100 with respect to remaining communication commands in the communication command group from the camera body 200, which were implemented as interrupts in steps S2204 and S2205.

In step S2207, the adapter microcomputer 302 obtains, from the received data returned from the interchangeable lens 100, the "FPC information" and the "zoom position information", which are the responses to the communication performed in the interrupts in steps S2204 and S2205, and returns the remaining received data to the camera body 200. In step S2208, a communication request is not being made from the camera body 200, and thus the adapter microcomputer 302 performs processing for obtaining the "FPC information" and the "zoom position information" between the intermediate adapter 300 and the interchangeable lens 100.

In step S2209, the adapter microcomputer 302 stores a relative change amount from the "focus reference position information" as the "focus relative change amount" in the adapter storage unit 340, based on the "FPC information" obtained from the interchangeable lens 100 in step S2204 or step S2208.

In step S2210, the adapter microcomputer 302 stores a value obtained by adding the "focus reference position" and the "focus relative change amount" managed by the intermediate adapter 300 itself in the adapter storage unit 340 as a "focus playback target position". The "focus reference position" and the "focus relative change amount" are managed separately in this manner for the following reason. That is, as described above with reference to FIG. 20, the "FPC information" communicated between the camera body 200 and the interchangeable lens 100 may be initialized at any time in response to an instruction from the camera body 200. As such, the "focus reference position" may be offset after confirming absolute position information of the focus using the initialized "FPC information".

In step S2211, the adapter microcomputer 302 detects current attitude information and temperature information of the interchangeable lens 100 and stores that information in the adapter storage unit 340. Specifically, the attitude information of the interchangeable lens 100 is information such as when the camera body 200 is held in an upright position, in a vertical position, is pointed downward or upward, or the like. Because the camera body 200, the intermediate adapter 300, and the interchangeable lens 100 are all attached, it is sufficient for the intermediate adapter 300 to detect the attitude information detected by any of those devices. For example, if the configuration is such that the attitude information is transmitted from the camera body 200 to the interchangeable lens 100, the intermediate adapter 300 can obtain that information by intercepting the content of the communication. Alternatively, if the configuration is such that the attitude information is transmitted from the interchangeable lens 100 to the camera body 200, the information can be obtained by communicating an obtainment request for the attitude information from the intermediate adapter 300 to the interchangeable lens 100 through a sequence similar to that in step S2205. Additionally, the intermediate adapter 300 may be made capable of detecting the attitude information. The same applies to the method for obtaining the temperature information. The attitude information and temperature information are used to in the determination for the warning display, described later with reference to the warning display subroutine 2502 indicated in FIG. 25B.

In step S2212, the adapter microcomputer 302 initializes a "focus drive counter" managed by the intermediate adapter 300. This information manages a history of the driving and stopping processing of the focus lens 104 in the interchangeable lens 100. The information is used for the determination for the warning display described below with reference to the warning display subroutine 2502 indicated in FIG. 25B, which is realized by monitoring control error when the driving and stopping processing is repeated.

Figure 23:
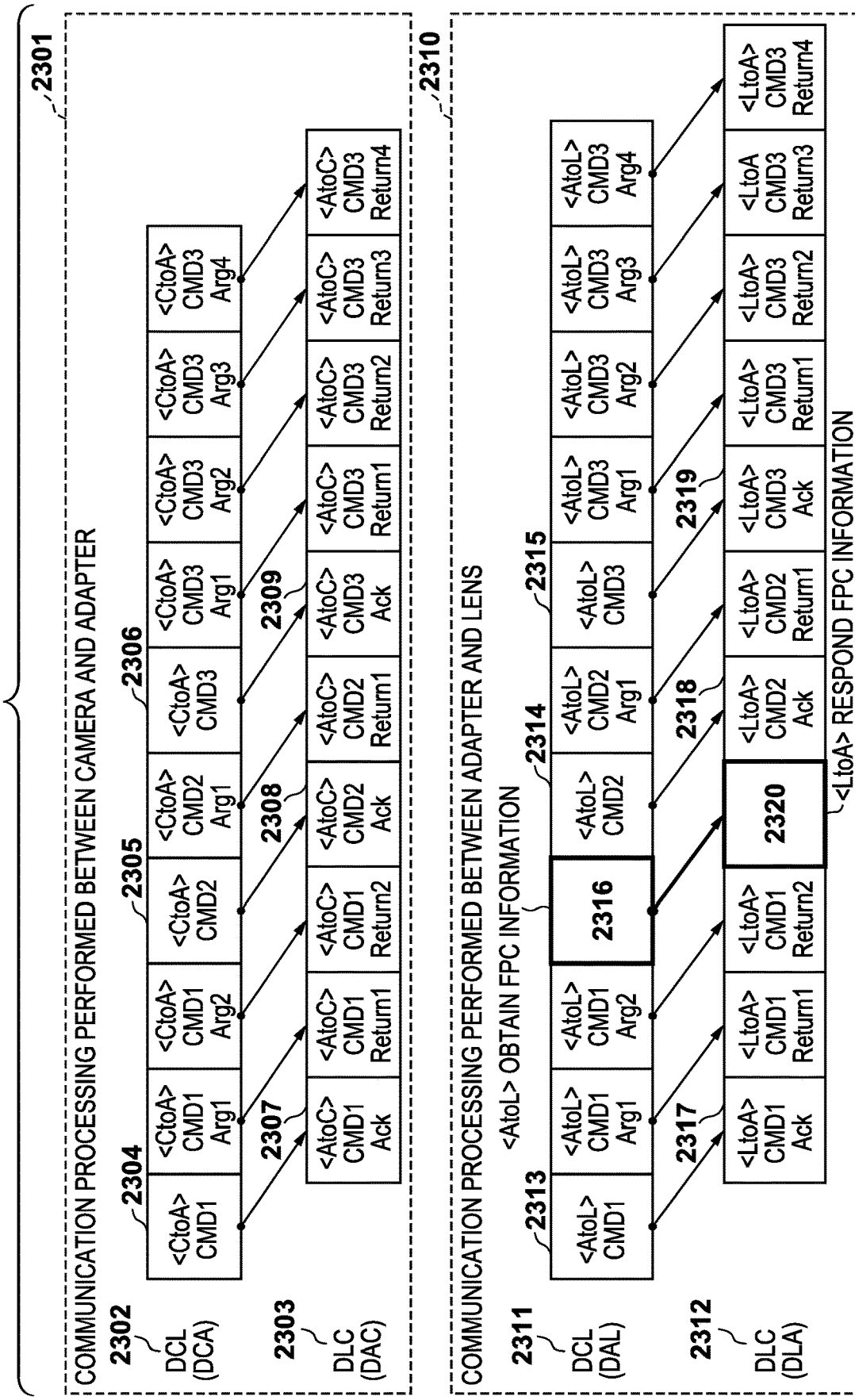
FIG. 23 is a diagram illustrating communication data replacement processing performed by the intermediate adapter according to the sixth embodiment.

The communication processing of the above-described steps S2203 to S2207 will be described in detail here with reference to FIG. 23. FIG. 23 illustrates an example of the content of communication performed between the camera body 200 and the interchangeable lens 100 when the operation member 705 (the focus position storage button) is pressed, determined in step S2202.

A broken line part 2301 indicates an example of the communication performed between the camera body 200 and the intermediate adapter 300. DCL (DCA), indicated by 2302, is the communication data transmitted from the camera body 200 to the intermediate adapter 300. DLC (DAC), indicated by 2303, is the communication data transmitted from the intermediate adapter 300 to the camera body 200. The data in DCL (DCA) indicates a case where command 1 (CMD1) having a data length of three bytes, indicated by 2304, command 2 (CMD2) having a data length of two bytes, indicated by 2305, and command 3 (CMD3) having a data length of five bytes, indicated by 2305, are communicated in succession. Three response values, namely 2307, 2308, and 2309, which are DLC (DAC) data, are communicated in succession from the intermediate adapter 300 to the camera body 200 as response values corresponding to these three communication commands. In other words, the relationship is that the response value to the communication indicated by 2304 is 2307. At this time, there is a one-to-one relationship between each communication command and data length, and the intermediate adapter 300 can determine the data length of each command by interpreting the communication commands from the camera body 200.

On the other hand, a broken line part 2310 indicates an example of communication performed between the intermediate adapter 300 and the interchangeable lens 100 when a press of the operation member 705 is detected between the communication of command 1 indicated by 2304 and the communication of command 2 indicated by 2305.

DCL (DAL), indicated by 2311, is the communication data transmitted from the intermediate adapter 300 to the interchangeable lens 100. DLC (DLA), indicated by 2312, is the communication data transmitted from the interchangeable lens 100 to the intermediate adapter 300. Command 1, indicated by 2313 and having a data length of three bytes, is the communication data for which the intermediate adapter 300 converts the communication protocol for the communication command transmitted from the camera body 200, indicated by 2304. Similarly, command 2, indicated by 2314, corresponds to the communication indicated by 2305, and command 3, indicated by 2315, corresponds to the communication 2306.

If the intermediate adapter 300 receives command 1, converts the communication protocol, and detects a press of the operation member 705 while performing the communication indicated by 2313, the communication indicated by 2316 is performed with the interchangeable lens 100 before the communication indicated by 2314. As a result, four pieces of data, namely 2317, 2318, 2319 and 2320, are returned from the interchangeable lens 100 to the intermediate adapter 300. 2320 is not communication requested by the camera body 200, and thus the three pieces of data, i.e., 2317, 2318, and 2319, are communicated from the intermediate adapter 300 to the camera body 200 having converted the communication protocol. More specifically, the data indicated by 2317 is transmitted to the camera body 200 as data 2307. Similarly, the data indicated by 2318 corresponds to 2308, and the data indicated by 2319 corresponds to 2309.

The above-described processing enables the intermediate adapter 300 to obtain the "FPC information" from the interchangeable lens 100 at the fastest timing when the operation member 705 is pressed, and to store real-time focus position information when the operation member 705 is pressed.

In the obtainment of the "FPC information" performed in step S2203, the focus position can be stored with higher accuracy if there is less delay from the timing when the operation member 705 (the focus position storage button) is pressed. For this reason, in the above-described example, this is implemented between the intermediate adapter 300 and the interchangeable lens 100 as an interrupt in the communication command group from the camera body 200. However, the obtainment of zoom position information in step S2204 may be implemented between the intermediate adapter 300 and the interchangeable lens 100 after the series of the communication command group from the camera body 200 has been implemented.

Additionally, the present embodiment describes an example of a system in which two parameters, namely the "focus reference position" and the "focus relative change amount", are managed in order for the intermediate adapter 300 to manage the absolute position information of the focus lens 104 in the interchangeable lens 100. However, these may be managed as the sum of the two, which is the "focus position information". In this case, when initialization request communication for the "FPC information" from the camera body 200 is detected as described with reference to FIG. 20, the "focus reference position" may be offset by the current value of the "FPC information", similar to the processing of step S2003.

Series of Operations During zoom Operations Performed after Focus Position Storage Button Is Operated As will be described later with reference to FIG. 25A when zoom driving is performed, errors may occur between the focus position as the actual focus plane and the "FPC information" due to the mechanical structure. It is possible that the accuracy of the focus position playback drive will drop after this zoom driving. In contrast, if zoom driving has been performed without performing focus driving after storing the focus playback target position as described with reference to FIGS. 22A and 22B, the focus position after the zoom driving is stored again as the focus playback target position. This makes it possible to prevent a drop in the accuracy of the focus position playback drive.

Figure 24:
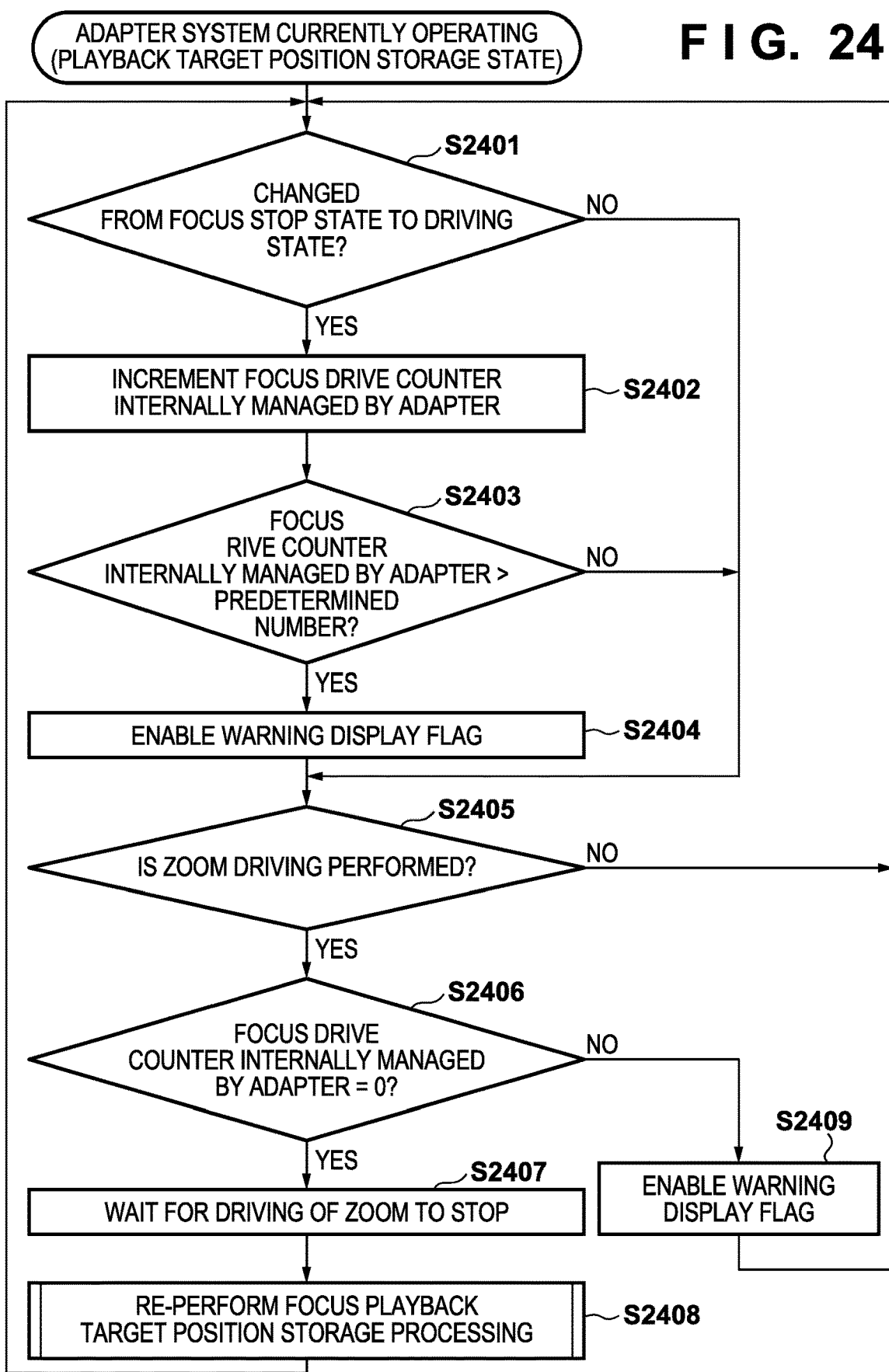
FIG. 24 is a flowchart illustrating operations in processing for re-storing the focus position at the time of zoom operations after the focus position has been stored, according to the sixth embodiment.

The foregoing processing will be described with reference to FIG. 24. Note that this series of operations may be realized by the adapter microcomputer 302 executing a program. Note also that the focus playback target position is already stored in the processing of FIGS. 22A and 22B.

In step S2401, the adapter microcomputer 302 determines whether the focus lens 104 of the interchangeable lens 100 has changed from a stopped state to a driving state. This determination may be made by intercepting the communication between the camera body 200 and the interchangeable lens 100, or may be made by communication, performed periodically between the intermediate adapter 300 and the interchangeable lens 100, which confirms the focus drive state. The adapter microcomputer 302 moves the sequence to step S2402 if a change in the driving state of the focus lens 104 is detected, and to step S2405 if not.

In step S2402, the adapter microcomputer 302 increments the count of the "focus drive counter" managed by the intermediate adapter 300 itself. Note that this "focus drive counter" has been initialized in step S2212 at the time of the focus position storage operations indicated in FIGS. 22A and 22B. In step S2403, the adapter microcomputer 302 determines whether the "focus drive counter" incremented in step S2402 has exceeded a predetermined number. This determination is made so as to perform the warning display, described later with reference to FIG. 25B, when the focus driving and stopping processing has been performed more than a predetermined number of times. This is because depending on the type of the actuator that controls the driving of the focus lens 104, errors may occur between the focus position as the actual focus plane and the "FPC information" when focus driving is performed repeatedly.

In step S2404, the adapter microcomputer 302 enables a "warning display flag" which the adapter microcomputer 302 manages. In step S2405, the adapter microcomputer 302 determines whether zoom driving of the interchangeable lens 100 has occurred. This determination may be made by intercepting the communication performed between the camera body 200 and the interchangeable lens 100, or may be made by communication, performed periodically between the intermediate adapter 300 and the interchangeable lens 100, which confirms the zoom driving state. The adapter microcomputer 302 moves the sequence to step S2406 if the zoom lens 102 is detected as being in the driving state, and returns to step S2401 if not. In step S2406, the adapter microcomputer 302 determines whether the "focus drive counter" managed by the intermediate adapter 300 is 0. The adapter microcomputer 302 moves the sequence to step S2407 if the counter is 0. The counter being 0 corresponds to a case where zoom driving is performed without focus driving being performed after the "focus playback target position" has been stored. On the other hand, if the counter is not 0 (i.e., if focus driving has been performed after storing the "focus playback target position"), the sequence moves to step S2409.

In step S2407, the adapter microcomputer 302 waits for the driving of the zoom lens 102 in the interchangeable lens 100 to stop. In step S2408, the storage of the "focus playback target position", indicated in FIG. 24, is redone. In step S2409, the adapter microcomputer 302 enables the "warning display flag" managed by the intermediate adapter 300, similar to step S2404. The adapter microcomputer 302 returns the sequence to step S2401 after the processing of steps S2408 and S2409 ends.

Through the above-described processing, if zoom driving has been performed without performing focus driving after storing the "focus playback target position", the "focus playback target position" can be automatically re-stored, which makes it possible to improve the usability. At this time, the processing can proceed without the warning display of the warning display subroutine 2502, described later with reference to FIG. 25B, being performed.

Series of Operations in Focus Playback Driving Processing

A series of operations performed when the operation member 706 (a playback driving button) provided in the intermediate adapter 300 is depressed will be described next with reference to FIGS. 25A-1 and 25A-2. Note that this series of operations may be realized by the adapter microcomputer 302 executing a program.

In step S2501, the adapter microcomputer 302 determines whether pressing of the operation member 706 is detected. The adapter microcomputer 302 moves the sequence to step S2502 if the operation member 706 has been pressed, and repeats the processing of step S2501 if not. In step S2502, the adapter microcomputer 302 performs a subroutine for making the warning display. This subroutine will be described later with reference to FIG. 25B. In step S2503, the adapter microcomputer 302 starts focus playback driving processing between the intermediate adapter 300 and the interchangeable lens 100. In step S2504, the adapter microcomputer 302 performs a subroutine for waiting for the driving of the focus lens 104 in the interchangeable lens 100 to stop (the focus stop confirmation processing), by the intermediate adapter 300. This subroutine is similar to the processing described with reference to steps S2112 to S2121 in FIG. 21B.

In step S2505, the adapter microcomputer 302 obtains, from the interchangeable lens 100, the "FPC information" in the state where the focus lens 104 is stopped in step S2504, and updates the "focus relative change amount" managed by the intermediate adapter 300. In step S2506, the adapter microcomputer 302 determines whether the focus drive speed setting has been changed by the operation member 702 of the intermediate adapter 300. Note that this speed setting is similar to the details described with reference to FIG. 14. The adapter microcomputer 302 moves the sequence to step S2507 if the speed setting has been changed, and to step S2508 if not.

In step S2507, the adapter microcomputer 302 requests focus driving from the interchangeable lens 100. At this time, the adapter microcomputer 302 generates the absolute position information of the focus lens 104 from the speed set in step S2506, the "focus relative change amount" updated in step S2505, and the "focus reference position information" stored in advance. Furthermore, the differential value between the absolute position information of the focus lens 104 and the "focus playback target position" stored as indicated in FIGS. 22A and 22B is obtained, and the interchangeable lens 100 is requested to perform focus driving so as to cancel out that differential value.

Step S2508 is performed when the focus speed setting has not been made in the intermediate adapter 300, or the focus speed setting has been canceled. The adapter microcomputer 302 maintains the speed of the focus drive request made from the camera body 200 to the interchangeable lens 100 immediately before. Alternatively, the adapter microcomputer 302 may request the highest speed of focus driving from the interchangeable lens 100.

In step S2509, the adapter microcomputer 302 performs communication for obtaining the driving state of the focus lens 104 from the interchangeable lens 100. In step S2510, the state of the focus lens 104 obtained in step S2509 is determined, and if the state is an abnormal state in which focus driving is not possible, warning processing is performed in step S2511. The warning processing will be described in detail with reference to FIG. 21B. An example of an abnormal state for the focus here may be, for example, when the focus lens 104 cannot operate due to external factors such as the focus unit experiencing an impact or being pushed by hand.

In step S2512, the adapter microcomputer 302 determines whether the operation member 706 has been released. If the operation has been canceled, the sequence moves to step S2513, whereas if the operation is being continued, in step S2514, it is determined whether the driving of the focus lens 104 has stopped. The adapter microcomputer 302 redoes the processing from step S2509 until the driving of the focus lens 104 stops, and moves the sequence to step S2515 once the focus lens 104 stops.

In step S2515, the adapter microcomputer 302 obtains, from the interchangeable lens 100, the "FPC information" in a state where the focus lens 104 is stopped. In step S2516, it is determined, based on the "FPC information" obtained in step S2515, whether the focus has been successfully driven to the target focus position designated in step S2506. The adapter microcomputer 302 performs the warning processing in step S2517 if the focus lens cannot be driven to the target focus position. A case where the interchangeable lens 100 has a setting that limits the range over which the focus can be driven or the like can be given as an example of a case where the focus lens cannot be driven to the focus position.

If the focus lens 104 is not stopped in step S2514, the adapter microcomputer 302 moves the sequence to step S2518 and determines whether the user has performed an operation for changing the focus speed setting, similar to step S2506. If the focus speed setting has been changed, in step S2519, the adapter microcomputer 302 notifies the interchangeable lens 100 of focus drive speed information in which the setting has been changed. The processing is then re-executed from step S2509 regardless of whether or not a user operation has been made. Changing the speed setting during this playback driving will be described later with reference to FIG. 27. In step S2513, the adapter microcomputer 302 terminates the processing for suppressing focus drive requests from the camera body 200, performed in the subroutine 2504, and ends this series of operations.

Warning Display Determination Processing by Intermediate Adapter 300

The warning display determination processing subroutine of step S2502 will be described next with reference to FIG. 25B. Note that this series of operations may be realized by the adapter microcomputer 302 executing a program.

Figure 22A:
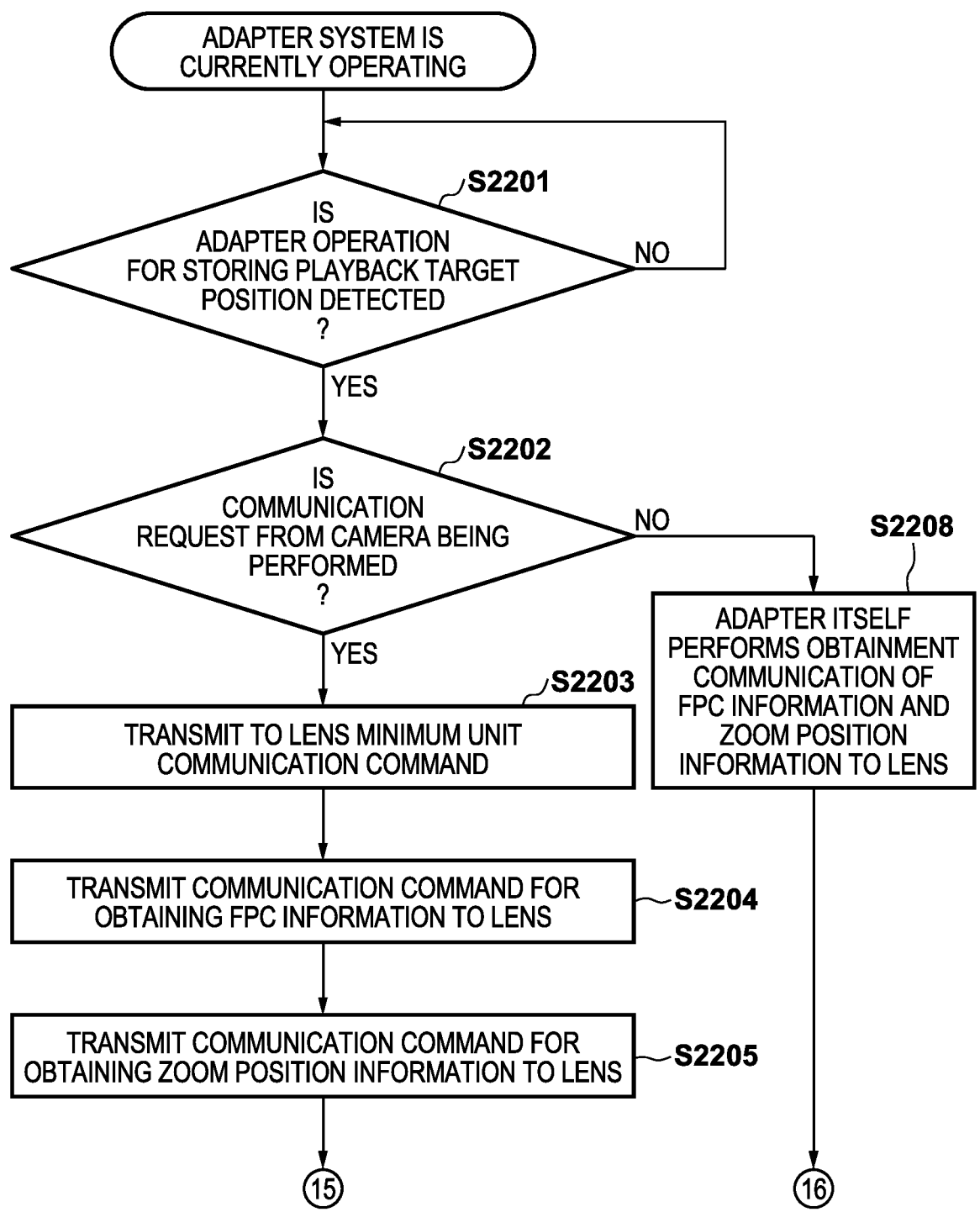
FIGS. 22A and 22B are flowcharts illustrating processing for storing a focus position according to the sixth embodiment.
Figure 22B:
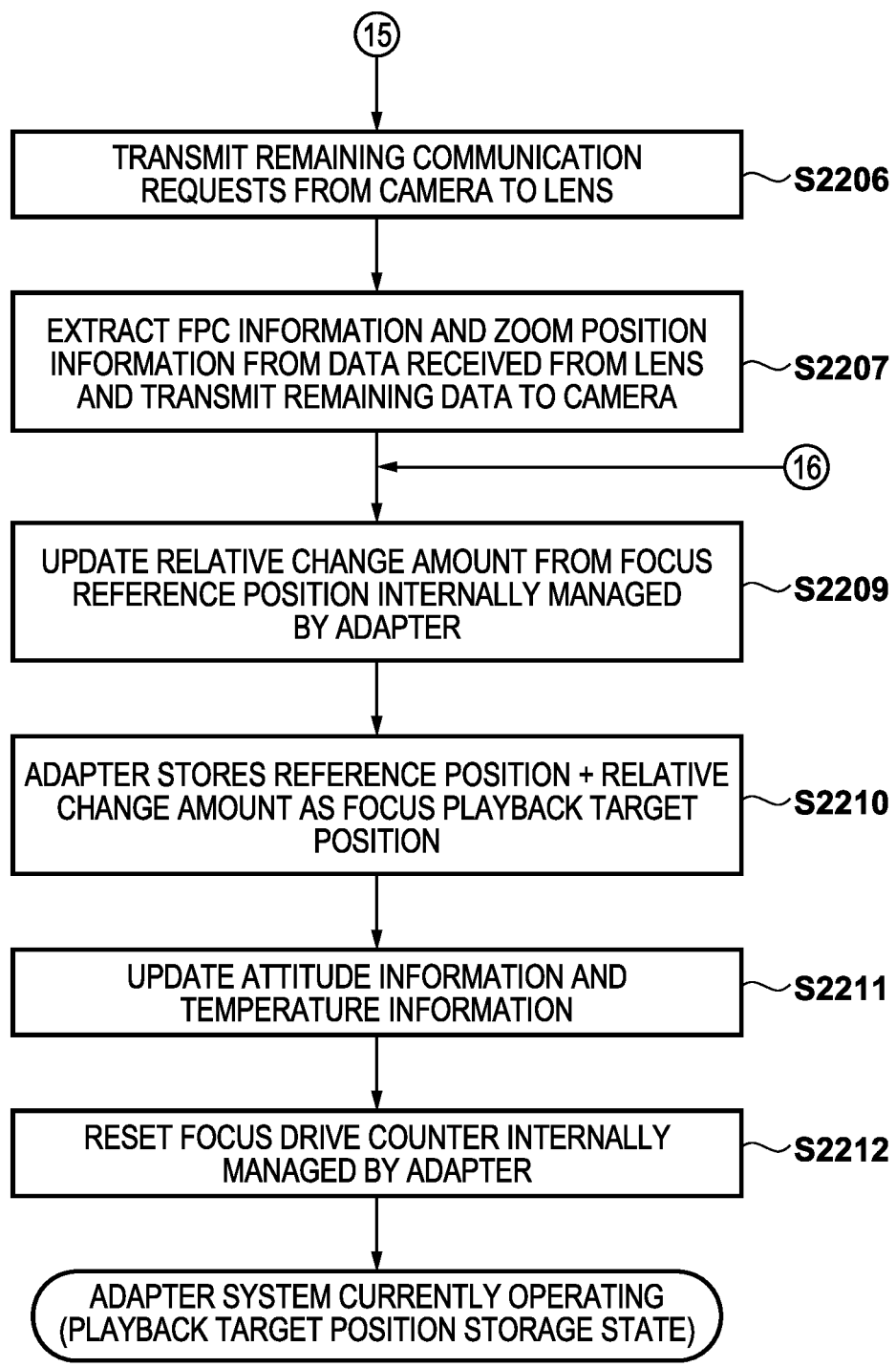

In step S2520, the adapter microcomputer 302 determines whether the processing for storing the focus position, described with reference to FIGS. 22A and 22B, is being performed, and moves to the warning display processing of step S2524 if the focus position storage processing has not yet been performed. On the other hand, the sequence moves to step S2521 if the focus position storage processing has been performed.

In step S2521, the adapter microcomputer 302 compares the attitude information from when the playback driving button of the operation member 706 was depressed with the attitude information obtained at the time of the focus position storage processing in step S2211, and determines whether there is a difference. Note that similar to step S2211, the method of obtaining the attitude information may be obtaining the information from the camera body 200 or from the interchangeable lens 100, or attitude information detection provided in the intermediate adapter 300.

In step S2522, the adapter microcomputer 302 compares the temperature information from when the playback driving button of the operation member 706 was depressed with the temperature information obtained at the time of the focus position storage processing in step S2211, and determines whether there is at least a predetermined difference. A threshold for comparing the difference between these instances of temperature information may be switched depending on the type of actuator driving the focus lens 104 (the stepping motors 107 and 108, in FIG. 1A). Note that similar to step S2211, the method of obtaining the temperature information may be obtaining the information from the camera body 200 or from the interchangeable lens 100, or temperature information detection provided in the intermediate adapter 300. In step S2523, the adapter microcomputer 302 determines whether the "warning display flag" managed by the intermediate adapter 300 is enabled, with the sequence moving to step S2524 if the flag is enabled, and the series of operations ending if not.

Because it has been determined through one of steps S2520 to S2523 that the driving accuracy may drop when the focus playback driving processing is performed, in step S2524, the adapter microcomputer 302 notifies the user of a warning status through the adapter notification unit 330. In the communication with the camera body 200, the adapter microcomputer 302 may prompt the camera body 200 to make an error display by not following the communication format illustrated in FIG. 23, for example. The focus playback drive processing may be continued when the warning display processing is performed, or the playback drive processing may be stopped at this time.

As a result of the processing of the focus position playback operations described above, the focus can be driven from the focus position at the time the playback driving button is depressed to a playback drive focus position stored by the intermediate adapter in advance. Additionally, by determining zoom position changes, attitude changes, temperature changes, the number of instances of focus driving, and the like as cases where the accuracy of the focus playback driving may drop, warnings can be displayed for the user.

Next, how the focus position is manipulated as a result of the above-described update processing and the like will be described with reference to FIG. 26. Note that the above-described update processing and the like includes the "focus reference position information" update processing in FIG. 21A, the behavior when the focus position storage button is operated in FIGS. 22A and 22B, and the behavior during the focus position playback operations in FIGS. 25A-1 and 25A-2.

In a graph 2601 in FIG. 26, the horizontal axis represents time, whereas the vertical axis indicates the position of the focus lens 104. First, when the camera startup processing is performed at timing 2602 indicated on the horizontal axis, the intermediate adapter 300 sets the "focus reference position" managed by the intermediate adapter 300 in the aforementioned step S807. At the same time, the "FPC information" communicated between the camera body 200 and the interchangeable lens 100 is set to zero. Focus reference position (1) indicated by 2603 on the vertical axis indicates that this focus position is managed by the intermediate adapter 300 as the reference position.

The change in the focus position indicated in section 2604 indicates a change in the focus lens 104 due to focus drive instructions issued to the interchangeable lens 100 through the intermediate adapter 300 based on autofocus control from the camera body 200, or manual focus operations.

When an operation to update the focus reference position is accepted from the user at the timing indicated by 2605 on the horizontal axis, focus stop waiting processing (the processing in step S2606 in FIG. 26) is performed (as described with reference to step S2107 in FIG. 21A). After confirming that the focus lens 104 has stopped in this processing, the intermediate adapter 300 re-stores the focus position, as indicated by 2607 on the vertical axis, as the "focus reference position". Note that FIG. 26 indicates a case where the attached lens is a lens for which the absolute reference position can be checked, determined in step S2104, and indicates a case where there is a reset sensor at the focus position indicated by 2607. At this point in time, the "FPC information" communicated between the camera body 200 and the interchangeable lens 100 is set to zero.

In section 2608, the user changes the focus position through autofocus control or manual focus control, similar to section 2604. When the intermediate adapter 300 detects an FPC information initialization request from the camera body 200 at the timing indicated by 2609 on the horizontal axis, the "focus reference position" stored by the intermediate adapter 300 is updated through the processing in FIG. 20. The focus position indicated by 2610 on the vertical axis is the focus position from when the FPC initialization request is detected. Additionally, the value of the "FPC information" obtained by the intermediate adapter 300 from the interchangeable lens 100 in step S2002 is an amount of a difference from 2607, which is the "focus reference position (2)" indicated by 2611. Additionally, the amount by which the "focus reference position information" is offset in step S2003 corresponds to the value indicated by 2611.

Thereafter, upon accepting an operation of the focus position storage button by the user at the timing indicated by 2612 on the horizontal axis, the intermediate adapter 300 obtains the "FPC information" from the interchangeable lens 100 through the processing of step S2203 or step S2208 in FIGS. 22A and 22B. At this time, the newest "FPC information" is obtained, without stopping the focus position. The zero position of the "FPC information" at this point is the focus position indicated by 2610, and the "FPC information" obtained at the timing indicated by 2612 on the horizontal axis is a focus change amount indicated by 2613. Then, the current focus position at this timing is the focus position indicated by 2614, at the same position as the focus playback target position stored by the intermediate adapter 300. Accordingly, 2615, which indicates the amount of the difference between the current focus position and the focus reference position, is stored by the intermediate adapter 300 as the "focus relative change amount".

In section 2616, the user changes the focus position through autofocus control or manual focus control, similar to section 2604. Upon accepting a playback drive operation by the user at the timing indicated by 2617 on the horizontal axis, the intermediate adapter 300 performs the focus stop waiting processing indicated by 2618 (the focus stop confirmation processing of step S2504). The "FPC information" at this focus stop position is the amount of the difference from the zero position 2610 of the "FPC information" indicated by 2619. After the focus stops, focus playback driving 2620 is performed with respect to the focus playback target position through the processing of step S2506. The focus drive amount 2622 at this time can be obtained through the following relational expression.

focus drive amount 2622={focus playback target position 2614−(focus reference position (2) 2607+focus relative change amount 2621)}

In this manner, focus position storage and playback drive can be realized through user operations.

Focus operations when an operation is performed to change the focus speed setting during focus playback driving, described in step S2518, will be described next with reference to FIG. 27. In a graph 2701 in FIG. 27, the horizontal axis represents time, whereas the vertical axis indicates the position of the focus lens 104. At the start of these focus operations, the focus lens 104 is at the "current focus position" indicated by 2702 on the vertical axis. A case where the focus position is driven to the "focus playback target position" indicated by 2703 on the vertical axis will be described here as an example.

When a focus speed setting operation of the intermediate adapter 300 is performed at the timing indicated by 2704 on the horizontal axis, the intermediate adapter 300 stores that setting value. Thereafter, the focus speed setting is changed at each timing indicated on the horizontal axis. For example, speed 1, speed 2, speed 3, speed 4, and speed 5 can be selected, with the settings slowing down sequentially from speed 1. Note that this processing corresponds to step S2506 illustrated in FIG. 25A-1.

Next, the focus playback drive operation is performed at the timing indicated by 2705 on the horizontal axis. As a result of this operation, the focus drive is started at a fast speed setting set at 2704 (2706). Next, when a focus speed setting operation of the intermediate adapter 300 is performed at the timing indicated by 2707 on the horizontal axis, the intermediate adapter 300 stores that setting value and communicates the change in the speed setting to the interchangeable lens 100. This processing corresponds to step S2518 illustrated in FIG. 25A-2. This operation results in a switch to focus drive at a slightly slower speed setting than the speed set at 2704 (2708). Thereafter, when the speed setting change operation is performed at the timings indicated by 2709, 2710, and 2711 on the horizontal axis, the intermediate adapter 300 gradually switches the speed of the focus playback drive to a lower speed. Although the example in FIG. 27 illustrates an operation to gradually slow down the speed setting, it is also possible to speed up the speed setting or switch between high and low speeds as appropriate. The above-described operations make it possible to control the speed of focus playback drive in response to user operations.

Seventh Embodiment

A seventh embodiment will be described next. In the sixth embodiment, focus position storage and playback driving was implemented through user operations. In the present embodiment, however, focus driving between exposures is realized by the intermediate adapter 300 performing the focus playback driving automatically during an exposure period. However, the configuration of the camera system in the present embodiment can be substantially the same as in the above embodiments. As such, configurations and processes identical or substantially identical to those in the foregoing embodiment will be assigned the same reference signs and redundant descriptions will be skipped, with attention focused on the differences.

Series of Operations when Shooting Still Image

Figure 28:
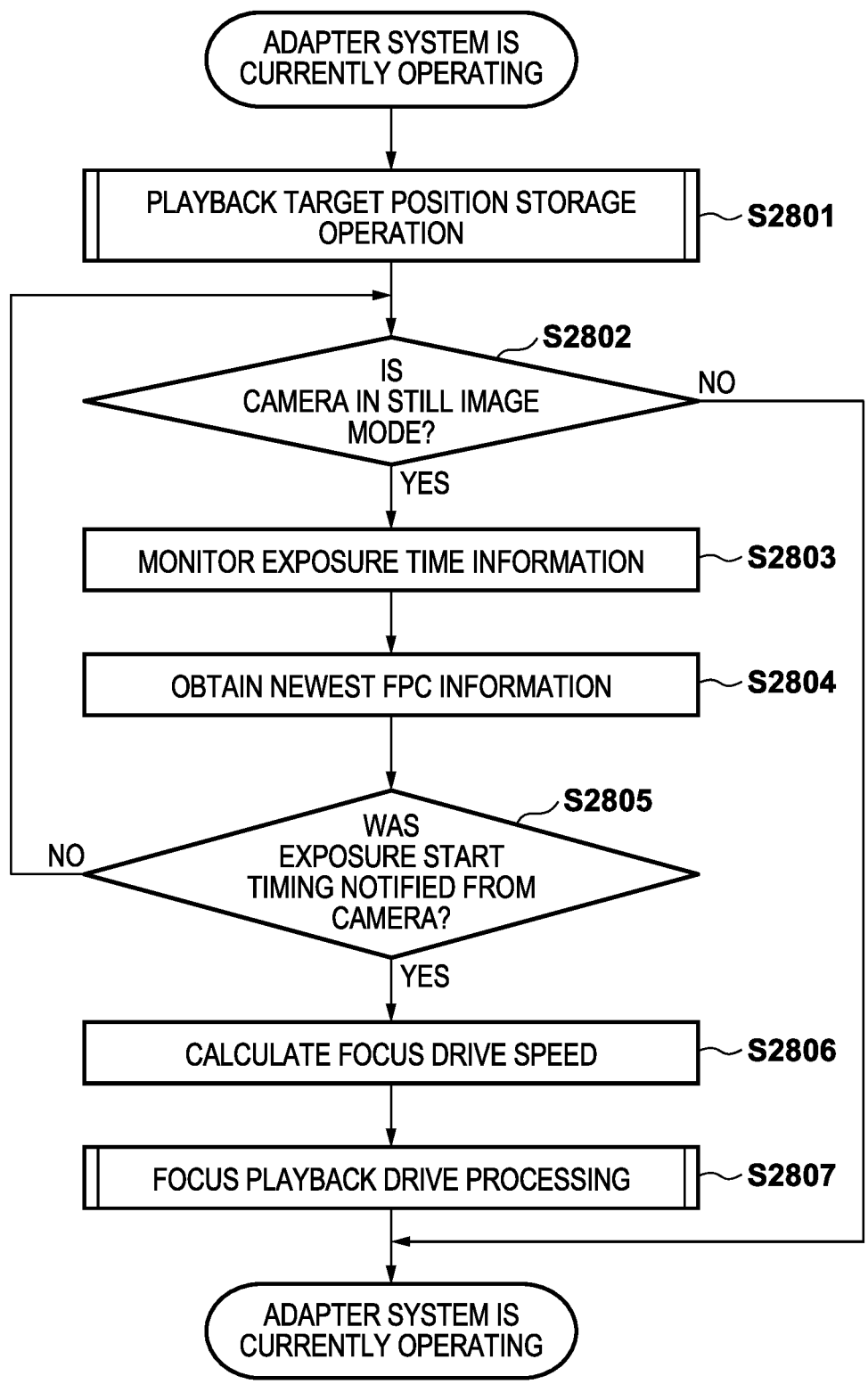
FIG. 28 is a flowchart illustrating operations in inter-exposure focus drive processing when shooting a still image, according to a seventh embodiment.

A series of operations performed when shooting a still image according to the present embodiment will be described with reference to FIG. 28. Note that this series of operations may be realized by the adapter microcomputer 302 executing a program.

In step S2801, the adapter microcomputer 302 performs the series of operations illustrated in FIGS. 22A and 22B (the focus playback target position storage processing). In step S2802, the adapter microcomputer 302 monitors the communication from the camera body 200, and determines whether the current shooting mode of the camera body 200 is a still image shooting mode. The adapter microcomputer 302 ends this processing (or returns the sequence to step S2801) if the shooting mode is not the still image shooting mode, and moves the sequence to step S2803 if the shooting mode is the still image shooting mode.

In step S2803, the adapter microcomputer 302 monitors the communication from the camera body 200, and monitors exposure time information from the still image shooting by the camera body 200. In step S2804, the adapter microcomputer 302 obtains the newest "FPC information" from the interchangeable lens 100. In step S2805, the adapter microcomputer 302 monitors the communication from the camera body 200 and determines whether still image shooting exposure start information is being communicated. The adapter microcomputer 302 returns the sequence to step S2802 if the exposure start information is not yet being communicated, and moves the sequence to step S2806 if the exposure start information is being communicated. In step S2806, the adapter microcomputer 302 calculates the drive speed for focus driving between exposures. For example, the adapter microcomputer 302 calculates the drive speed based on the exposure time obtained in step S2803, and the focus drive amount calculated from the newest "FPC information" obtained in step S2804 and the playback target position information stored in step S2801. In step S2807, the adapter microcomputer 302 performs the focus playback driving processing illustrated in FIG. 25A-1.

The operations described with reference to FIG. 28 will be supplemented with further descriptions referring to FIG. 29. In a graph 2901 in FIG. 29, the horizontal axis represents time, whereas the vertical axis indicates the position of the focus lens 104. 2902 on the vertical axis indicates the focus playback target position stored in step S2801. This focus playback target position is assumed to be recorded by the user before still image shooting operations.

2903 on the vertical axis indicates the position of the focus lens 104 before still image shooting. The timing indicated by 2904 on the horizontal axis is the timing of the start of exposure. The intermediate adapter 300 determines information of this timing from information communicated from the camera body 200 to the interchangeable lens 100 (corresponding to the processing of step S2803).

The intermediate adapter 300 communicates a focus drive request to the interchangeable lens 100 (in the processing of step S2807 described above), and as a result, the focus lens 104 operates as indicated by 2905. The values obtained in step S2806 are used as the focus drive amount and the drive speed at this time. The exposure ends at the timing indicated by 2906 on the horizontal axis.

In this manner, focus drive control between exposures through still image capture can be realized with ease by the user operating the intermediate adapter 300, which stores the focus playback drive position in advance.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-168274, filed Oct. 13, 2021, which is hereby incorporated by reference herein in its entirety.

What is claimed is:

1. An accessory apparatus which is removably attached between an image capturing apparatus and an interchangeable lens, the accessory apparatus comprising:
   one or more processors; and
   a memory storing instructions which, when the instructions are executed by the one or more processors, cause the accessory apparatus to function as:
   a communication unit configured to perform first communication with the image capturing apparatus and second communication with the interchangeable lens;
   an operation unit configured to accept a predetermined operation for operating a predetermined function that assists an autofocus (AF) operation by the image capturing apparatus; and
   a control unit configured to implement the predetermined function with respect to the AF operation by controlling transmission of a control command to the interchangeable lens through the second communication based on the predetermined operation and the control command for the AF operation accepted from the image capturing apparatus through the first communication,
   wherein to control the transmission of the control command to the interchangeable lens, the control unit does not transmit a control amount included in the control command and pertaining to focus for the AF operation to the interchangeable lens, or changes the control amount and transmits the control amount changed to the interchangeable lens, in accordance with the predetermined operation.

2. The accessory apparatus according to claim 1,
wherein the control unit does not transmit the control amount to the interchangeable lens in a case where the predetermined operation is a first operation for operating a function that stops the AF operation.

3. The accessory apparatus according to claim 2,
wherein in a case where the predetermined operation is the first operation, the control unit further transmits, to the interchangeable lens through the second communication, a command for stopping driving of a focus lens in the interchangeable lens.

4. The accessory apparatus according to claim 2,
wherein in a case where the predetermined operation is the first operation, the control unit further transmits, to the interchangeable lens through the second communication, a command for prohibiting driving of a focus lens in the interchangeable lens by manual focus.

5. The accessory apparatus according to claim 2,
wherein in a case where the predetermined operation is the first operation, the control unit further transmits, to the image capturing apparatus through the first communication, information indicating a state of manual focus.

6. The accessory apparatus according to claim 1,
wherein in a case where the predetermined operation is a second operation for driving a function that limits a drive range of a focus lens in the interchangeable lens by the AF operation, the control unit changes the control amount to fall within a predetermined drive range of the focus lens.

7. The accessory apparatus according to claim 6,
wherein the control unit sets the predetermined drive range of the focus lens in the interchangeable lens to an infinite end based on an absolute position of the focus lens.

8. The accessory apparatus according to claim 6,
wherein the control unit sets the predetermined drive range of the focus lens in the interchangeable lens to a close end based on an absolute position of the focus lens.

9. The accessory apparatus according to claim 6,
wherein using an absolute position of the focus lens in the interchangeable lens at a time when the second operation is accepted as a reference, the control unit sets, as the predetermined drive range, a range having a predetermined width from a position serving as the reference.

10. The accessory apparatus according to claim 6,
wherein the control unit sets a pre-set position as an infinite end or a close end of the predetermined drive range.

11. The accessory apparatus according to claim 7,
wherein in a case where the absolute position of the focus lens in the interchangeable lens is at the infinite end of the predetermined drive range, the control unit notifies the image capturing apparatus, through the first communication, that the focus lens is at the infinite end.

12. The accessory apparatus according to claim 8,
wherein in a case where the absolute position of the focus lens in the interchangeable lens is at the close end of the predetermined drive range, the control unit notifies the image capturing apparatus, through the first communication, that the focus lens is at the close end.

13. The accessory apparatus according to claim 6,
wherein the control unit cancels the changing of the control amount to fall within the predetermined drive range in response to the operation unit accepting the second operation while the predetermined drive range is set.

14. The accessory apparatus according to claim 6,
wherein the control unit cancels the changing of the control amount to fall within the predetermined drive range in response to detecting the interchangeable lens being removed while the predetermined drive range is set.

15. The accessory apparatus according to claim 6,
wherein the control unit cancels the changing of the control amount to fall within the predetermined drive range in response to a zoom lens in the interchangeable lens being driven while the predetermined drive range is set.

16. The accessory apparatus according to claim 13, further comprising:
a notification unit configured to notify a user that the control unit has canceled the changing of the control amount to fall within the predetermined drive range.

17. The accessory apparatus according to claim 1,
wherein in a case where the predetermined operation is a third operation for operating a function that changes a drive speed of a focus lens in the AF operation, the control unit changes a drive speed of the focus lens included in the control amount.

18. The accessory apparatus according to claim 17,
wherein in a case where the control amount in which the drive speed of the focus lens is a first drive speed is converted such that the drive speed of the focus lens is a second drive speed, the control unit calculates the second drive speed by multiplying the first drive speed by a predetermined multiple.

19. The accessory apparatus according to claim 18,
wherein after converting the control amount such that the drive speed of the focus lens is the second drive speed, the control unit stops converting the control amount in response to the third operation being accepted.

20. The accessory apparatus according to claim 17, further comprising:
a notification unit configured to notify a user that the drive speed of the focus lens cannot be changed in a case where the control unit has detected that the drive speed of the focus lens in the AF operation cannot be changed.

21. The accessory apparatus according to claim 1,
wherein in a case where the predetermined operation is a fourth operation for operating a function that fine-tunes driving of a focus lens, the control unit does not transmit the control amount to the interchangeable lens, and transmits a drive amount of the interchangeable lens based on the fourth operation to the interchangeable lens through the second communication.

22. The accessory apparatus according to claim 1,
wherein in a case where the predetermined operation is a fifth operation for temporarily operating manual focus, the control unit does not transmit the control amount to the interchangeable lens, and transmits a drive amount of the interchangeable lens based on the fifth operation to the interchangeable lens through the second communication.

23. A method of controlling an accessory apparatus which is removably attached between an image capturing apparatus and an interchangeable lens, wherein the accessory apparatus includes a communication unit configured to perform first communication with the image capturing apparatus and second communication with the interchangeable lens, the method comprising:

accepting a predetermined operation for operating a predetermined function that assists an autofocus (AF) operation by the image capturing apparatus; and implementing the predetermined function with respect to the AF operation by controlling transmission of a control command to the interchangeable lens through the second communication based on the predetermined operation and the control command for the AF operation accepted from the image capturing apparatus through the first communication, wherein to control the transmission of the control command to the interchangeable lens, in the implementing, a control amount included in the control command and pertaining to focus for the AF operation is not transmitted to the interchangeable lens, or the control amount is changed and transmitted to the interchangeable lens, in accordance with the predetermined operation.

24. A non-transitory computer-readable storage medium comprising instructions for performing a method of controlling an accessory apparatus which is removably attached between an image capturing apparatus and an interchangeable lens, wherein the accessory apparatus includes a communication unit configured to perform first communication with the image capturing apparatus and second communication with the interchangeable lens, the method comprising:

accepting a predetermined operation for operating a predetermined function that assists an autofocus (AF) operation by the image capturing apparatus; and implementing the predetermined function with respect to the AF operation by controlling transmission of a control command to the interchangeable lens through the second communication based on the predetermined operation and the control command for the AF operation accepted from the image capturing apparatus through the first communication, wherein to control the transmission of the control command to the interchangeable lens, in the implementing, a control amount included in the control command and pertaining to focus for the AF operation is not transmitted to the interchangeable lens, or the control amount is changed and transmitted to the interchangeable lens, in accordance with the predetermined operation.

* * * * *